US012697189B2

(12) United States Patent
Frezal et al.

(10) Patent No.: US 12,697,189 B2
(45) Date of Patent: Aug. 4, 2026

(54) ELECTRICAL ROTATING CUTTING INSTRUMENTS AND SYSTEMS

(71) Applicants: SpineGuard, Vincennes (FR); Confident ABC Ltd., Afula (IL)

(72) Inventors: Olivier Frezal, Tarnos (FR); Roy Zilberman, Qaaddarim (IL); Ulrich Schraudolph, Singapore (SG); Anbarasan Duraisamy, Singapore (SG); Yechiam Hantman, Savyon (IL)

(73) Assignees: SpineGuard, Vincennes (FR); Confident ABC Ltd., Afula (IL)

( * ) Notice: Subject to any disclaimer, the term of this patent is extended or adjusted under 35 U.S.C. 154(b) by 211 days.

(21) Appl. No.: 18/518,428

(22) Filed: Nov. 22, 2023

(65) Prior Publication Data

US 2024/0268925 A1 Aug. 15, 2024

Related U.S. Application Data

(63) Continuation of application No. PCT/IL2022/050585, filed on Jun. 2, 2022.

(Continued)

(51) Int. Cl.
*A61B 17/16* (2006.01)
*A61C 3/02* (2006.01)
*A61C 3/04* (2006.01)

(52) U.S. Cl.
CPC . *A61C 3/04* (2013.01); *A61C 3/02* (2013.01)

(58) Field of Classification Search
CPC ............... A61B 17/1615–17/1633; A61C 3/02
See application file for complete search history.

(56) References Cited

U.S. PATENT DOCUMENTS

| 5,334,205 A | 8/1994 | Cain | |
| 6,337,994 B1 * | 1/2002 | Stoianovici | .......... A61B 5/0538 |
| | | | 600/373 |

(Continued)

FOREIGN PATENT DOCUMENTS

| CN | 1929789 A | 3/2007 |
| CN | 103948412 A | 7/2014 |

(Continued)

OTHER PUBLICATIONS

U.S. Appl. No. 15/115,988, filed Feb. 3, 2015.

(Continued)

*Primary Examiner* — Zade Coley
(74) *Attorney, Agent, or Firm* — Greenberg Traurig, LLP; Christopher C. Bolten; Albert K. Heng

(57) ABSTRACT

A rotating cutting instrument (20) is provided that includes a proximal electrically-conductive shank (24), configured to receive torque. An electrically-conductive outer electrode (26) includes an electrically-conductive distal end portion (28) that is shaped so as to penetrate tissue when rotated, and is in electrical contact with the proximal electrically-conductive shank (24). An electrically-conductive inner electrode (30) has a proximal end portion (32). An electrical isolation layer (34) is disposed between the electrically-conductive outer electrode (26) and the electrically-conductive inner electrode (30), so as to electrically isolate the electrically-conductive outer electrode (26) and the electrically-conductive inner electrode (30) from each other. Other embodiments are also described.

33 Claims, 48 Drawing Sheets

Related U.S. Application Data

(60) Provisional application No. 63/208,619, filed on Jun. 9, 2021, provisional application No. 63/196,049, filed on Jun. 2, 2021.

(56) References Cited

U.S. PATENT DOCUMENTS

| | | | |
|---|---|---|---|
| 6,470,207 B1 | 10/2002 | Simon et al. | |
| 6,635,062 B2 | 10/2003 | Ray, III et al. | |
| 6,796,985 B2 | 9/2004 | Bolger et al. | |
| 7,580,743 B2 * | 8/2009 | Bourlion | A61B 5/053 |
| | | | 606/80 |
| 8,092,457 B2 | 1/2012 | Oettinger et al. | |
| 8,118,594 B2 * | 2/2012 | Pernot | A61C 1/141 |
| | | | 433/114 |
| 8,221,428 B2 | 7/2012 | Trieu | |
| 8,361,152 B2 | 1/2013 | McCormack et al. | |
| 8,419,746 B2 | 4/2013 | Bourlion et al. | |
| 8,486,119 B2 | 7/2013 | Bourlion | |
| 8,634,897 B2 | 1/2014 | Simon et al. | |
| 8,795,285 B2 | 8/2014 | Kwon | |
| 8,939,979 B2 | 1/2015 | Del et al. | |
| 9,066,751 B2 | 6/2015 | Sasso | |
| 9,119,732 B2 | 9/2015 | Schifano et al. | |
| 9,204,830 B2 | 12/2015 | Zand et al. | |
| 9,538,935 B2 | 1/2017 | Bourlion et al. | |
| 9,855,060 B2 | 1/2018 | Ardel et al. | |
| 9,901,283 B2 | 2/2018 | Bourlion et al. | |
| 9,937,009 B2 | 4/2018 | Schroeder et al. | |
| 10,064,630 B2 | 9/2018 | Forman et al. | |
| 10,092,300 B2 | 10/2018 | Del et al. | |
| 10,149,729 B2 | 12/2018 | Smaby et al. | |
| 10,624,572 B2 * | 4/2020 | Bourlion | A61B 17/1671 |
| 10,987,113 B2 | 4/2021 | Mcginley et al. | |
| 11,000,292 B2 | 5/2021 | Mcginley | |
| 11,058,436 B2 | 7/2021 | Mcginley et al. | |
| 11,083,469 B2 | 8/2021 | Del et al. | |
| 11,291,381 B2 | 4/2022 | Bourlion et al. | |
| 11,344,372 B2 | 5/2022 | Bourlion et al. | |
| 11,399,902 B2 | 8/2022 | Bourlion et al. | |
| 11,789,177 B2 | 10/2023 | Hokstad | |
| 11,903,591 B2 | 2/2024 | Chen et al. | |
| 12,161,348 B2 | 12/2024 | Lorian et al. | |
| 12,213,683 B2 | 2/2025 | Del et al. | |
| 12,458,367 B2 | 11/2025 | Chandanson et al. | |
| 2002/0120197 A1 | 8/2002 | Kleffner et al. | |
| 2003/0078495 A1 | 4/2003 | Goodwin | |
| 2003/0187348 A1 | 10/2003 | Goodwin | |
| 2005/0116673 A1 * | 6/2005 | Carl | A61B 17/1626 |
| | | | 318/432 |
| 2005/0119660 A1 * | 6/2005 | Bourlion | A61B 17/1626 |
| | | | 606/80 |
| 2006/0241628 A1 * | 10/2006 | Parak | A61B 17/1626 |
| | | | 606/80 |
| 2006/0258951 A1 | 11/2006 | Bleich et al. | |
| 2007/0218420 A1 | 9/2007 | Syribeys | |
| 2007/0239187 A1 * | 10/2007 | Brunnett | A61B 17/1622 |
| | | | 606/172 |
| 2008/0086140 A1 | 4/2008 | Wolf | |
| 2008/0262526 A1 * | 10/2008 | Neubardt | A61B 17/1615 |
| | | | 606/180 |
| 2009/0157059 A1 | 6/2009 | Allen et al. | |
| 2010/0024981 A1 | 2/2010 | Wallace et al. | |
| 2010/0286694 A1 | 11/2010 | Rio et al. | |
| 2011/0015649 A1 | 1/2011 | Anvari et al. | |
| 2012/0046668 A1 | 2/2012 | Gantes | |
| 2012/0296213 A1 | 11/2012 | Mauldin, Jr. et al. | |
| 2013/0085413 A1 | 4/2013 | Tsamir et al. | |
| 2013/0085505 A1 | 4/2013 | Markey et al. | |
| 2013/0152746 A1 | 6/2013 | Kerboul et al. | |
| 2013/0172902 A1 | 7/2013 | Lightcap et al. | |
| 2013/0296734 A1 | 11/2013 | Bourlion et al. | |
| 2014/0094808 A1 | 4/2014 | Herndon | |
| 2014/0276002 A1 | 9/2014 | West et al. | |
| 2014/0276839 A1 * | 9/2014 | Forman | A61B 17/1622 |
| | | | 173/2 |
| 2014/0276950 A1 | 9/2014 | Smaby et al. | |
| 2014/0324044 A1 | 10/2014 | Haufe et al. | |
| 2015/0066030 A1 | 3/2015 | Mcginley et al. | |
| 2015/0148176 A1 | 5/2015 | Schroeder et al. | |
| 2015/0196306 A1 | 7/2015 | Del et al. | |
| 2015/0366624 A1 | 12/2015 | Kostrzewski et al. | |
| 2016/0012582 A1 | 1/2016 | Mauldin, Jr. et al. | |
| 2016/0074123 A1 | 3/2016 | Bly et al. | |
| 2016/0106392 A1 | 4/2016 | Manbachi et al. | |
| 2016/0302871 A1 | 10/2016 | Gregerson et al. | |
| 2016/0361069 A1 * | 12/2016 | Ardel | A61B 17/1626 |
| 2016/0361070 A1 * | 12/2016 | Ardel | A61B 17/1617 |
| 2017/0007199 A1 | 1/2017 | Bourlion et al. | |
| 2017/0056116 A1 | 3/2017 | Kostrzewski, Phd | |
| 2017/0100822 A1 | 4/2017 | Cutler | |
| 2017/0360493 A1 | 12/2017 | Zucker et al. | |
| 2018/0008288 A1 * | 1/2018 | Prescott | A61B 17/1615 |
| 2018/0042514 A1 | 2/2018 | Verard et al. | |
| 2018/0098714 A1 | 4/2018 | Bourlion et al. | |
| 2018/0177556 A1 | 6/2018 | Noonan | |
| 2018/0242985 A1 | 8/2018 | Vipperman et al. | |
| 2019/0175886 A1 | 6/2019 | Abdelwahed et al. | |
| 2019/0201011 A1 | 7/2019 | Del et al. | |
| 2019/0388173 A1 | 12/2019 | Pak et al. | |
| 2020/0324408 A1 * | 10/2020 | Bourlion | A61B 34/76 |
| 2020/0337782 A1 | 10/2020 | Glassman et al. | |
| 2021/0068905 A1 | 3/2021 | Quaid et al. | |
| 2021/0282862 A1 | 9/2021 | Bourlion et al. | |
| 2021/0298795 A1 | 9/2021 | Bowling et al. | |
| 2022/0022891 A1 | 1/2022 | Del et al. | |
| 2022/0079655 A1 * | 3/2022 | Zucker | A61B 18/14 |
| 2022/0104901 A1 | 4/2022 | Lawrie | |
| 2022/0168048 A1 | 6/2022 | Shoham et al. | |
| 2022/0175455 A1 | 6/2022 | Ungi et al. | |
| 2022/0175462 A1 | 6/2022 | Turgeman et al. | |
| 2022/0218421 A1 | 7/2022 | Junio et al. | |
| 2022/0233250 A1 | 7/2022 | Bette et al. | |
| 2022/0361896 A1 | 11/2022 | Bette et al. | |
| 2022/0361897 A1 | 11/2022 | Chen et al. | |
| 2022/0409214 A1 | 12/2022 | Lorian et al. | |
| 2023/0088846 A1 | 3/2023 | Laing et al. | |
| 2023/0095197 A1 | 3/2023 | Chandanson et al. | |
| 2023/0134461 A1 | 5/2023 | Casey et al. | |
| 2024/0237994 A1 | 7/2024 | Chandanson et al. | |

FOREIGN PATENT DOCUMENTS

| | | | | |
|---|---|---|---|---|
| CN | 107921554 A | 4/2018 | | |
| CN | 110882037 A | 3/2020 | | |
| CN | 118251181 A | 6/2024 | | |
| DE | 102010042012 A1 | 4/2012 | | |
| DE | 102011083360 A1 | 3/2013 | | |
| EP | 1474046 A1 | 11/2004 | | |
| EP | 3319539 A1 | 5/2018 | | |
| EP | 3525696 A1 | 8/2019 | | |
| EP | 3761870 A1 | 1/2021 | | |
| EP | 3883491 A1 | 9/2021 | | |
| FR | 2795624 A1 | 1/2001 | | |
| FR | 3034643 A1 | 10/2016 | | |
| JP | 2005525150 A | 8/2005 | | |
| JP | 2016518878 A | 6/2016 | | |
| WO | WO-03068076 A1 | 8/2003 | | |
| WO | WO-2014146090 A1 | 9/2014 | | |
| WO | WO-2015006296 A1 | 1/2015 | | |
| WO | WO-2016043676 A1 | 3/2016 | | |
| WO | WO-2016162634 A1 | 10/2016 | | |
| WO | WO-2016199152 A1 | 12/2016 | | |
| WO | WO-2019002578 A1 | 1/2019 | | |
| WO | WO-2019081850 A1 | 5/2019 | | |
| WO | WO-2019110119 A1 | 6/2019 | | |
| WO | WO-2020000038 A1 | 1/2020 | | |
| WO | WO-2020097481 A1 | 5/2020 | | |
| WO | WO-2021046247 A1 | 3/2021 | | |
| WO | WO-2021111439 A1 * | 6/2021 | | A61B 17/1622 |
| WO | WO-2021178706 A1 | 9/2021 | | |
| WO | WO-2022170185 A1 | 8/2022 | | |

(56) References Cited

FOREIGN PATENT DOCUMENTS

OTHER PUBLICATIONS

U.S. Appl. No. 16/757,937 now U.S. Pat. No. 11,399,902, Apr. 21, 2020 / Aug. 2, 2022.
U.S. Appl. No. 17/334,566 now U.S. Pat. No. 11,344,372, May 28, 2021 / May 31, 2022.
U.S. Appl. No. 17/659,167, filed Apr. 13, 2022.
U.S. Appl. No. 17/661,719, filed May 2, 2022.
U.S. Appl. No. 17/781,578, filed Jun. 1, 2022.
U.S. Appl. No. 17/935,853, filed Sep. 27, 2022.
U.S. Appl. No. 18/518,428, filed Nov. 22, 2023.
U.S. Appl. No. 18/622,512, filed Mar. 29, 2024.
International Search Report & Written Opinion dated Aug. 31, 2022 in Int'l PCT Patent Appl. Serial No. PCT/EP2022/061868 (0310).
International Search Report & Written Opinion dated Dec. 15, 2022 in Int'l PCT Patent Appl. No. PCT/IB2022/059201 (0410).
International Search Report and Written Opinion for PCT Application No. PCT/IL2020/051241, mailed Mar. 22, 2021, 13 pages (0810).
International Search Report and Written Opinion for PCT Application No. PCT/IL2022/050585, mailed Nov. 3, 2022, 15 pages (0910).
International Search Report for PCT Application No. PCT/FR2015/050241 mailed May 4, 2015, 08 Pages (0510).
Int'l Search Report & Written Opinion dated Jan. 7, 2019 in Int'l PCT Patent Appl. Serial No. PCT/FR2018/052640.
Aly, et al. "On ultrasound imaging for guided screw insertion in spinal fusion surgery," Ultrasound in Medicine & Biology, vol. 37(4): 651-664 (Jan. 2011).
Balmer, et al., Characterization of the Electrical Conductivity of Bone and Its Correlation to Osseous Structure, Scientific Reports, 8:8601 (2018).

Chang, et al. "Proof of concept: in vitro measurement of correlation between radiodensity and ultrasound echo response of ovine vertebral bodies," Ultrasonics, vol. 51(3): 253-257 (2011).
International Search Report & Written Opinion dated Oct. 1, 2024 in Int'l PCT Patent Appl. Serial No. PCT/EP2024/017206.
Kantelhardt, et al. "Intra-osseous ultrasound for pedicle screw positioning in the subaxial cervical spine: an experimental study," Acta Neurochirurgica, vol. 152(4):655-661, (2010).
Kantelhardt, et al. "Intraosseous ultrasonography to X determine the accuracy of drill hole positioning prior to the placement of pedicle screws: an experimental study," Journal of Neurosurgery: Spine, vol. 11(6): 673-680, (Dec. 2009).
Kantelhardt, et al. "Intraosseous Ultrasound in the Placement of Pedicle Crews in the Lumbar Spine," Spine, vol. 34(4): 400-407, (2009).
Lou, E., Zhang, C., Le, L., Hill, D., Raso, J., Moreau, M & Hedden, D. (2010). Using ultrasound to guide the insertion of pedicle screws during scoliosis surgery. In Research into Spinal Deformities 7 (pp. 44-48). IOS Press. (Year: 2010).
Manbachi, et al. "Guided pedicle screw insertion: techniques and training," The Spine Journal, vol. 14(1): 165-179 (Year: 2014).
Mujagic, et al, "Development of a method for ultrasound-guided placement of pedicle screws," IEEE Transactions on Ultrasonics, Ferroelectrics, and Frequency Control, vol. 55(6):1267-1276 (Jun. 2008).
Raphael, et al. "A-Mode ultrasound guidance for pedicle screw advancement in ovine vertebral bodies," The Spine Journal, vol. 10(5): 422-432, (Feb. 2010).
Yamada, M., Moriya, H., Iino, T., Kasai, Y., Sudo, A., & Uchida, A. (2012). Ultrasonic measurement of bone thickness for spinal surgery. IEEE transactions on ultrasonics, ferroelectrics, and frequency control, vol. 59(9), 2077-2088 (Sep. 2012).

* cited by examiner

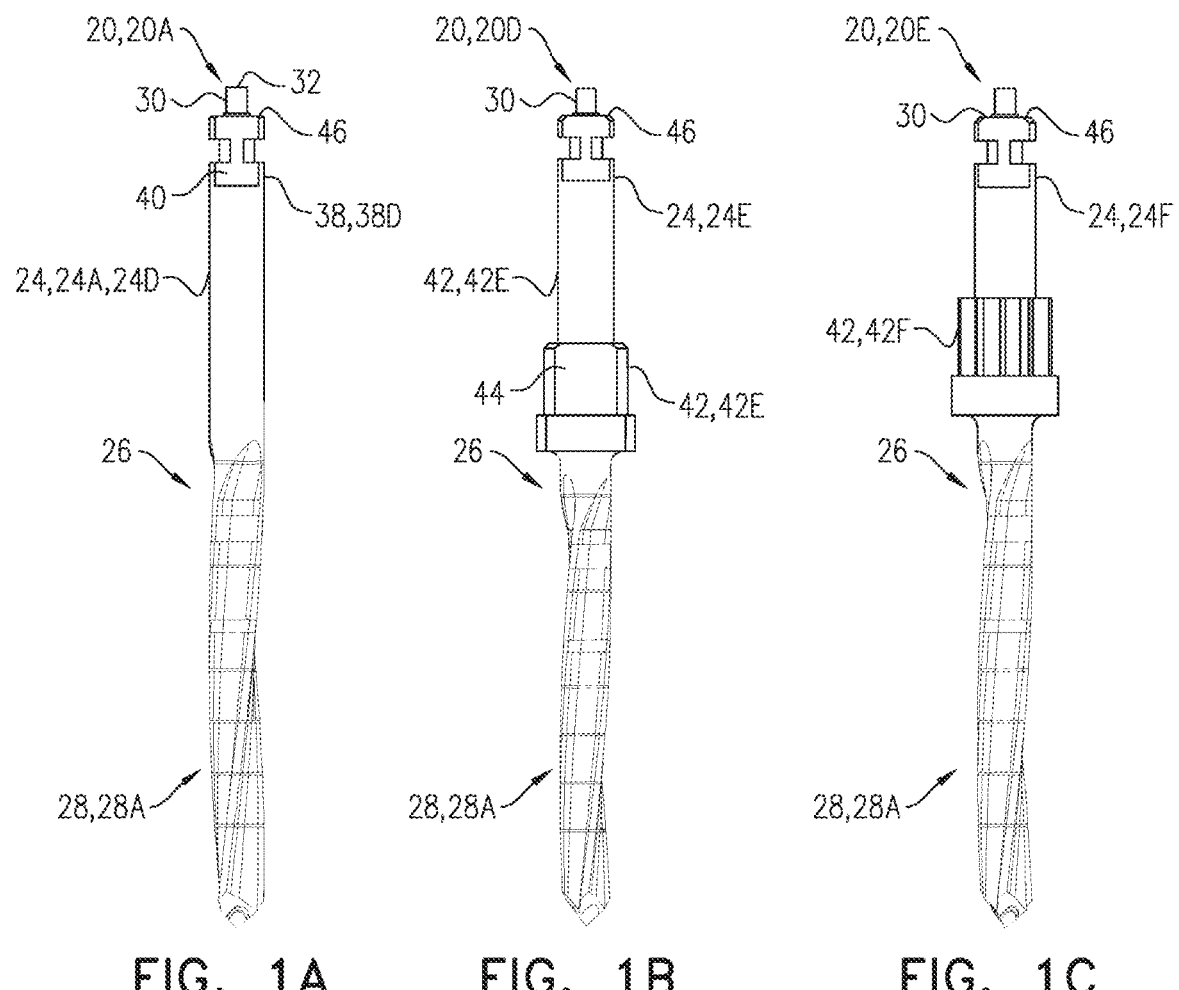
FIG. 1A        FIG. 1B        FIG. 1C
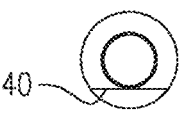        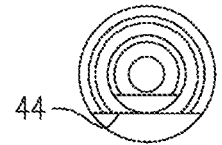        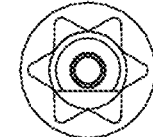
FIG. 2A        FIG. 2B        FIG. 2C

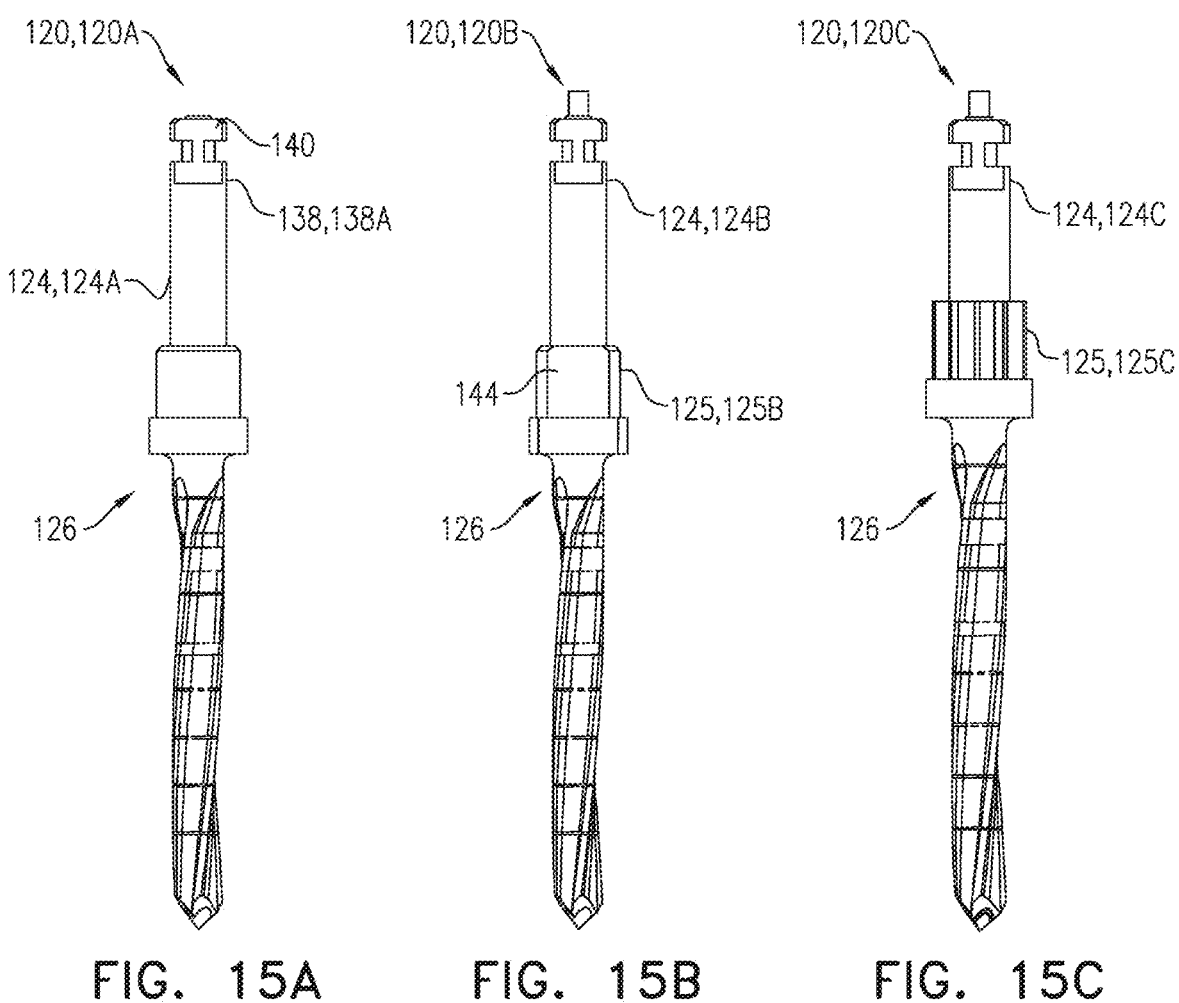
FIG. 15A          FIG. 15B          FIG. 15C
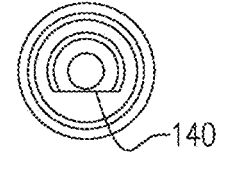
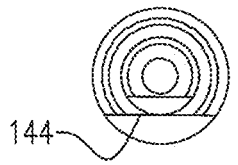
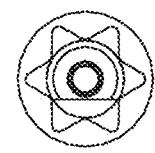
FIG. 16A          FIG. 16B          FIG. 16C

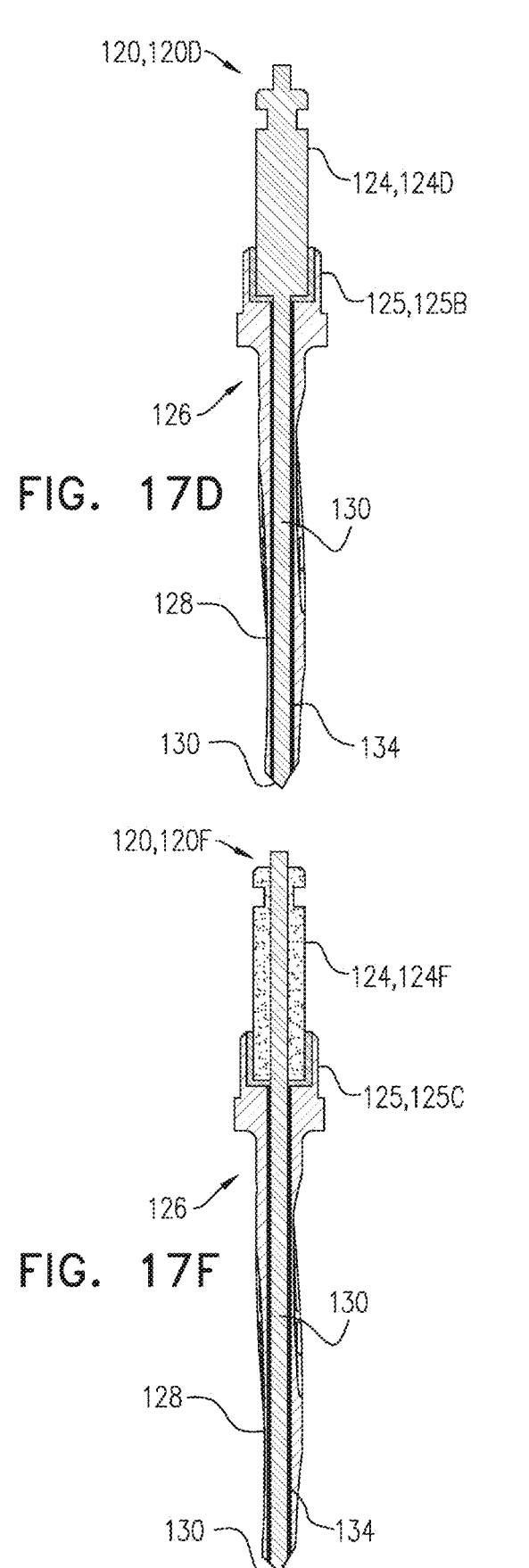
FIG. 17D
FIG. 17F
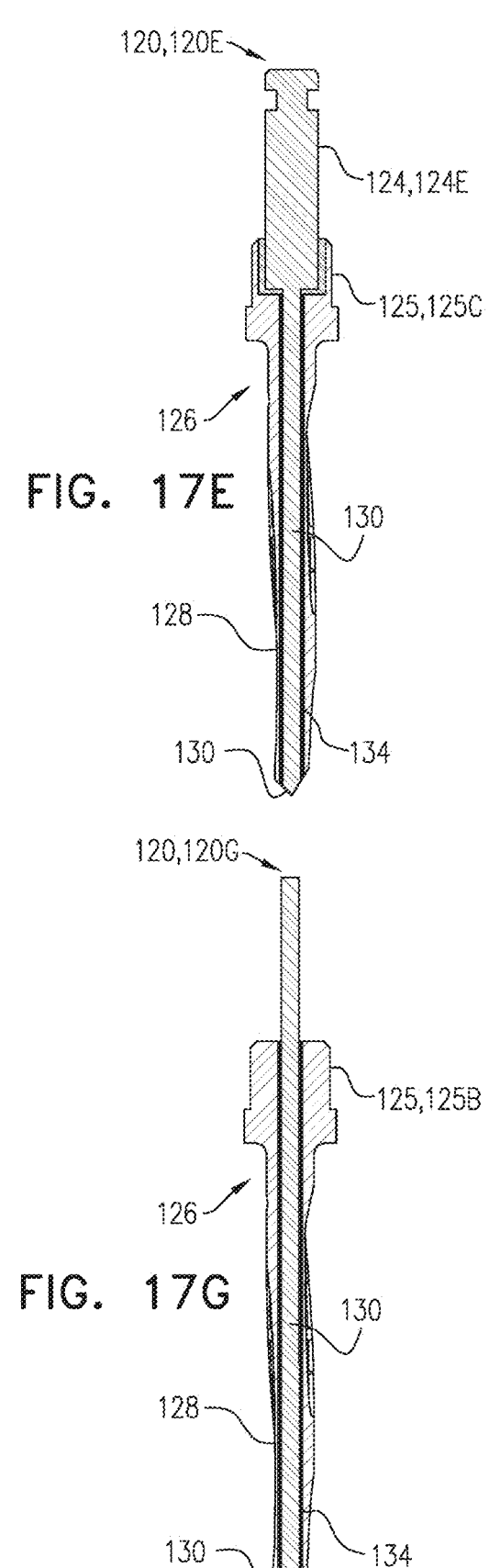
FIG. 17E
FIG. 17G

ELECTRICAL ROTATING CUTTING INSTRUMENTS AND SYSTEMS

CROSS-REFERENCE TO RELATED APPLICATIONS

This present application is a continuation of PCT/IB2022/058851, filed Jun. 2, 2022, which claims priority from U.S. Provisional Application 63/196,049, filed Jun. 2, 2021, and U.S. Provisional Application 63/208,619, filed Jun. 9, 2021. All of the above applications are assigned to the assignee of the present application and are incorporated herein by references

FIELD OF THE APPLICATION

The present invention relates generally to rotating cutting instruments, and specifically to electrical rotating cutting instruments.

BACKGROUND OF THE APPLICATION

Some surgical procedures, including dental and orthopedic procedures, include drilling through tissue that includes both bone and soft tissue. It is important for the surgeon to know at all times whether the tip of the rotating cutting instrument remains in bone or has come out of the bone and penetrated soft tissue.

U.S. Pat. No. 7,580,743 to Bourlion et al. describes a device that can be used to monitor the penetration of a penetration member into anatomical structures and, in particular, bone structures of a living body, the structures having at least two different electrical impedance areas. The device is characterized in that it comprises at least one impedance meter which can be connected to at least two electrodes, at least one of the electrodes being located at a distal end of the penetration member, and at least one alert device which can produce an alert signal if the impedance meter detects an impedance variation. The '743 patent also describes a penetration member for the device and to an electronic board for the device.

U.S. Pat. No. 10,064,630 to Forman et al. describes driver assemblies, drivers, rotating cutting instruments, and methods for determining information (such as impedances, voltages, voltage differences, and changes in such information) about biological material during a medical procedure.

PCT Publication WO 2021/111439 to Lorian et al., which is incorporated herein by reference, describes a drill bit that includes a connector, which includes a shank, configured to receive torque; a proximal electrically-conductive coupler, which is disposed at a distal end of the shank, rotationally fixed with respect to the shank; and a distal electrically-conductive coupler. The distal electrically-conductive coupler is rotationally fixed with respect to the proximal electrically-conductive coupler, electrically isolated from the proximal electrically-conductive coupler, and shaped so as to define a distal-electrically-conductive external contact surface. The drill bit further includes a drill shaft including an electrically-conductive outer electrode and an electrically-conductive inner electrode. Other embodiments are also described.

SUMMARY OF THE APPLICATION

Some applications of the present invention provide techniques for connecting at least two electrodes embedded in a single rotating cutting instrument, each having a polarity.

For example, the rotating cutting instrument may comprise a drill bit, such as a dental drill bit; or a burr, such as a dental burr.

Conventional dental drill systems use an external electrode, such as a grounded plate, to make the voltage or current measurements in the root canal length measurement system or the impedance measurement system. In some applications of the present invention, an electrical cutting system is provided that avoids the use of an external electrode, such as a ground electrode, by embedding an electrode, such as a grounded electrode, inside the rotating cutting instrument which is driven in rotation via a handpiece. This may avoid the need to coat the cutting surface of the drill with an electrically-insulating coating and/or to provide electrical insulation on the external casing of the handpiece.

In some applications, the electrical cutting system further comprises a central unit, which is configured to emit signals to and collect signals from the rotating cutting instrument and provide information to a user of electrical cutting system. In some of these applications, the electrical cutting system is configured such that the connection between the inner and outer electrodes and the central unit is made via a connecting system which is external to the handpiece, via the cap of the handpiece via an opening through the cap.

In some applications, the electrical cutting system is configured such that at least one electrode of the rotating cutting instrument protrudes out of the cap of the handpiece and the connection is made via a connecting system which is external to the handpiece, i.e., outside of the handpiece, typically on top of the handpiece, i.e., on a proximal side of the handpiece.

In some applications, the electrical cutting system is configured such that the connection is made via a cap which comprises one or more pushers configured to be in contact with at least one of the electrodes.

In some applications, the electrical cutting system is configured such that the connection between the inner and outer electrodes and the central unit of the drill system is made via a connecting system electrical in which at least a portion of one or both an inner-electrode wire and an outer-electrode wire passes through at least a portion of the handpiece.

In general, the electrical cutting systems described herein have low profiles that limit the bulkiness of the design and provide good oral access with the bipolar drill bit. This low profile is provided by the embedding of one or more electrical contacts within the handpiece, as described above, and/or by the arrangement of the electrical connection through the cap close alongside an external casing of the handpiece.

In some applications, a single rotating cutting instrument comprises at least three electrodes (e.g., at least two inner electrodes and one outer electrode), which are electrically isolated from one another within the rotating cutting instrument by electrical insulation.

There is therefore provided, in accordance with an Inventive Concept 1 of the present invention, a rotating cutting instrument including:

(a) a proximal electrically-conductive shank, configured to receive torque;

(b) an electrically-conductive outer electrode, which includes an electrically-conductive distal end portion that is shaped so as to penetrate tissue when rotated, and which is in electrical contact with the proximal electrically-conductive shank;

(c) an electrically-conductive inner electrode, which has a proximal end portion; and (d) an electrical isolation layer between the electrically-conductive outer electrode and the electrically-conductive inner electrode, so as to electrically isolate the electrically-conductive outer electrode and the electrically-conductive inner electrode from each other.

Inventive Concept 2. The rotating cutting instrument according to Inventive Concept 1, wherein the rotating cutting instrument includes a drill bit.

Inventive Concept 3. The rotating cutting instrument according to Inventive Concept 2, wherein the drill bit includes a milling drill bit.

Inventive Concept 4. The rotating cutting instrument according to Inventive Concept 1, wherein the rotating cutting instrument includes a burr.

Inventive Concept 5. The rotating cutting instrument according to Inventive Concept 1, wherein an external surface of the rotating cutting instrument is not coated with an electrically-insulating coating.

Inventive Concept 6. The rotating cutting instrument according to Inventive Concept 1, wherein the rotating cutting instrument includes exactly one electrically-conductive outer electrode and exactly one electrically-conductive inner electrode, and wherein the electrical isolation layer is radially between the exactly one electrically-conductive outer electrode and the exactly one electrically-conductive inner electrode.

Inventive Concept 7. The rotating cutting instrument according to Inventive Concept 1, wherein the rotating cutting instrument includes:

a plurality of electrically-conductive inner electrodes, which have respective proximal end portions; and a plurality of electrical isolation layers between the electrically-conductive outer electrode and the plurality electrically-conductive inner electrodes, so as to electrically isolate the electrically-conductive outer electrode and the electrically-conductive inner electrodes from one other.

Inventive Concept 8. The rotating cutting instrument according to Inventive Concept 1, wherein the rotating cutting instrument includes:

a plurality of electrically-conductive outer electrodes; and a plurality of electrical isolation layers, a first one of which is between a first one of the electrically-conductive outer electrodes and the electrically-conductive inner electrode, and a second one of which is between the first one of and a second one of the plurality of electrically-conductive outer electrodes, so as to electrically isolate the electrically-conductive outer electrodes and the electrically-conductive inner electrode from one other.

Inventive Concept 9. The rotating cutting instrument according to Inventive Concept 1, wherein the proximal electrically-conductive shank is integral with the electrically-conductive distal end portion.

Inventive Concept 10. The rotating cutting instrument according to Inventive Concept 1, wherein the proximal electrically-conductive shank and the electrically-conductive distal end portion include separate pieces that are directly mechanically and electrically coupled to each other.

Inventive Concept 11. The rotating cutting instrument according to Inventive Concept 1, wherein the proximal electrically-conductive shank and the electrically-conductive distal end portion include separate pieces that are indirectly mechanically and electrically coupled to each other.

Inventive Concept 12. The rotating cutting instrument according to Inventive Concept 1, wherein a proximal portion of the proximal electrically-conductive shank is shaped so as to define at least one lateral planar surface that is configured to receive the torque.

Inventive Concept 13. The rotating cutting instrument according to Inventive Concept 1, wherein a distal portion of the proximal electrically-conductive shank is shaped so as to define a circular cross-section except for at least one lateral planar surface that is configured to receive the torque.

Inventive Concept 14. The rotating cutting instrument according to Inventive Concept 1, wherein a distal portion of the proximal electrically-conductive shank is shaped so as to have a non-polygonal cross-section that is configured to receive the torque.

Inventive Concept 15. The rotating cutting instrument according to Inventive Concept 1, wherein the electrically-conductive inner electrode protrudes proximally from a proximal end of the electrically-conductive outer electrode.

Inventive Concept 16. The rotating cutting instrument according to Inventive Concept 1, wherein the proximal end portion of the electrically-conductive inner electrode is flush with a proximal end of the electrically-conductive outer electrode.

Inventive Concept 17. The rotating cutting instrument according to Inventive Concept 1, wherein the proximal end portion of the electrically-conductive inner electrode is disposed more distally than a proximal end of the electrically-conductive outer electrode.

Inventive Concept 18. The rotating cutting instrument according to Inventive Concept 1, wherein the electrical isolation layer protrudes proximally from the proximal end of the electrically-conductive outer electrode.

Inventive Concept 19. The rotating cutting instrument according to Inventive Concept 1, wherein the electrical isolation layer is flush with the proximal end of the electrically-conductive outer electrode.

Inventive Concept 20. The rotating cutting instrument according to Inventive Concept 1, wherein the electrical isolation layer is disposed more distally than the proximal end of the electrically-conductive outer electrode.

There is further provided, in accordance with an Inventive Concept 21 of the present invention, a method of using the rotating cutting instrument of any one of Inventive Concepts 1-20, the method including:

coupling the proximal electrically-conductive shank to a torque transmitter of a handpiece;

coupling the electrically-conductive outer electrode and the electrically-conductive inner electrode in electrical communication with a central unit;

activating the rotating cutting instrument to penetrate the electrically-conductive distal end portion of the electrically-conductive outer electrode into tissue; and using the central unit, measuring an electrical characteristic of the tissue sensed via the electrically-conductive outer electrode and the electrically-conductive inner electrode.

There is still further provided, in accordance with an Inventive Concept 22 of the present invention, an electrical cutting system for use with a surgical motor and a control unit for the surgical motor, the electrical cutting system including the rotating cutting instrument according to any one of Inventive Concepts 1-20, and further including:

(a) a handpiece including:

(i) an external casing;

(ii) a torque transmitter, configured to transmit the torque generated by the surgical motor to the proximal electrically-conductive shank when the rotating cutting instrument is coupled to the handpiece; and (iii) a cap, which is coupled to the external casing;

(b) a central unit, which is configured to emit signals to and collect signals from the rotating cutting instrument and provide information to a user of the electrical cutting system; and (c) an electrical connecting system configured to electrically connect the electrically-conductive outer electrode and the electrically-conductive inner electrode to the central unit, the electrical connecting system including:

(i) an outer-electrode electrical connector, which includes an outer-electrode electrical contact and an insulated electrical wire electrically coupled to the outer-electrode electrical contact and to the central unit; and (ii) an inner-electrode electrical connector, which includes an inner-electrode electrical contact and an insulated electrical wire electrically coupled to the inner-electrode electrical contact and to the central unit, wherein the handpiece is configured such that when the rotating cutting instrument is coupled to the handpiece, the outer-electrode electrical contact is in electrical contact with the electrically-conductive outer electrode, and the inner-electrode electrical contact is in electrical contact with the electrically-conductive inner electrode.

Inventive Concept 23. The electrical cutting system according to Inventive Concept 22, wherein the handpiece further includes a power transmission mechanism which is configured to directly or indirectly drive the torque transmitter.

Inventive Concept 24. The electrical cutting system according to Inventive Concept 22, wherein the handpiece further includes bearings, which are configured to guide rotation of the torque transmitter.

Inventive Concept 25. The electrical cutting system according to Inventive Concept 22, wherein the handpiece further includes a mechanical connection mechanism, which is configured to be mechanically coupled to the surgical motor.

Inventive Concept 26. The electrical cutting system according to Inventive Concept 22, wherein the electrical cutting system is configured to electrically connect the electrically-conductive inner electrode to ground.

Inventive Concept 27. The electrical cutting system according to Inventive Concept 22, wherein the electrical cutting system is configured to electrically connect the electrically-conductive outer electrode to ground.

Inventive Concept 28. The electrical cutting system according to Inventive Concept 22, wherein the handpiece is configured such that when the rotating cutting instrument is coupled to the handpiece, the outer-electrode electrical contact is in electrical contact with the electrically-conductive outer electrode via the proximal electrically-conductive shank.

Inventive Concept 29. The electrical cutting system according to Inventive Concept 22, wherein the handpiece is configured such that when the rotating cutting instrument is coupled to the handpiece, the distal end portion of the electrically-conductive outer electrode of the rotating cutting instrument extends distally out of the handpiece, and wherein the electrical connecting system is configured such that the inner-electrode electrical contact is disposed within the handpiece, and a portion of the inner-electrode electrical connector passes through a hole defined by a proximal end part of the cap.

Inventive Concept 30. The electrical cutting system according to Inventive Concept 29, wherein the inner-electrode electrical contact of the electrical connecting system is configured to be electrically coupled to the proximal end portion of the inner electrode.

Inventive Concept 31. The electrical cutting system according to Inventive Concept 30, wherein the inner-electrode electrical contact of the electrical connecting system is coated with an electrically-conductive coating.

Inventive Concept 32. The electrical cutting system according to Inventive Concept 30, wherein the proximal end portion of the inner electrode is coated with an electrically-conductive coating.

Inventive Concept 33. The electrical cutting system according to Inventive Concept 30, wherein the inner-electrode electrical contact of the electrical connecting system includes one or more contact elements selected from the group consisting of: one or more wires, one or more blades, one or more carbon contacts, and one or more brushes.

Inventive Concept 34. The electrical cutting system according to Inventive Concept 33, wherein the proximal end portion of the inner electrode is shaped so as to define one or more grooves, and wherein the one or more contact elements are configured to mechanically and electrically contact the one or more grooves.

Inventive Concept 35. The electrical cutting system according to Inventive Concept 30, wherein the inner-electrode electrical contact of the electrical connecting system is configured to be in punctual contact, planar contact, or non-planar contact with the proximal end portion of the inner electrode.

Inventive Concept 36. The electrical cutting system according to Inventive Concept 30, wherein the inner-electrode electrical contact of the electrical connecting system is configured to be coupled in electrical contact with the inner electrode, which proximally protrudes out of the outer electrode.

Inventive Concept 37. The electrical cutting system according to Inventive Concept 30, wherein the inner-electrode electrical contact of the electrical connecting system is configured to be coupled in electrical contact with the inner electrode, which is flush with the proximal end of the outer electrode.

Inventive Concept 38. The electrical cutting system according to Inventive Concept 30, wherein the inner-electrode electrical contact of the electrical connecting system is configured to be coupled in electrical contact with the inner electrode, which is located inside the outer electrode.

Inventive Concept 39. The electrical cutting system according to Inventive Concept 38, wherein the inner-electrode electrical contact of the electrical connecting system is insulated to avoid any electrical contact with the outer electrode of the rotating cutting instrument.

Inventive Concept 40. The electrical cutting system according to Inventive Concept 38, wherein the outer electrode, which is configured to receive the inner-electrode electrical connector of the electrical connecting system, is insulated to avoid any electrical contact with the inner-electrode electrical contact of the electrical connecting system.

Inventive Concept 41. The electrical cutting system according to Inventive Concept 22, wherein the cap is shaped so as to define a hole therethrough, wherein the inner-electrode electrical contact is configured to be coupled in electrical contact with the inner electrode of the rotating cutting instrument, and wherein the inner electrode protrudes out of the cap via the hole.

Inventive Concept 42. The electrical cutting system according to Inventive Concept 22, wherein the handpiece is configured such that when the rotating cutting instrument is coupled to the handpiece, the distal end portion of the electrically-conductive outer electrode of the rotating cutting instrument extends distally out of the handpiece, and wherein the electrical connecting system is configured such that the inner-electrode electrical contact is disposed within the handpiece.

Inventive Concept 43. The electrical cutting system according to Inventive Concept 42, wherein the inner-electrode electrical connector of the electrical connecting system includes a pusher, which is located inside the cap, which is shaped so as to define the inner-electrode electrical contact, and which is configured to push the inner-electrode electrical contact into electrical contact with the inner electrode.

Inventive Concept 44. The electrical cutting system according to Inventive Concept 43, wherein the pusher is configured to have a spring effect to maintain continuous contact between the inner-electrode electrical contact and the inner electrode.

Inventive Concept 45. The electrical cutting system according to Inventive Concept 43, wherein the inner-electrode electrical connector further includes a spring, which is configured to push the pusher.

Inventive Concept 46. The electrical cutting system according to Inventive Concept 43, wherein the inner electrode proximally protrudes out of the outer electrode.

Inventive Concept 47. The electrical cutting system according to Inventive Concept 43, wherein the inner electrode is flush with the proximal end of the electrically-conductive outer electrode.

Inventive Concept 48. The electrical cutting system according to Inventive Concept 43, wherein the inner electrode is disposed more distally than the proximal end of the electrically-conductive outer electrode.

Inventive Concept 49. The electrical cutting system according to Inventive Concept 48, wherein the pusher is insulated to avoid any electrical contact with the outer electrode of the rotating cutting instrument.

Inventive Concept 50. The electrical cutting system according to Inventive Concept 48, wherein the outer electrode is configured to receive the pusher and is insulated to avoid any electrical contact with the pusher.

Inventive Concept 51. The electrical cutting system according to Inventive Concept 42, wherein the inner-electrode electrical contact of the electrical connecting system includes at least one blade located inside the cap.

Inventive Concept 52. The electrical cutting system according to Inventive Concept 51, wherein the blade is configured to have a spring effect to maintain a continuous contact with the inner electrode.

Inventive Concept 53. The electrical cutting system according to Inventive Concept 51, wherein the inner electrode proximally protrudes out of the outer electrode.

Inventive Concept 54. The electrical cutting system according to Inventive Concept 22, wherein the handpiece is configured such that when the rotating cutting instrument is coupled to the handpiece, the distal end portion of the electrically-conductive outer electrode of the rotating cutting instrument extends distally out of the handpiece, and wherein the electrical connecting system is configured such that the outer-electrode electrical contact is disposed within the handpiece, and a portion of the outer-electrode electrical connector passes through a hole defined by a proximal end part of the cap.

Inventive Concept 55. The electrical cutting system according to Inventive Concept 54, wherein the outer electrode is located distally from the proximal end part of the cap.

Inventive Concept 56. The electrical cutting system according to Inventive Concept 22, wherein the handpiece is configured such that when the rotating cutting instrument is coupled to the handpiece, the distal end portion of the electrically-conductive outer electrode of the rotating cutting instrument extends distally out of the handpiece, and wherein the electrical connecting system is configured such that the outer-electrode electrical contact of the electrical connecting system is configured to be coupled in electrical contact with the outer electrode of the rotating cutting instrument, and wherein the outer electrode protrudes out of the cap.

Inventive Concept 57. The electrical cutting system according to Inventive Concept 22, wherein the handpiece is configured such that when the rotating cutting instrument is coupled to the handpiece, the distal end portion of the electrically-conductive outer electrode of the rotating cutting instrument extends distally out of the handpiece, and wherein the electrical connecting system is configured such that the outer-electrode electrical contact is disposed within the handpiece.

Inventive Concept 58. The electrical cutting system according to Inventive Concept 57, wherein the outer-electrode electrical contact of the electrical connecting system is configured to be coupled in direct electrical contact with the outer electrode of the rotating cutting instrument.

Inventive Concept 59. The electrical cutting system according to Inventive Concept 58, wherein the outer-electrode electrical contact of the electrical connecting system includes one or more contact elements selected from the group consisting of: one or more wires, one or more blades, one or more carbon contacts, and one or more brushes.

Inventive Concept 60. The electrical cutting system according to Inventive Concept 58, wherein the outer-electrode electrical contact of the electrical connecting system is coated.

Inventive Concept 61. The electrical cutting system according to Inventive Concept 58, wherein the outer electrode of the rotating cutting instrument is shaped so as to define at least one groove.

Inventive Concept 62. The electrical cutting system according to Inventive Concept 58, wherein the outer electrode of the rotating cutting instrument is coated with an electrically-conductive coating.

Inventive Concept 63. The electrical cutting system according to Inventive Concept 58, wherein the electrical connecting system includes springs configured to apply a controlled load between the outer-electrode electrical contact and the outer electrode of the rotating cutting instrument.

Inventive Concept 64. The electrical cutting system according to Inventive Concept 57, wherein the outer-electrode electrical connector of the electrical connecting system is in electrical contact with the cap.

Inventive Concept 65. The electrical cutting system according to Inventive Concept 64, wherein the cap is configured to serve as the outer-electrode electrical contact and to be coupled in direct electrical contact with the outer electrode of the rotating cutting instrument.

Inventive Concept 66. The electrical cutting system according to Inventive Concept 57, wherein the outer-electrode electrical connector of the electrical connecting system includes a pusher, which is located inside the cap, which is shaped so as to define the outer-electrode electrical connector, and which is configured to push the outer-electrode electrical contact into electrical contact with the outer electrode.

Inventive Concept 67. The electrical cutting system according to Inventive Concept 66, wherein the pusher is configured to have a spring effect to maintain continuous contact between the outer-electrode electrical contact and the outer electrode.

Inventive Concept 68. The electrical cutting system according to Inventive Concept 66, wherein the outer-electrode electrical contact further includes a spring, which is configured to push the pusher.

Inventive Concept 69. The electrical cutting system according to Inventive Concept 57, wherein the outer-electrode electrical contact of the electrical connecting system includes conductive bearings, and is configured to be coupled in electrical contact with the outer electrode of the rotating cutting instrument via the conductive bearings.

Inventive Concept 70. The electrical cutting system according to Inventive Concept 57, wherein the handpiece further includes a power transmission mechanism which is configured to directly or indirectly drive the torque transmitter, and wherein the outer-electrode electrical connector of the electrical connecting system is configured to be coupled in electrical contact with the outer electrode of the rotating cutting instrument via the power transmission mechanism.

Inventive Concept 71. The electrical cutting system according to Inventive Concept 57, wherein the outer-electrode electrical connector of the electrical connecting system is configured to be coupled in electrical contact with the outer electrode of the rotating cutting instrument via the torque transmitter.

Inventive Concept 72. The electrical cutting system according to Inventive Concept 71,
wherein the handpiece further includes bearings, which are configured to guide rotation of the torque transmitter, and
wherein the outer-electrode electrical connector is configured to be coupled in electrical contact with the outer electrode of the rotating cutting instrument via the torque transmitter and the bearings.

Inventive Concept 73. The electrical cutting system according to Inventive Concept 71, wherein the torque transmitter is configured to be coupled in direct electrical contact with the outer electrode of the rotating cutting instrument.

Inventive Concept 74. The electrical cutting system according to Inventive Concept 71, wherein the torque transmitter includes one or more contact elements, and is configured to be coupled in indirect electrical contact with the outer electrode of the rotating cutting instrument via the one or more contact elements, the one or more contact elements selected from the group consisting of one or more blades, one or more wires, one or more carbon contacts, and one or more brushes.

Inventive Concept 75. The electrical cutting system according to Inventive Concept 71, wherein the torque transmitter includes a pin and spring system, and is configured to be coupled in indirect electrical contact with the outer electrode of the rotating cutting instrument via the pin and spring system.

Inventive Concept 76. The electrical cutting system according to Inventive Concept 57, wherein the outer-electrode electrical connector of the electrical connecting system is configured to be coupled in electrical contact with the outer electrode of the rotating cutting instrument via the external casing.

There is additionally provided, in accordance with an Inventive Concept 77 of the present invention, a method of using the electrical cutting system of any one of Inventive Concepts 22-76, the method including:
coupling the proximal electrically-conductive shank to the torque transmitter of the handpiece;
coupling the electrically-conductive outer electrode and the electrically-conductive inner electrode in electrical communication with the central unit;
activating the rotating cutting instrument to penetrate the electrically-conductive distal end portion of the electrically-conductive outer electrode into tissue; and
using the central unit, measuring an electrical characteristic of the tissue sensed via the electrically-conductive outer electrode and the electrically-conductive inner electrode.

There is yet additionally provided, in accordance with an Inventive Concept 78 of the present invention, a rotating cutting instrument including:
(a) an electrically-conductive outer electrode, which includes:
(i) an electrically conductive distal end portion that is shaped so as to penetrate tissue when rotated; and
(ii) an electrically-conductive proximal portion, configured to receive torque;
(b) an electrically-conductive inner electrode; and
(c) an electrical isolation layer between the electrically-conductive outer electrode and the electrically-conductive inner electrode, so as to electrically isolate the electrically-conductive outer electrode and the electrically-conductive inner electrode from each other.

Inventive Concept 79. The rotating cutting instrument according to Inventive Concept 78, wherein the rotating cutting instrument includes a drill bit.

Inventive Concept 80. The rotating cutting instrument according to Inventive Concept 79, wherein the drill bit includes a milling drill bit.

Inventive Concept 81. The rotating cutting instrument according to Inventive Concept 78, wherein the rotating cutting instrument includes a burr.

Inventive Concept 82. The rotating cutting instrument according to Inventive Concept 78, wherein an external surface of the rotating cutting instrument is not coated with an electrically-insulating coating.

Inventive Concept 83. The electrical cutting system according to Inventive Concept 78, wherein a proximal end portion of the inner electrode is coated with an electrically-conductive coating.

Inventive Concept 84. The rotating cutting instrument according to Inventive Concept 78, wherein the rotating cutting instrument includes exactly one electrically-conductive outer electrode and exactly one electrically-conductive inner electrode, and wherein the electrical isolation layer is radially between the exactly one electrically-conductive outer electrode and the exactly one electrically-conductive inner electrode.

Inventive Concept 85. The rotating cutting instrument according to Inventive Concept 78, wherein the electrically-conductive proximal portion of the electrically-conductive outer electrode is shaped so as to define a circular cross-section except for at least one lateral planar surface that is configured to receive the torque.

Inventive Concept 86. The rotating cutting instrument according to Inventive Concept 78, wherein the electrically-conductive proximal portion of the electrically-conductive outer electrode is shaped so as to have a non-polygonal cross-section that is configured to receive the torque.

Inventive Concept 87. The rotating cutting instrument according to Inventive Concept 78, wherein the rotating cutting instrument includes:

a plurality of electrically-conductive inner electrodes; and a plurality of electrical isolation layers between the electrically-conductive outer electrode and the plurality electrically-conductive inner electrodes, so as to electrically isolate the electrically-conductive outer electrode and the electrically-conductive inner electrodes from one other.

Inventive Concept 88. The rotating cutting instrument according to Inventive Concept 78, wherein the rotating cutting instrument includes:

a plurality of electrically-conductive outer electrodes; and a plurality of electrical isolation layers, a first one of which is between a first one of the electrically-conductive outer electrodes and the electrically-conductive inner electrode, and a second one of which is between the first one and a second one of the electrically-conductive outer electrodes, so as to electrically isolate the electrically-conductive outer electrodes and the electrically-conductive inner electrode from one other.

Inventive Concept 89. The rotating cutting instrument according to any one of Inventive Concepts 78-87, further including a shank.

Inventive Concept 90. The rotating cutting instrument according to Inventive Concept 89, wherein a proximal portion of the shank is shaped so as to define at least one lateral planar surface that is configured to receive the torque.

Inventive Concept 91. The rotating cutting instrument according to Inventive Concept 89, wherein the shank is electrically-conductive, electrically connected to the electrically-conductive inner electrode, electrically insulated from the outer electrode, and located proximal to the outer electrode.

Inventive Concept 92. The rotating cutting instrument according to Inventive Concept 91, wherein the proximal electrically-conductive shank is integral with the electrically-conductive inner electrode.

Inventive Concept 93. The rotating cutting instrument according to Inventive Concept 91, wherein the proximal electrically-conductive shank and the electrically-conductive inner electrode include separate pieces that are directly mechanically and electrically coupled to each other.

Inventive Concept 94. The rotating cutting instrument according to Inventive Concept 89, wherein the shank is not electrically conductive.

There is also provided, in accordance with an Inventive Concept 95 of the present invention, a method of using the rotating cutting instrument of any one of Inventive Concepts 78-94, the method including:

coupling the electrically-conductive proximal portion to a torque transmitter of a handpiece;

coupling the electrically-conductive outer electrode and the electrically-conductive inner electrode in electrical communication with a central unit;

activating the rotating cutting instrument to penetrate the electrically-conductive distal end portion of the electrically-conductive outer electrode into tissue; and using the central unit, measuring an electrical characteristic of the tissue sensed via the electrically-conductive outer electrode and the electrically-conductive inner electrode.

There is further provided, in accordance with an Inventive Concept 96 of the present invention, an electrical cutting system for use with a surgical motor and a control unit for the surgical motor, the electrical cutting system including the rotating cutting instrument according to any one of Inventive Concepts 78-94, and further including:

(a) a handpiece including:
(i) an external casing;
(ii) a torque transmitter, configured to transmit the torque generated by the surgical motor to the electrically-conductive outer electrode when the rotating cutting instrument is coupled to the handpiece; and
(iii) a cap, which is coupled to the external casing;

(b) a central unit, which is configured to emit signals to and collect signals from the rotating cutting instrument and provide information to a user of the electrical cutting system; and (c) an electrical connecting system configured to electrically connect the electrically-conductive outer electrode and the electrically-conductive inner electrode to the central unit, the electrical connecting system including:
(i) an outer-electrode electrical connector, which includes an outer-electrode electrical contact and an insulated electrical wire electrically coupled to the outer-electrode electrical contact and to the central unit; and
(ii) an inner-electrode electrical connector, which includes an inner-electrode electrical contact and an insulated electrical wire electrically coupled to the inner-electrode electrical contact and to the central unit,
wherein the handpiece is configured such that when the rotating cutting instrument is coupled to the handpiece, the outer-electrode electrical contact is in electrical contact with the electrically-conductive outer electrode, and the inner-electrode electrical contact is in electrical contact with the electrically-conductive inner electrode.

Inventive Concept 97. The electrical cutting system according to Inventive Concept 96, wherein the handpiece further includes a power transmission mechanism which is configured to directly or indirectly drive the torque transmitter.

Inventive Concept 98. The electrical cutting system according to Inventive Concept 96, wherein the handpiece further includes bearings, which are configured to guide rotation of the torque transmitter.

Inventive Concept 99. The electrical cutting system according to Inventive Concept 96, wherein the handpiece further includes a mechanical connection mechanism, which is configured to be mechanically coupled to the surgical motor.

Inventive Concept 100. The electrical cutting system according to Inventive Concept 96, wherein the electrical cutting system is configured to electrically connect the electrically-conductive inner electrode to ground.

Inventive Concept 101. The electrical cutting system according to Inventive Concept 96, wherein the electrical cutting system is configured to electrically connect the electrically-conductive outer electrode to ground.

Inventive Concept 102. The electrical cutting system according to Inventive Concept 96, wherein the inner-electrode electrical contact is configured to be directly electrically connected to the electrically-conductive inner electrode.

Inventive Concept 103. The electrical cutting system according to Inventive Concept 96, wherein the inner-electrode contact of the electrical connecting system is coated with an electrically-conductive coating.

Inventive Concept 104. The electrical cutting system according to Inventive Concept 96, wherein the rotating cutting instrument further includes an electrically-conductive shank, which is electrically connected to the electrically-conductive inner electrode and electrically insulated from the outer electrode, and wherein the inner-electrode electrical contact is configured to be electrically connected to the shank, such that the inner-electrode electrical contact is indirectly in electrical connection with the electrically-conductive inner electrode via the shank.

Inventive Concept 105. The electrical cutting system according to Inventive Concept 104, wherein the shank is coated with an electrically-conductive coating.

Inventive Concept 106. The electrical cutting system according to Inventive Concept 104, wherein the shank is shaped so as to define at least one groove.

Inventive Concept 107. The electrical cutting system according to Inventive Concept 104, wherein the inner-electrode electrical contact includes one or more contact elements selected from the group consisting of: blades, wires, carbon contacts, and brushes.

Inventive Concept 108. The electrical cutting system according to Inventive Concept 104, wherein the inner-electrode electrical contact includes springs configured to apply a controlled load on the shank.

Inventive Concept 109. The electrical cutting system according to Inventive Concept 104,
    wherein the handpiece is configured such that when the rotating cutting instrument is coupled to the handpiece, the distal end portion of the electrically-conductive outer electrode of the rotating cutting instrument extends distally out of the handpiece, and
    wherein the electrical connecting system is configured such that the inner-electrode electrical contact is disposed within the handpiece, and a portion of the inner-electrode electrical connector passes through a hole defined by a proximal end part of the cap.

Inventive Concept 110. The electrical cutting system according to Inventive Concept 104, wherein the inner-electrode electrical contact of the electrical connecting system is configured to be electrically coupled to the shank, wherein the cap is shaped so as to define a hole therethrough, and wherein the shank is located distally from a proximal end part of the cap, via the hole.

Inventive Concept 111. The electrical cutting system according to Inventive Concept 104, wherein the cap is shaped so as to define a hole therethrough, and wherein the inner-electrode electrical contact is configured to be electrically coupled to the shank via a portion of the shank which protrudes out of the cap.

Inventive Concept 112. The electrical cutting system according to Inventive Concept 96,
    wherein the handpiece is configured such that when the rotating cutting instrument is coupled to the handpiece, the distal end portion of the electrically-conductive outer electrode of the rotating cutting instrument extends distally out of the handpiece, and
    wherein the electrical connecting system is configured such that the inner-electrode electrical connector is disposed within the handpiece.

Inventive Concept 113. The electrical cutting system according to Inventive Concept 112,
    wherein the rotating cutting instrument further includes an electrically-conductive shank, which is electrically connected to the electrically-conductive inner electrode and electrically insulated from the outer electrode, and
    wherein the inner-electrode electrical connector of the electrical connecting system includes an axially-oriented pusher, which is located inside the cap, which is shaped so as to define the inner-electrode electrical contact, and which is configured to push the inner-electrode electrical contact into electrical contact with the shank, such that the inner-electrode electrical contact is indirectly in electrical connection with the electrically-conductive inner electrode via the shank.

Inventive Concept 114. The electrical cutting system according to Inventive Concept 112, wherein the inner-electrode electrical connector of the electrical connecting system includes an axially-oriented pusher, which is located inside the cap, which is shaped so as to define the inner-electrode electrical contact, and which is configured to push the inner-electrode electrical contact into direct electrical contact with the electrically-conductive inner electrode.

Inventive Concept 115. The electrical cutting system according to Inventive Concept 112,
    wherein the electrical connecting system includes one or more contact elements selected from the group consisting of: a laterally-oriented pusher, a brush, a wire, and a carbon contact,
    wherein the one or more contact elements are located inside the handpiece, and
    wherein the inner-electrode electrical contact of the electrical connecting system is configured to be electrically connected to the electrically-conductive inner electrode via the one or more contact elements.

Inventive Concept 116. The electrical cutting system according to Inventive Concept 115, wherein the inner-electrode electrical contact of the electrical connecting system is configured to be electrically connected to the electrically-conductive inner electrode via the one or more contact elements via direct contact.

Inventive Concept 117. The electrical cutting system according to Inventive Concept 115, wherein the rotating cutting instrument further includes an electrically-conductive shank,
    which is electrically connected to the electrically-conductive inner electrode and electrically insulated from the outer electrode, and
    wherein the inner-electrode electrical contact of the electrical connecting system is configured to be electrically connected to the electrically-conductive inner electrode via the one or more contact elements via the torque transmitter, which is electrically connected to the shank and insulated to the outer electrode.

Inventive Concept 118. The electrical cutting system according to Inventive Concept 96,
    wherein the handpiece is configured such that when the rotating cutting instrument is coupled to the handpiece, the distal end portion of the electrically-conductive outer electrode of the rotating cutting instrument extends distally out of the handpiece, and wherein the outer-electrode electrical connector of the electrical connecting system is disposed within the handpiece.

Inventive Concept 119. The electrical cutting system according to Inventive Concept 118, wherein the outer-electrode electrical contact of the electrical connecting system is configured to be coupled in direct electrical contact with the outer electrode of the rotating cutting instrument.

Inventive Concept 120. The electrical cutting system according to Inventive Concept 118, wherein the outer-electrode electrical contact of the electrical connecting system is configured to be coupled in electrical contact with the outer electrode of the rotating cutting instrument via the torque transmitter.

Inventive Concept 121. The electrical cutting system according to Inventive Concept 120, wherein the handpiece further includes bearings, which are configured to guide rotation of the torque transmitter, and wherein the outer-electrode electrical contact is configured to be coupled in electrical contact with the outer electrode of the rotating cutting instrument via the torque transmitter and the bearings.

Inventive Concept 122. The electrical cutting system according to Inventive Concept 120, wherein the outer electrode of the rotating cutting instrument is configured to be coupled in direct electrical contact with the torque transmitter.

Inventive Concept 123. The electrical cutting system according to Inventive Concept 120, wherein the outer electrode of the rotating cutting instrument is configured to be coupled in indirect electrical contact with the torque transmitter via a blade, brushes, or a pin and spring system.

Inventive Concept 124. The electrical cutting system according to any one of Inventive Concepts 22-76 or 96-123, wherein the wires of the electrical connecting system are configured to be guided onto the handpiece to transmit the electrical signal from the rotating cutting instrument to the central unit.

Inventive Concept 125. The electrical cutting system according to any one of Inventive Concepts 22-76 or 96-123, wherein the electrical connecting system includes wires that include a single piece.

Inventive Concept 126. The electrical cutting system according to any one of Inventive Concepts 22-76 or 96-123, wherein the electrical connecting system includes wires that include multiple pieces that are electrically connected to each other via one or more electrical connectors.

Inventive Concept 127. The electrical cutting system according to any one of Inventive Concepts 22-76 or 96-123, wherein the central unit is external to the control unit for the surgical motor.

Inventive Concept 128. The electrical cutting system according to Inventive Concept 127, wherein the electrical connecting system includes wires that are external to the handpiece.

Inventive Concept 129. The electrical cutting system according to Inventive Concept 127, wherein the electrical connecting system is configured such that at least a portion of the inner-electrode wire is disposed external to the handpiece.

Inventive Concept 130. The electrical cutting system according to Inventive Concept 127, wherein the electrical connecting system is configured such that at least a portion of the outer-electrode wire is disposed external to the handpiece.

Inventive Concept 131. The electrical cutting system according to any one of Inventive Concepts 22-76 or 96-123, wherein the electrical connecting system is configured such that at least a portion of the inner-electrode wire passes through at least a portion of the handpiece.

Inventive Concept 132. The electrical cutting system according to any one of Inventive Concepts 22-76 or 96-123, wherein the electrical connecting system is configured such that at least a portion of the outer-electrode wire passes through at least a portion of the handpiece.

Inventive Concept 133. The electrical cutting system according to any one of Inventive Concepts 22-76 or 96-123, wherein the central unit is embedded into the control unit for the surgical motor.

Inventive Concept 134. The electrical cutting system according to Inventive Concept 133, wherein the electrical connecting system is configured such that at least a portion of the inner-electrode wire is disposed external to the handpiece.

Inventive Concept 135. The electrical cutting system according to Inventive Concept 133, wherein the electrical connecting system is configured such that at least a portion of the outer-electrode wire is disposed external to the handpiece.

Inventive Concept 136. The electrical cutting system according to Inventive Concept 133, wherein the electrical connecting system includes wires that are internal to the handpiece.

Inventive Concept 137. The electrical cutting system according to Inventive Concept 133, wherein the electrical connecting system includes wires that are external to a wire of the surgical motor.

Inventive Concept 138. The electrical cutting system according to Inventive Concept 133, wherein the electrical connecting system includes wires that are internal to a wire of the surgical motor.

Inventive Concept 139. The electrical cutting system according to any one of Inventive Concepts 22-76 or 96-123, wherein the electrical signals from the rotating cutting instrument are transferred to the central unit via a wireless connection.

Inventive Concept 140. The electrical cutting system according to any one of Inventive Concepts 22-76 or 96-123, wherein the handpiece is configured such that when the rotating cutting instrument is coupled to the handpiece, the distal end portion of the electrically-conductive outer electrode of the rotating cutting instrument extends distally out of the handpiece, and wherein the electrical connecting system is configured such that the outer-electrode electrical contact of the electrical connecting system is in direct contact with the electrically-conductive outer electrode.

Inventive Concept 141. The electrical cutting system according to Inventive Concept 140, wherein the outer-electrode electrical contact of the electrical connecting system includes at least one carbon brush.

Inventive Concept 142. The electrical cutting system according to Inventive Concept 140, wherein the outer-electrode electrical contact of the electrical connecting system includes at least one blade.

Inventive Concept 143. The electrical cutting system according to Inventive Concept 140, wherein the outer-electrode electrical contact of the electrical connecting system includes at least one wire.

Inventive Concept 144. The electrical cutting system according to Inventive Concept 140, wherein the outer-electrode electrical contact of the electrical connecting system is coated with an electrically-conductive coating.

Inventive Concept 145. The electrical cutting system according to Inventive Concept 140, wherein the outer electrode of the rotating cutting instrument is shaped so as to define at least one groove.

Inventive Concept 146. The electrical cutting system according to Inventive Concept 140, wherein the outer electrode of the rotating cutting instrument is coated with an electrically-conductive coating.

Inventive Concept 147. The electrical cutting system according to Inventive Concept 140, wherein the electrical connecting system includes springs configured to apply a controlled load between the outer-electrode electrical contact and the outer electrode of the rotating cutting instrument.

Inventive Concept 148. The electrical cutting system according to any one of Inventive Concepts 22-76 or 96-123, wherein the electrical cutting system does not include any external electrodes mechanically separate from the rotating cutting instrument.

Inventive Concept 149. The electrical cutting system according to any one of Inventive Concepts 22-76 or 96-123, wherein the external casing of the handpiece does not include electrical insulation.

Inventive Concept 150. The electrical cutting system according to any one of Inventive Concepts 22-76 or 96-123, wherein the electrical connecting system includes a plurality of outer-electrode connectors.

Inventive Concept 151. The electrical cutting system according to any one of Inventive Concepts 22-76 or 96-123, wherein the outer-electrode electrical connector includes a plurality of outer-electrode electrical contacts.

Inventive Concept 152. The electrical cutting system according to any one of Inventive Concepts 22-76 or 96-123, wherein the electrical connecting system includes a plurality of inner-electrode connectors.

Inventive Concept 153. The electrical cutting system according to any one of Inventive Concepts 22-76 or 96-123, wherein the inner-electrode electrical connector includes a plurality of inner-electrode electrical contacts.

Inventive Concept 154. The electrical cutting system according to any one of Inventive Concepts 22, 29, 54, 96, 109, 110, and 111, wherein the electrical connecting system is configured to be clipped to the handpiece.

There is still further provided, in accordance with an Inventive Concept 155 of the present invention, a method of using the electrical cutting system of any one of Inventive Concepts 96-123, the method including:

coupling the electrically-conductive proximal portion to the torque transmitter of the handpiece;

coupling the electrically-conductive outer electrode and the electrically-conductive inner electrode in electrical communication with the central unit;

activating the rotating cutting instrument to penetrate the electrically-conductive distal end portion of the electrically-conductive outer electrode into tissue; and using the central unit, measuring an electrical characteristic of the tissue sensed via the electrically-conductive outer electrode and the electrically-conductive inner electrode.

The present invention will be more fully understood from the following detailed description of embodiments thereof, taken together with the drawings, in which:

BRIEF DESCRIPTION OF THE DRAWINGS

FIGS. 1A-C are schematic side-view illustrations of respective configurations of a rotating cutting instrument, in accordance with respective applications of the present invention;

FIGS. 2A-C are schematic top views of respective configurations of the cutting instrument of FIGS. 1A-C, respectively, in accordance with respective applications of the present invention;

FIGS. 15A-C are schematic side-view illustrations of respective configurations of a rotating cutting instrument, in accordance with respective applications of the present invention;

FIGS. 16A-C are schematic top views of respective configurations of the cutting instrument of FIGS. 15A-C, respectively, in accordance with respective applications of the present invention;

FIGS. 17D-G are schematic cross-sectional views of additional cutting instruments, in accordance with respective applications of the present invention;

DETAILED DESCRIPTION OF APPLICATIONS

Reference is made to the FIGS. 1A-C, which are schematic side-view illustrations of respective configurations of a rotating cutting instrument 20, in accordance with respective applications of the present invention.

Reference is also made to FIGS. 2A-C, which are schematic top views of respective configurations of cutting instrument 20, respectively, in accordance with respective applications of the present invention.

Figures 3A, 3B:
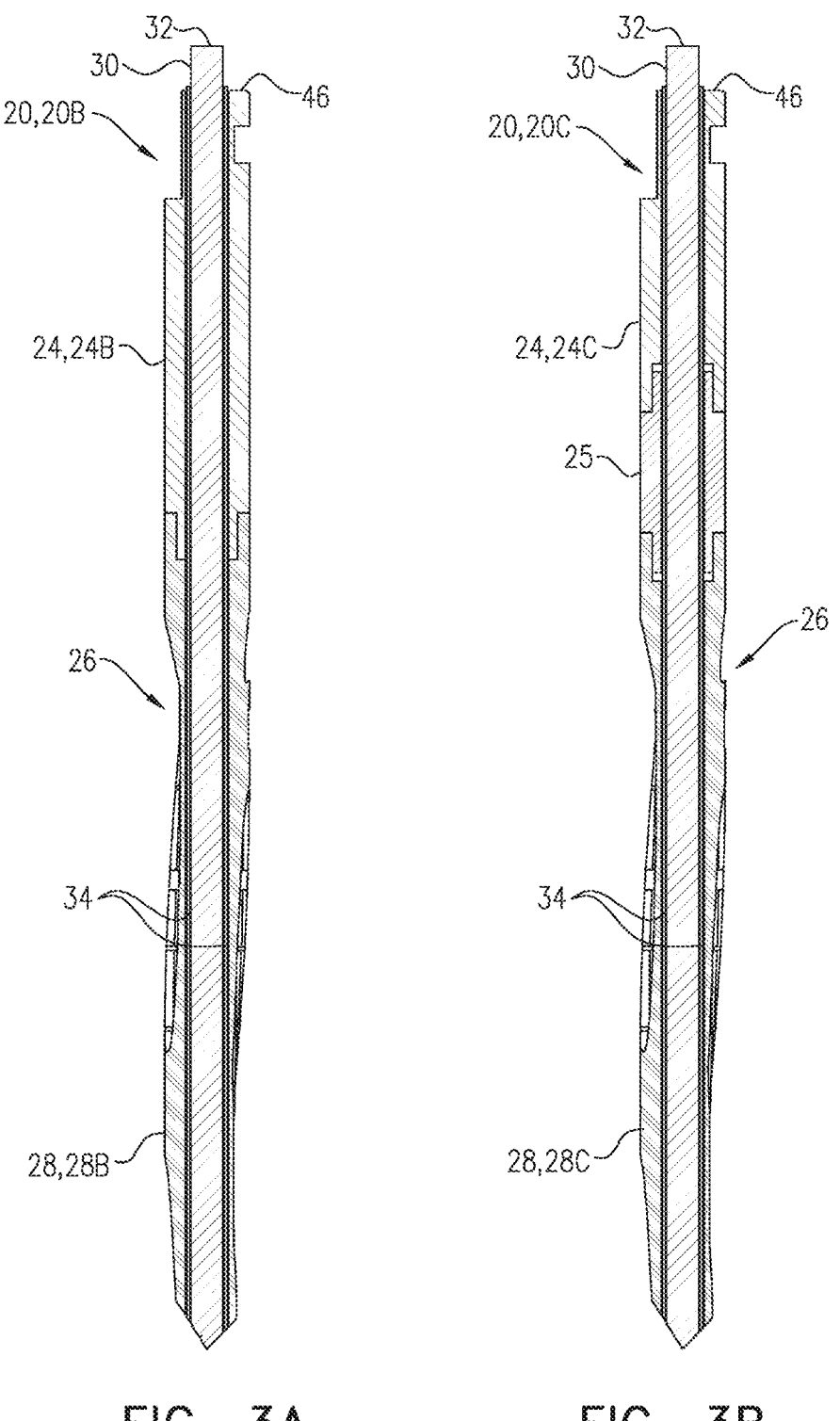
FIGS. 3A-B are schematic cross-sectional views of respective configurations of the cutting instrument of FIGS. 1A-C, in accordance with respective applications of the present invention.

Reference is further made to FIGS. 3A-B, which are schematic cross-sectional views of respective configurations of cutting instrument 20, in accordance with respective applications of the present invention.

In some applications of the present invention, rotating cutting instrument 20 comprises:

a proximal shank 24, which is configured to receive torque, and which is typically electrically-conductive, although it may be non-conductive in some configurations;

an electrically-conductive outer electrode 26, which comprises an electrically-conductive distal end portion 28 that is shaped so as to penetrate tissue when rotated, and which is in electrical contact with proximal electrically-conductive shank 24;

an electrically-conductive inner electrode 30, which has a proximal end portion 32; and an electrical isolation layer 34 between electrically-conductive outer electrode 26 and electrically-conductive inner electrode 30, so as to electrically isolate electrically-conductive outer electrode 26 and electrically-conductive inner electrode 30 from each other.

For some applications, rotating cutting instrument 20 comprises a drill bit, a burr, or a milling drill bit.

Outer electrode 26 is shaped so as to define a proximal end 46.

For some applications, such as shown in FIG. 1A, rotating cutting instrument 20 comprises a rotating cutting instrument 20, 20A, and proximal electrically-conductive shank 24 comprises a proximal electrically-conductive shank 24, 24A that is integral with electrically-conductive distal end portion 28, 28A.

For other applications, such as shown in FIG. 3A, rotating cutting instrument 20 comprises a rotating cutting instrument 20, 20B, and proximal electrically-conductive shank 24 comprises a proximal electrically-conductive shank 24, 24B and electrically-conductive distal end portion 28 comprises an electrically-conductive distal end portion 28, 28B, and proximal electrically-conductive shank 24, 24B and electrically-conductive distal end portion 28, 28B comprise separate pieces that are directly mechanically and electrically coupled to each other.

For still other applications, such as shown in FIG. 3B, rotating cutting instrument 20 comprises a rotating cutting instrument 20, 20C, and proximal electrically-conductive shank 24 comprises a proximal electrically-conductive shank 24, 24C and electrically-conductive distal end portion 28 comprises an electrically-conductive distal end portion 28, 28C, and proximal electrically-conductive shank 24, 24C and electrically-conductive distal end portion 28, 28C comprise separate pieces that are indirectly mechanically and electrically coupled to each other, such as by a coupler 25, e.g., comprising a cylinder or one or more wires.

For some applications, such as shown in FIGS. 1A and 2A, a proximal portion 38, 38D of proximal electrically-conductive shank 24, 24D is shaped so as to define at least one lateral planar surface 40 that is configured to receive the torque.

For some applications, such as shown in FIGS. 1B and 2B, rotating cutting instrument 20 comprises a rotating cutting instrument 20, 20D, and a distal portion 42, 42E of proximal electrically-conductive shank 24, 24E is shaped so as to define a circular cross-section (e.g., a cylinder, a cone, or another shape having a circular cross-section) except for at least one lateral planar surface 44 that is configured to receive the torque.

For some applications, distal portion 42, 42F of proximal electrically-conductive shank 24 is shaped so as to define a non-circular cross-section that is configured to receive the torque.

For some applications, such as shown in FIGS. 1C and 2C, rotating cutting instrument 20 comprises a rotating cutting instrument 20, 20E, and a distal portion 42, 42F of proximal electrically-conductive shank 24, 24F is shaped so as to have a non-polygonal cross-section that is configured to receive the torque (e.g., a star, e.g., a six-point star).

Reference is made to FIGS. 3A and 3B. For some applications, proximal shank 24 is not electrically conductive (i.e., is electrically insulative), and electrically-conductive outer electrode 26 is configured to be in electrical contact with outer-electrode electrical contact 73 of outer-electrode electrical connector 68, described hereinbelow with reference to FIGS. 8A-Q.

Figure 4:
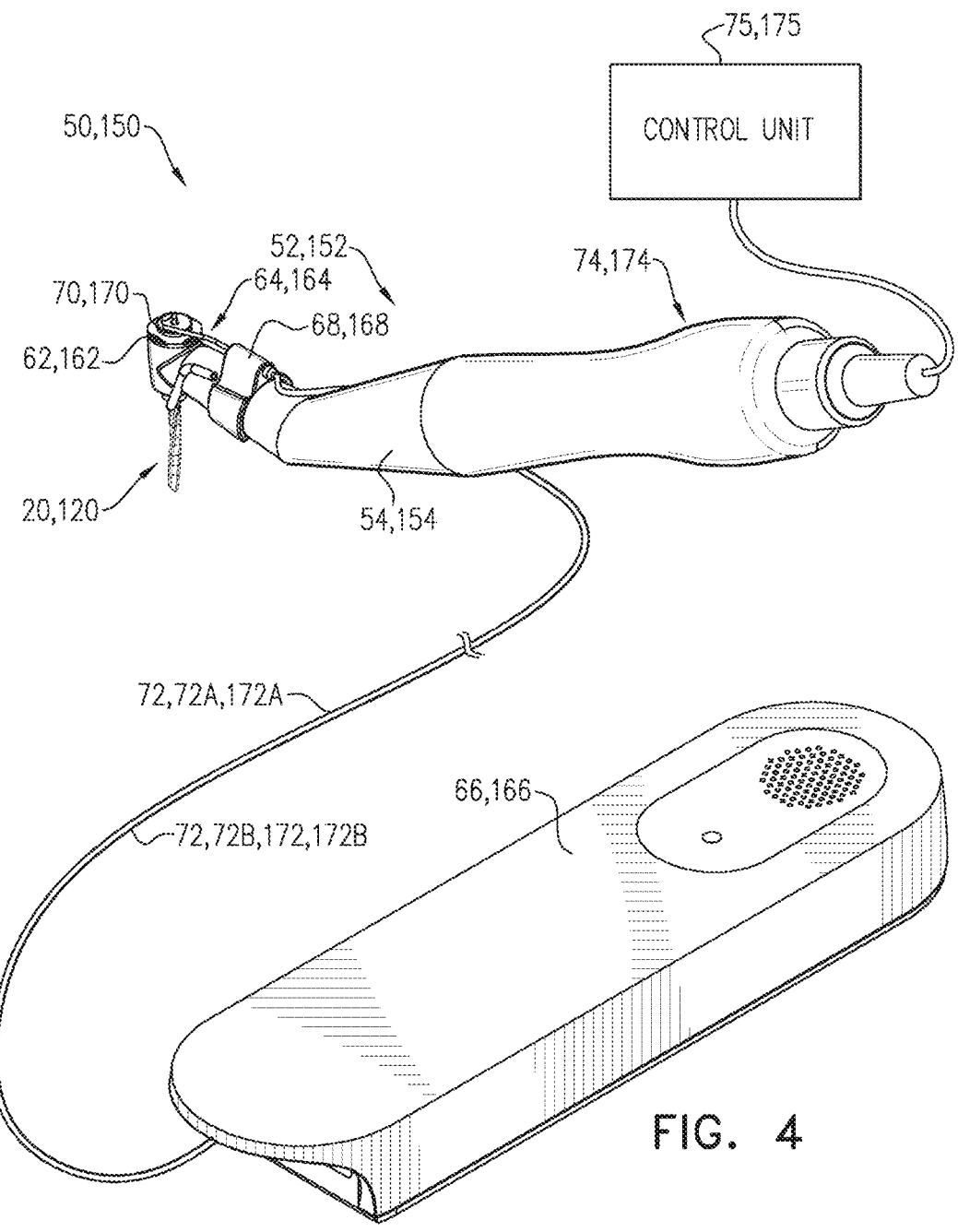
FIG. 4 is a schematic illustration of an electrical cutting system for use with a surgical motor and a control unit for the surgical motor, in accordance with some applications of the present invention.

Reference is now made to FIG. 4, which is a schematic illustration of an electrical cutting system 50 for use with a surgical motor 74 and a control unit 75 for surgical motor 74, in accordance with some applications of the present invention. Electrical cutting system 50 comprises rotating cutting instrument 20. Surgical motor 74 is configured to generate the torque and regulate a speed of rotating cutting instrument 20.

Electrical cutting system 50 further comprises:

a handpiece 52, which comprises an external casing 54; a torque transmitter 58, configured to transmit the torque generated by surgical motor 74 to proximal electrically-conductive shank 24 when rotating cutting instrument 20 is coupled to handpiece 52 (such as to distal portion 42 of proximal electrically-conductive shank 24); and a cap 62, which is coupled to external casing 54;

a central unit 66, which is configured to emit signals to and collect signals from rotating cutting instrument 20 and provide information to a user of electrical cutting system 50; and an electrical connecting system 64 configured to electrically connect electrically-conductive outer electrode 26 and electrically-conductive inner electrode 30 to central unit 66.

Typically, electrical cutting system 50 does not comprise any external electrodes mechanically separate from rotating cutting instrument 20, such as a grounded plate, a patch electrode, or a skin electrode. Instead, for some applications, electrical cutting system 50 is configured to make voltage or current measurements using outer electrode 26 and inner electrode 30 of rotating cutting instrument 20, without the need for an external electrode. This may avoid the need to coat the cutting surface of the drill with an electrically-insulated coating and/or to provide electrical insulation on external casing 54 of the handpiece.

Typically, external casing 54 of handpiece 52 does not comprise electrical insulation.

Typically, an external surface of rotating cutting instrument 20 is not coated with an electrically-insulating coating.

Typically, central unit 66 is configured sense electrical properties of the tissue penetrated by the rotating cutting instrument, such as impedance, change in impedance, voltage, or change in voltage. The sensed electrical properties may be used by the operator of handpiece 52 to which the rotating cutting instrument is coupled in order to monitor the penetration of the rotating cutting instrument into anatomical structures and, in particular, bone structures having at least two different electrical impedance areas, such as bone (e.g., cortical bone) and soft tissue. In addition, the sensed electrical properties enable the measurement of local electrical properties of the tissue, which are more difficult, if not impossible, to measure using a single electrode on the rotating cutting instrument and a remote external skin return electrode, as is known in the impedance measurement drill art.

Figure 5:
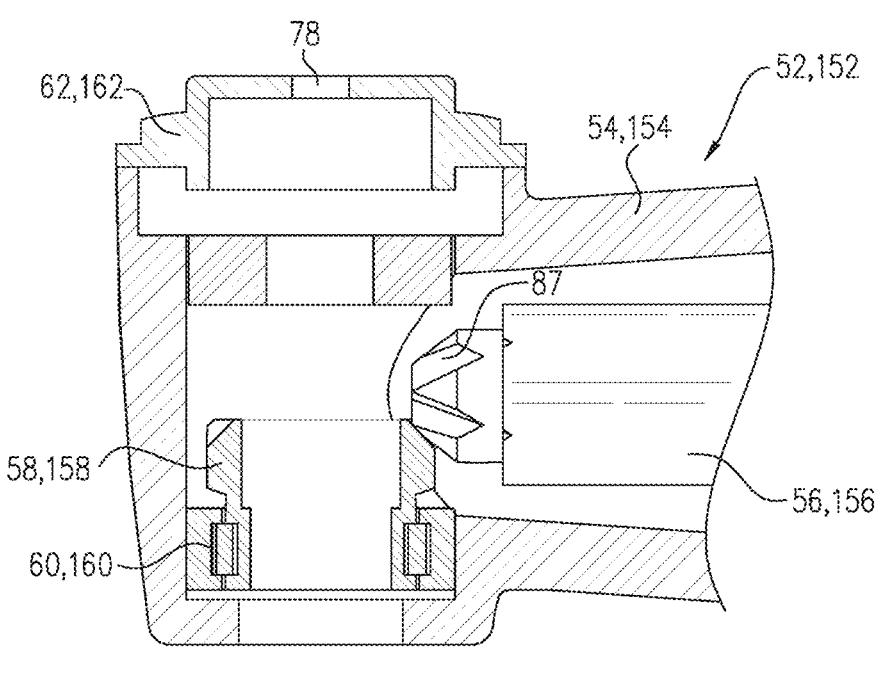
FIG. 5 is a schematic cross-sectional illustration of a distal portion of a handpiece of the electrical cutting system of FIG. 4, in accordance with an application of the present invention.

Reference is now made to FIG. 5, which is a schematic cross-sectional illustration of a distal portion of handpiece 52, in accordance with an application of the present invention. The configuration of the distal portion of handpiece 52 is appropriate for driving rotating cutting instrument 20, 20D, 20E, by driving the external surfaces of distal portion 42, 42E, 42F of proximal electrically-conductive shank 24, 24E, 24F, respectively.

For some applications, handpiece 52 further comprises a power transmission mechanism 56 which is configured to directly or indirectly drive torque transmitter 58. For example, power transmission mechanism 56 may comprise a rotating shaft and/or a gear.

For some applications, handpiece 52 further comprises bearings 60, which are configured to guide rotation of torque transmitter 58.

Figure 6:
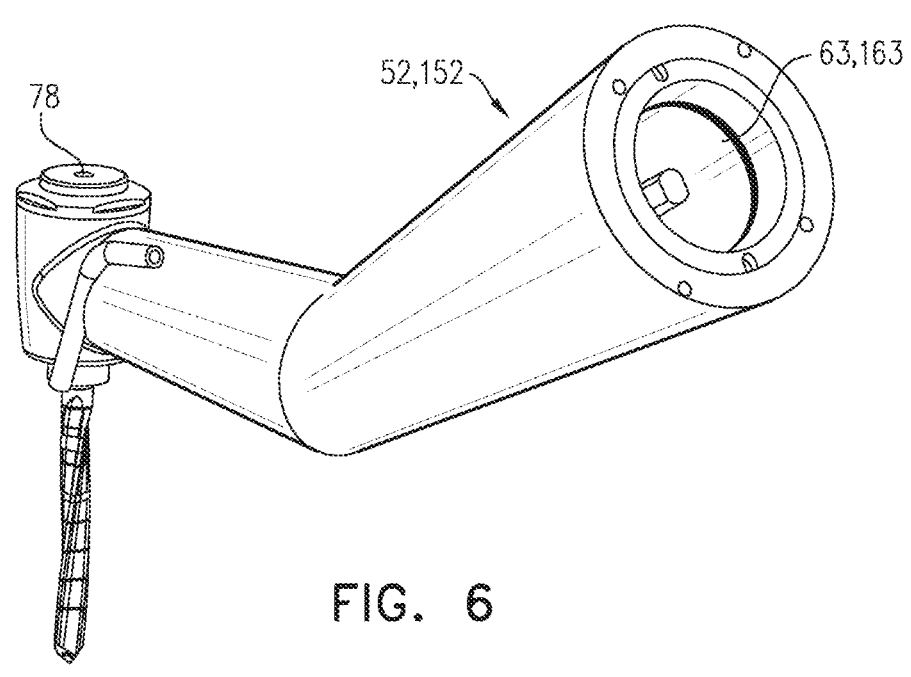
FIG. 6 is a schematic illustration of a distal portion of the handpiece of the electrical cutting system of FIG. 4, in accordance with an application of the present invention.

Reference is now made to FIG. 6, which is a schematic illustration of a distal portion of handpiece 52, in accordance with an application of the present invention. For some applications, handpiece 52 further comprises a mechanical connection mechanism 63, which is configured to be mechanically coupled to surgical motor 74.

Figure 7A:
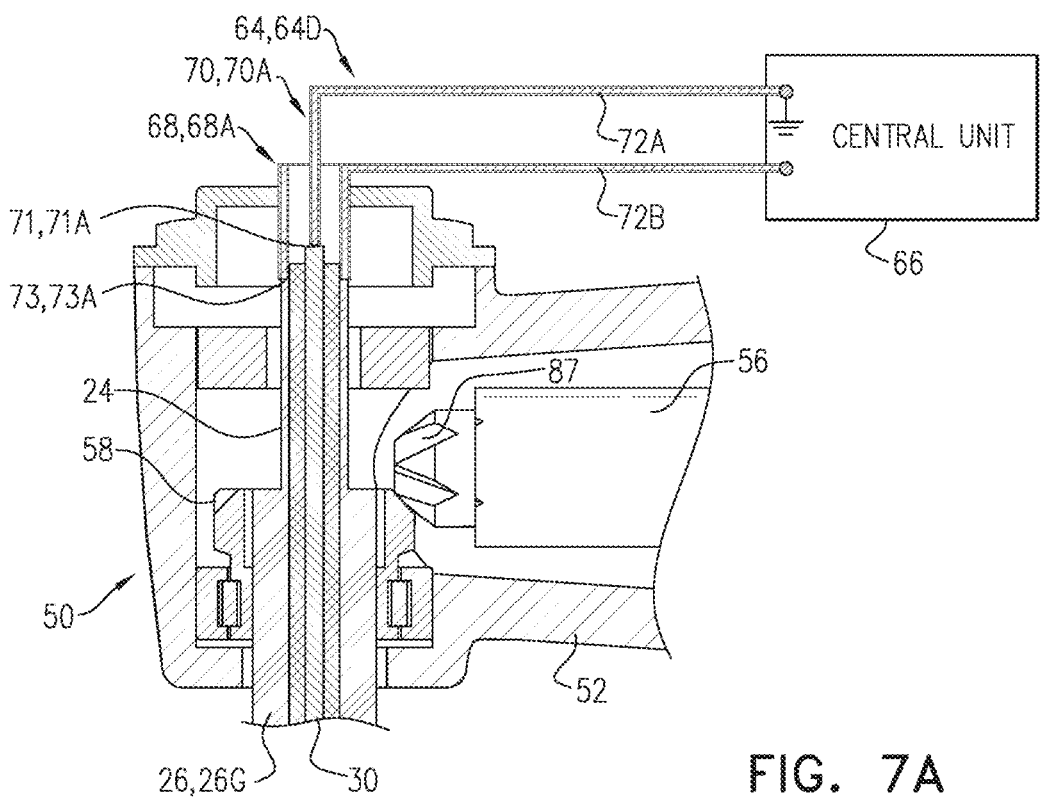
FIGS. 7A and 7B are schematic cross-sectional illustrations of respective configurations of a portion of the electrical cutting system of FIG. 4, including a portion of the handpiece and the central unit, in accordance with respective applications of the present invention.
Figure 7B:
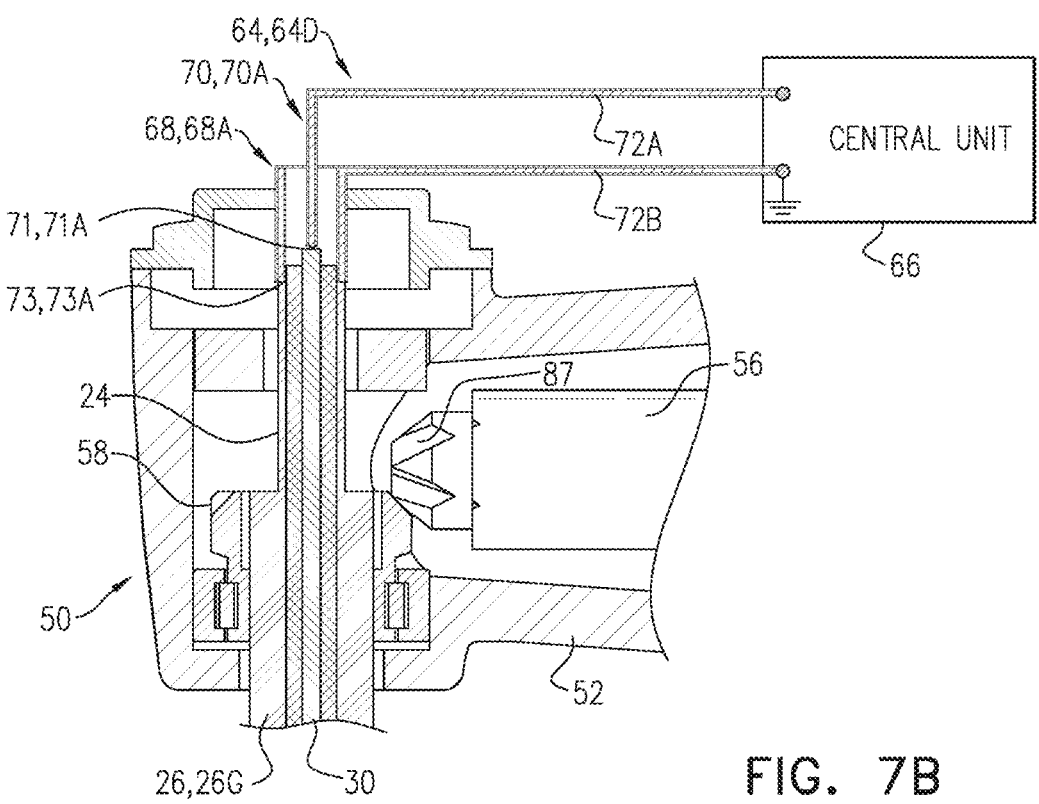

Reference is now made to FIGS. 7A and 7B, which are schematic cross-sectional illustrations of respective configurations of a portion of electrical cutting system 50, including a portion of handpiece 52 and central unit 66, in accordance with respective applications of the present invention.

Figure 8A:
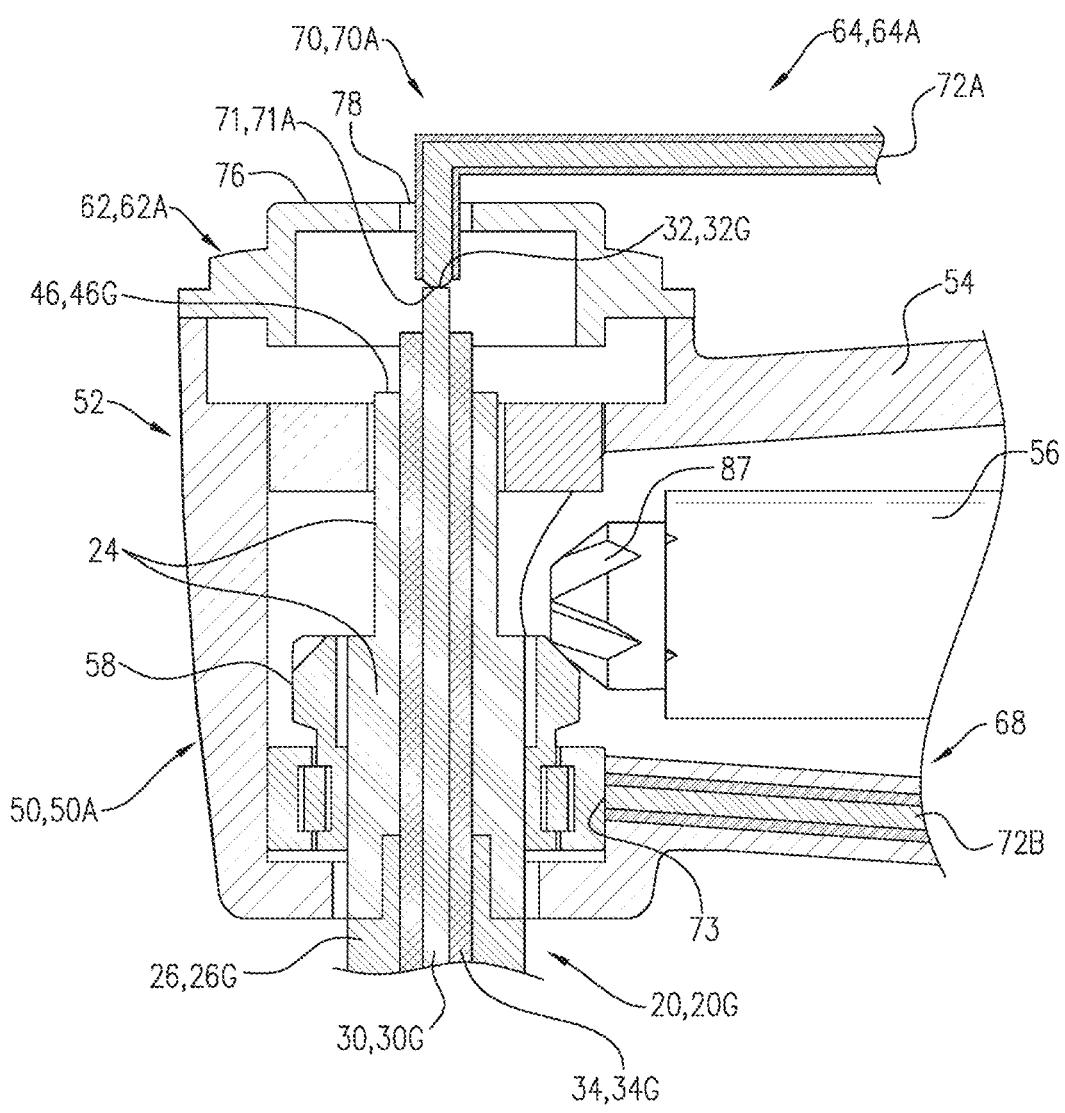
FIGS. 8A-Q are schematic cross-sectional illustrations of respective configurations of an electrical connecting system of the electrical cutting system of FIG. 4, in accordance with respective applications of the present invention.
Figure 8B:
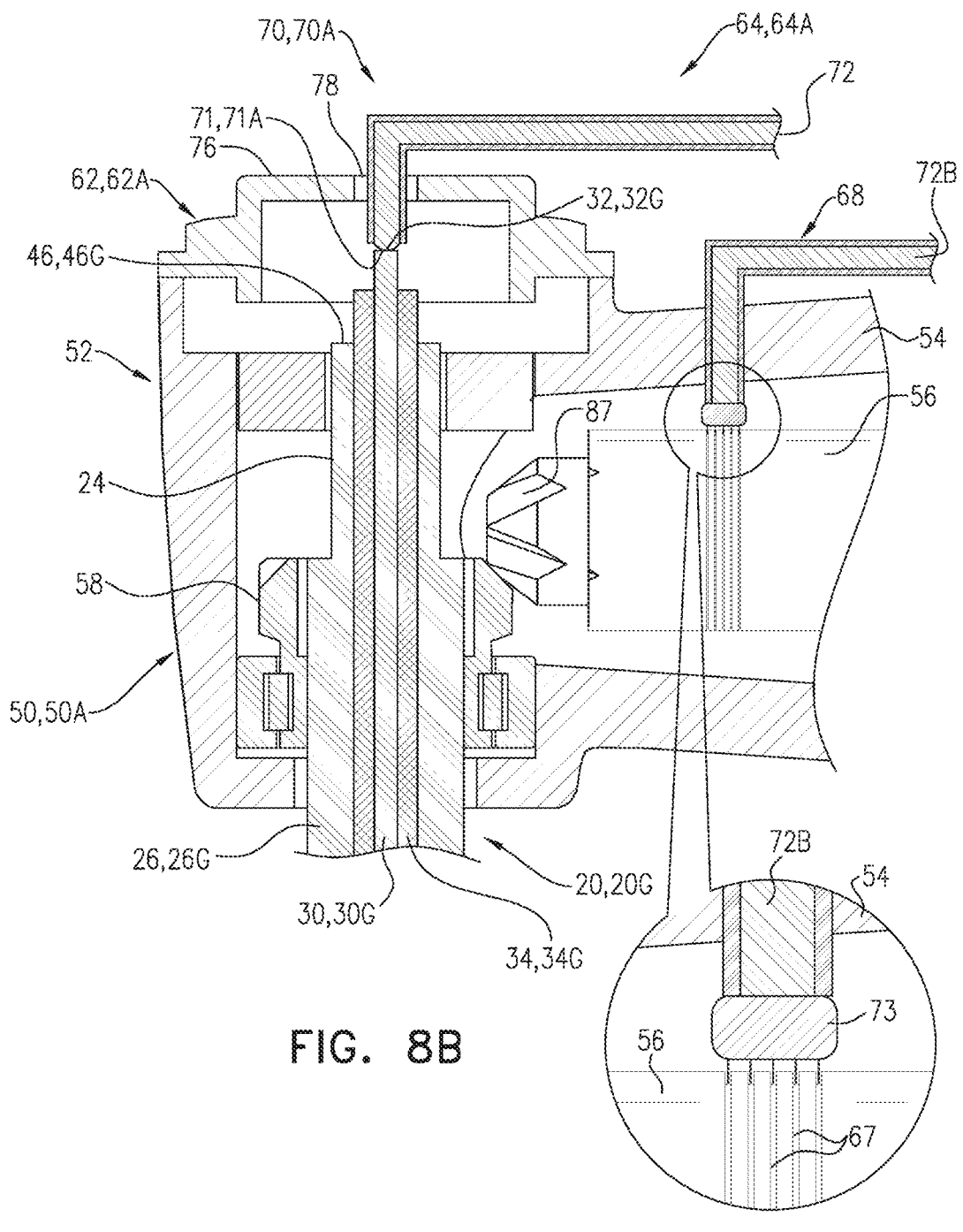
Figure 8C:
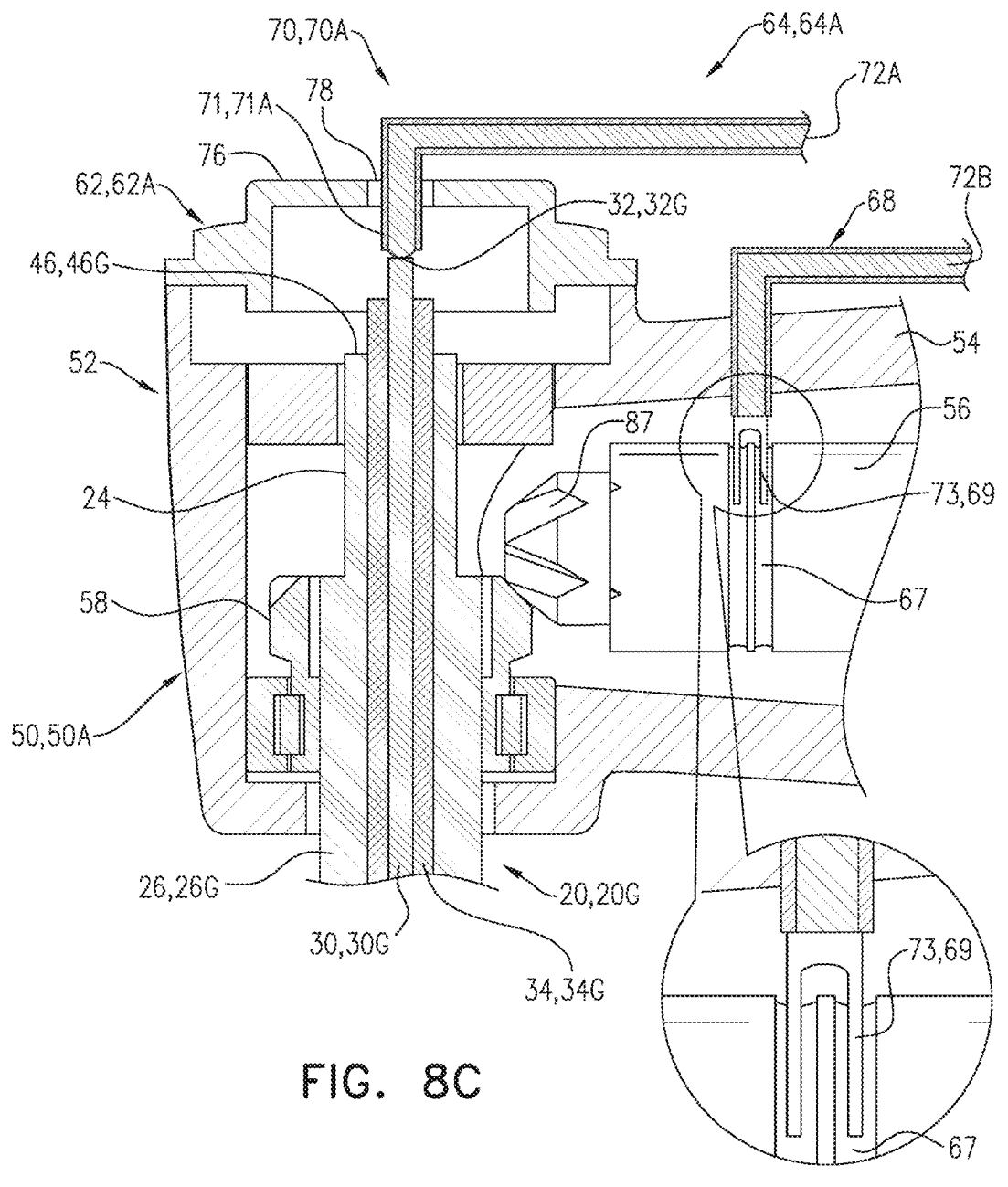
Figure 8D:
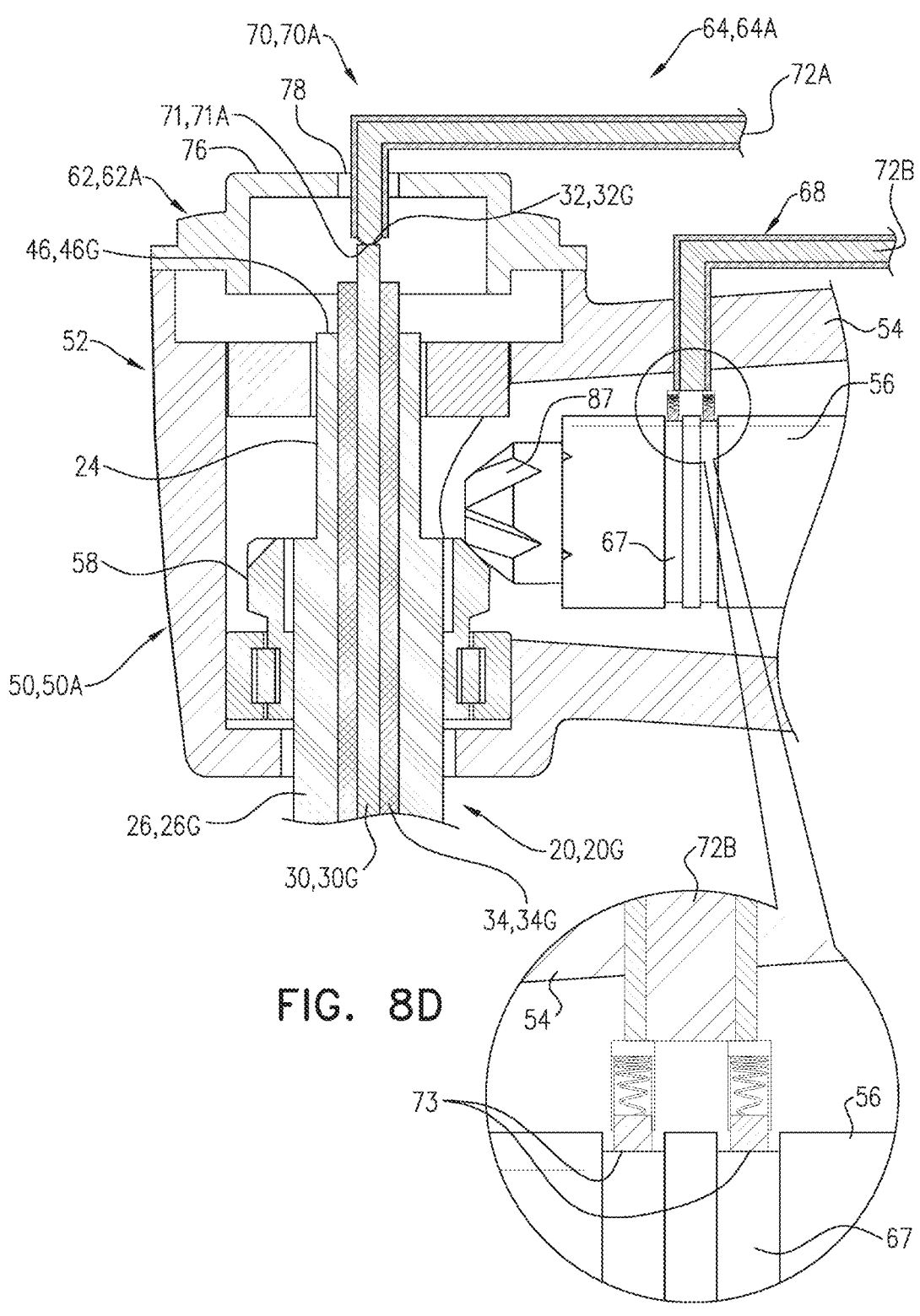
Figure 8E:
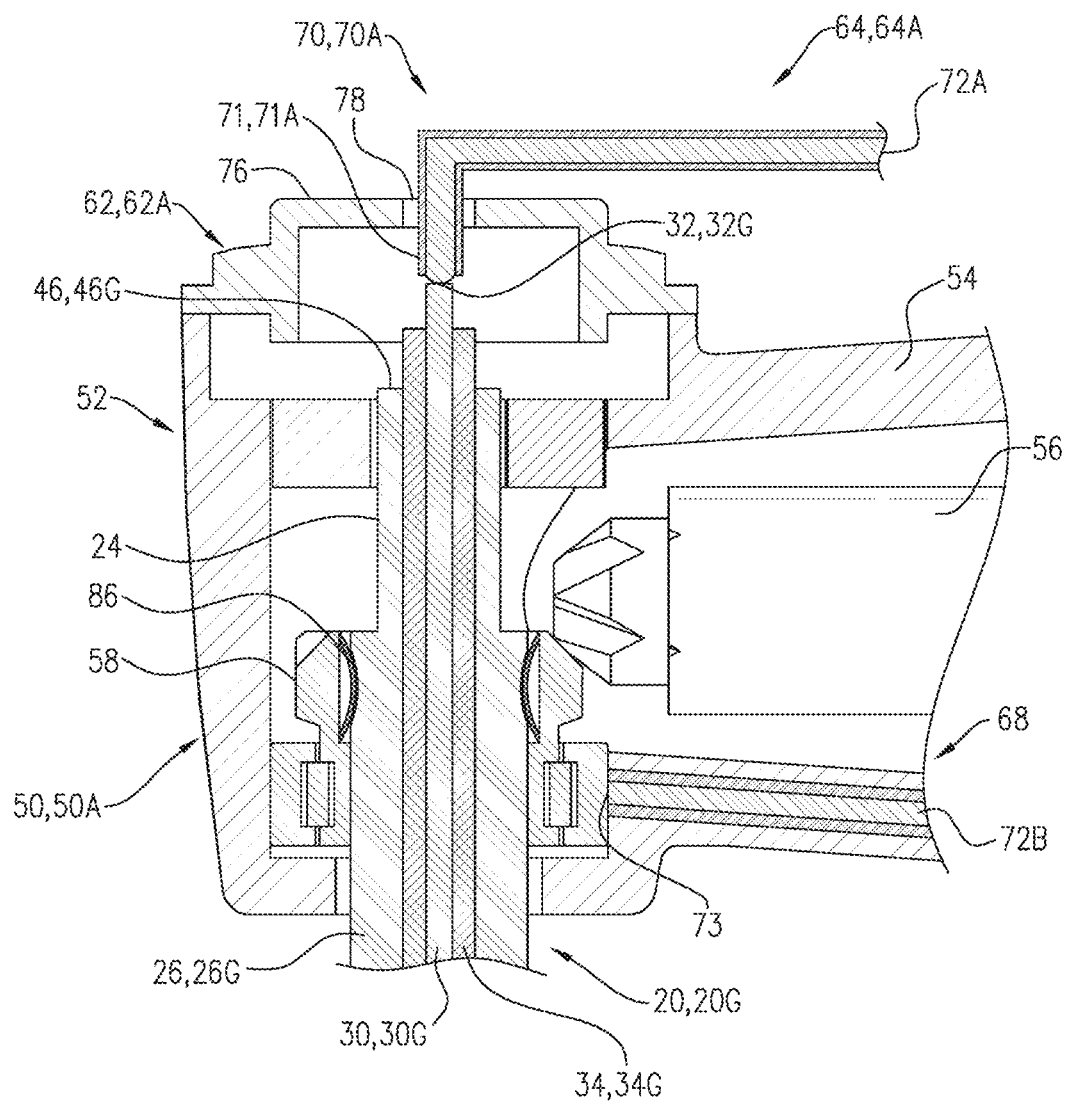
Figure 8F:
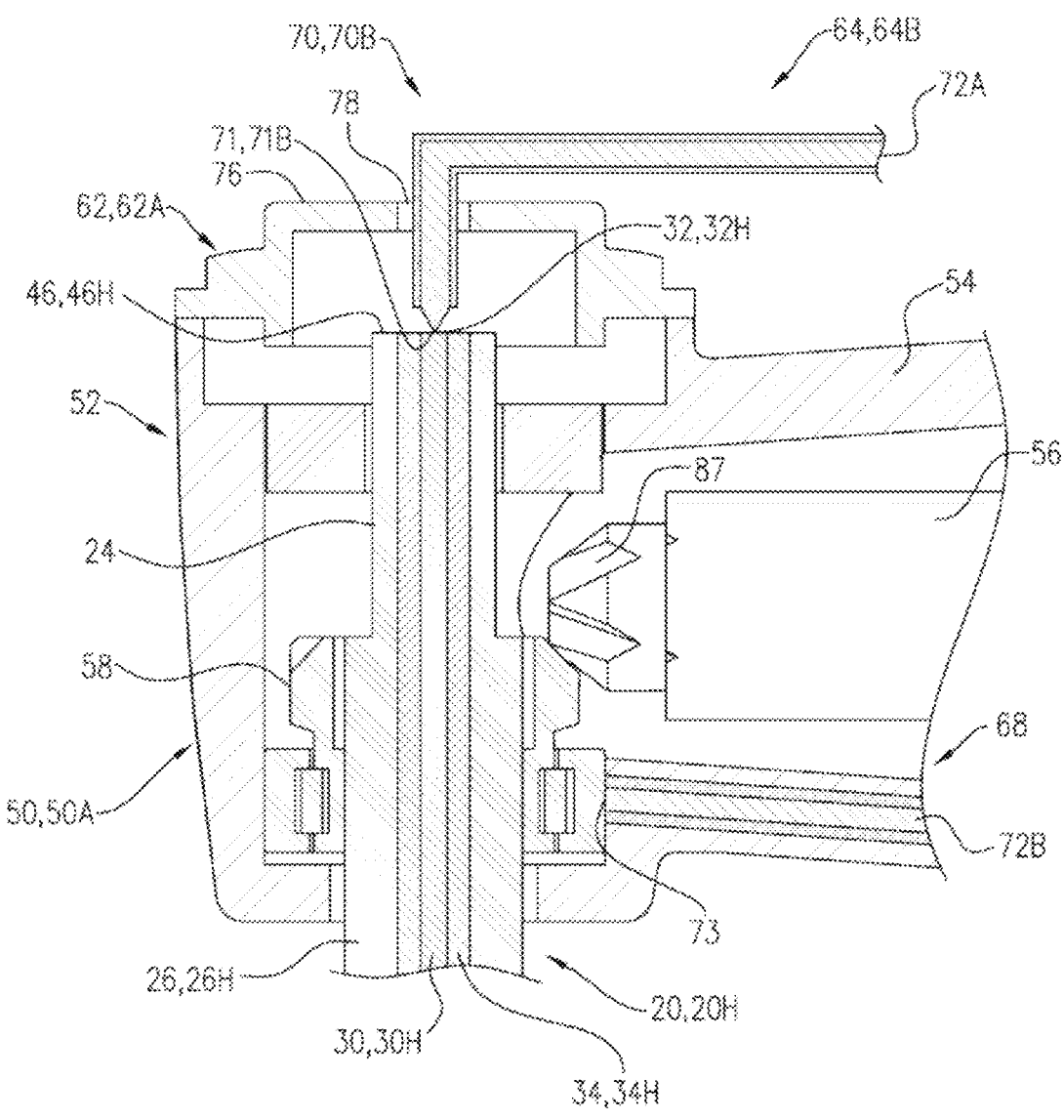
Figure 8G:
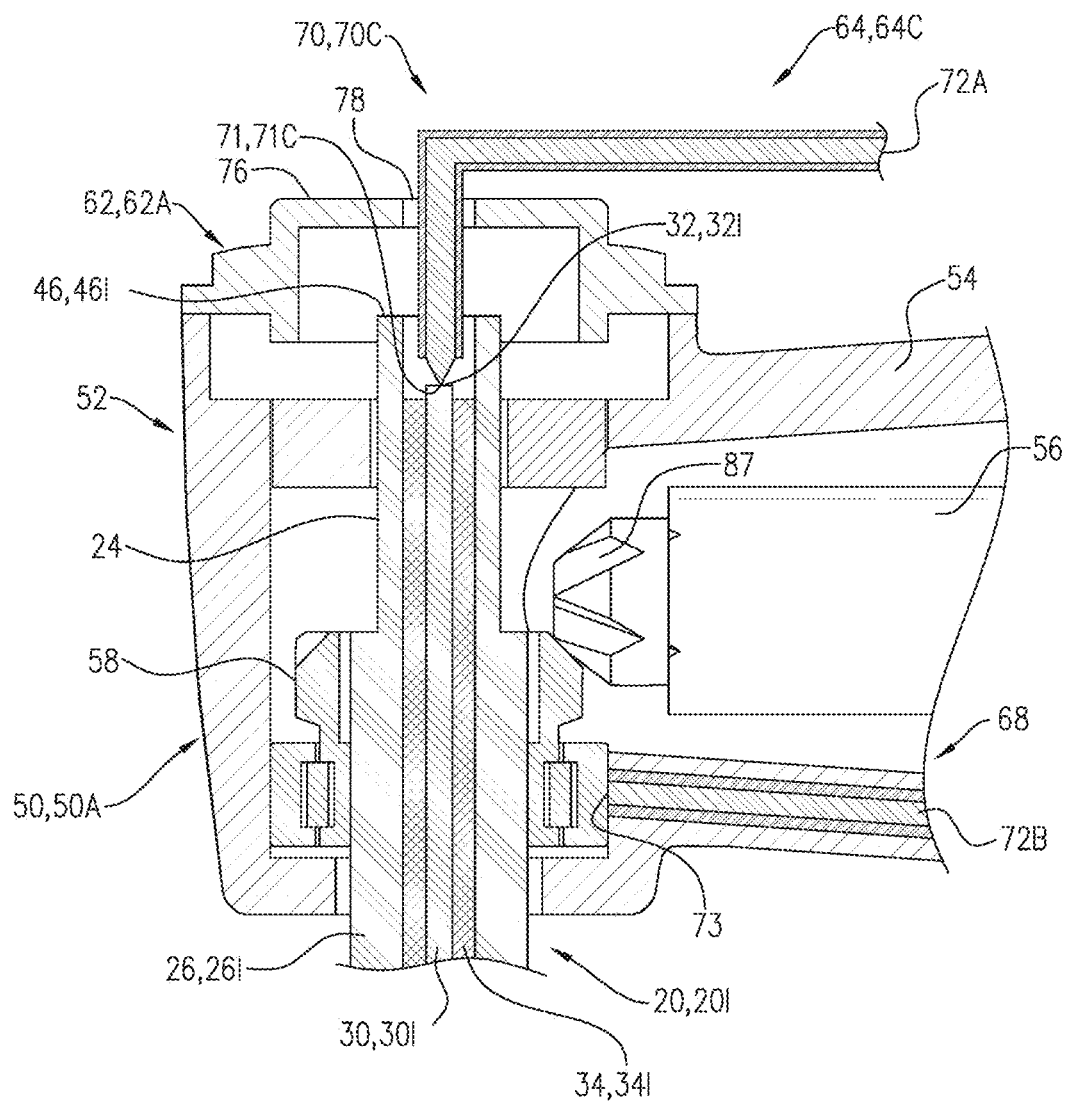
Figure 8H:
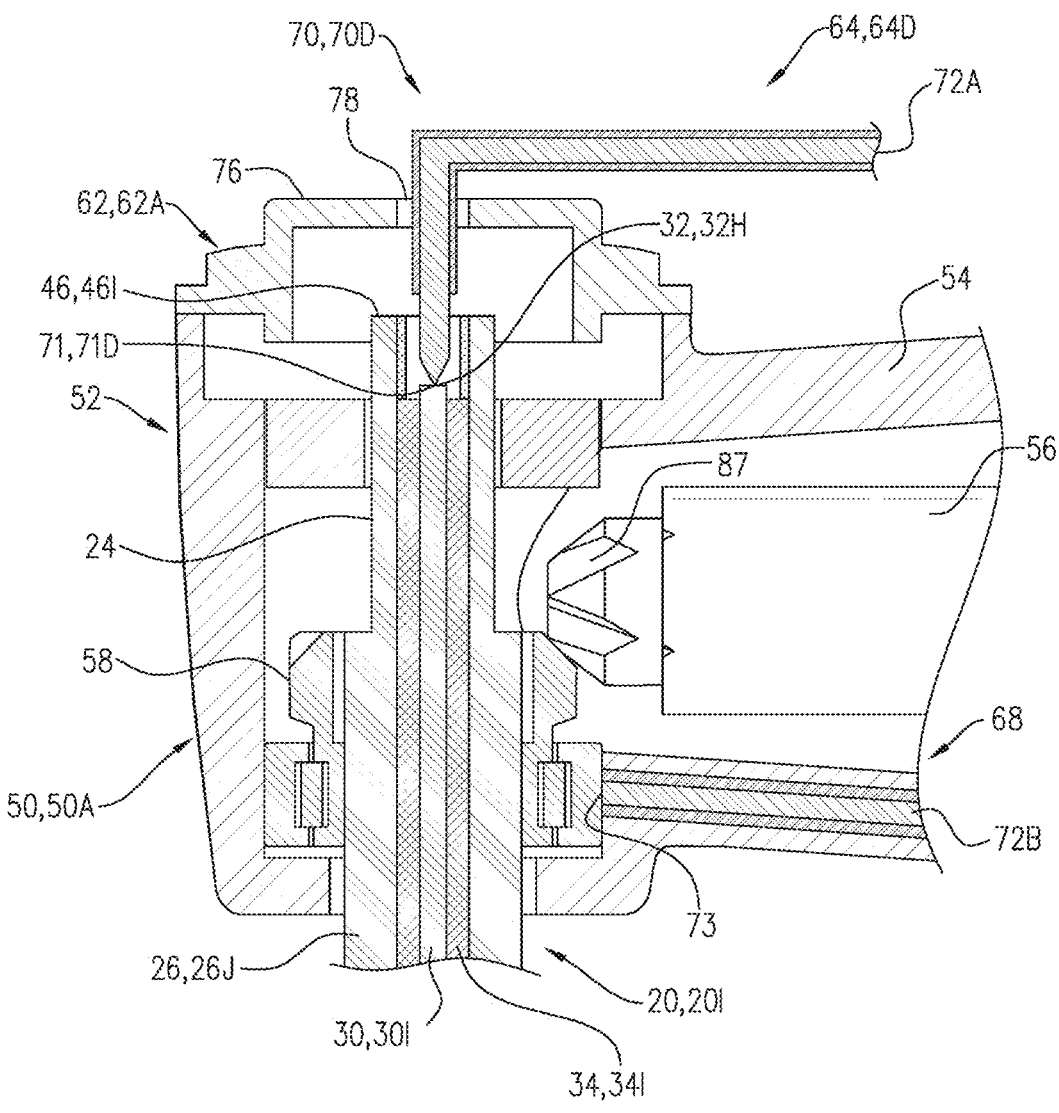
Figure 81:
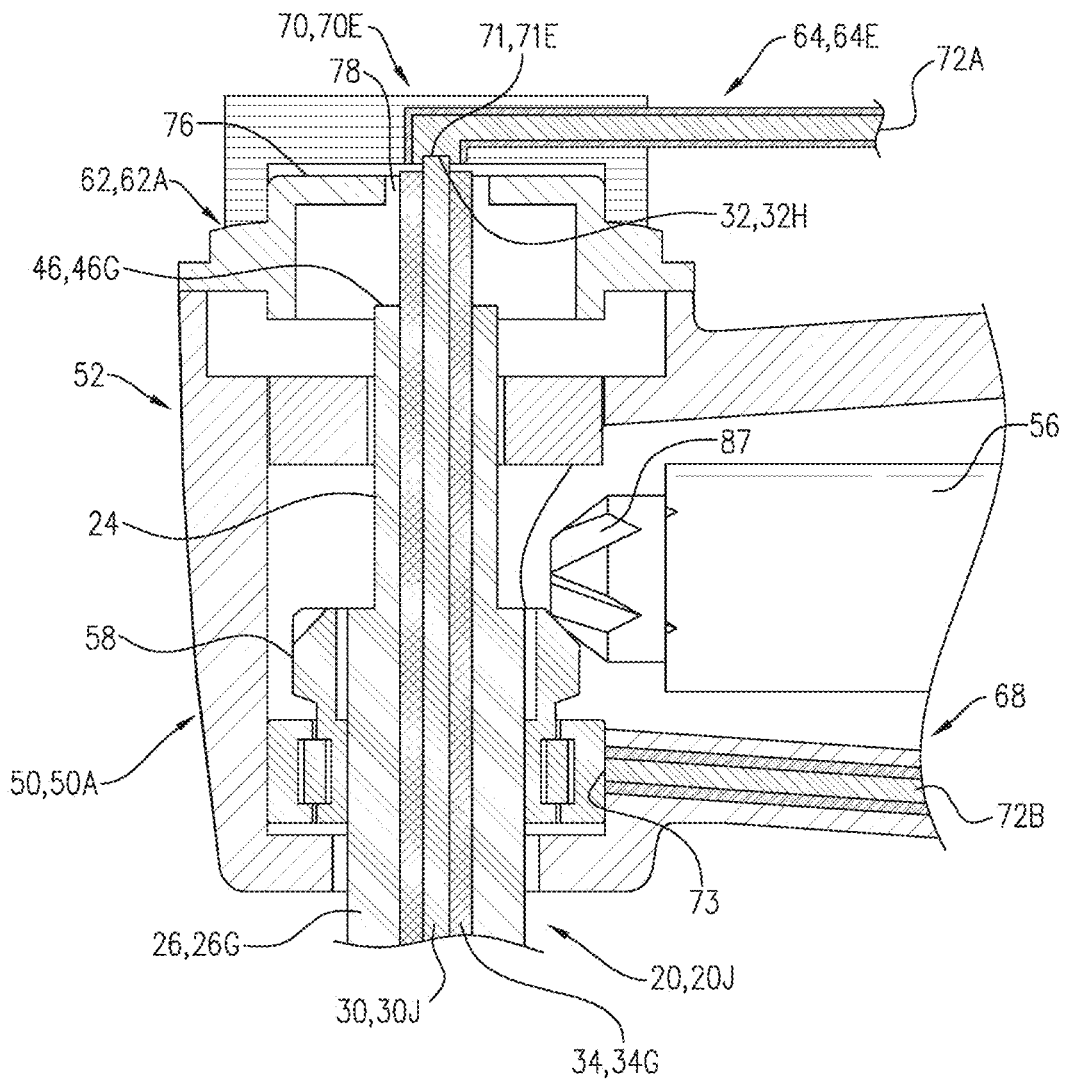
Figure 8J:
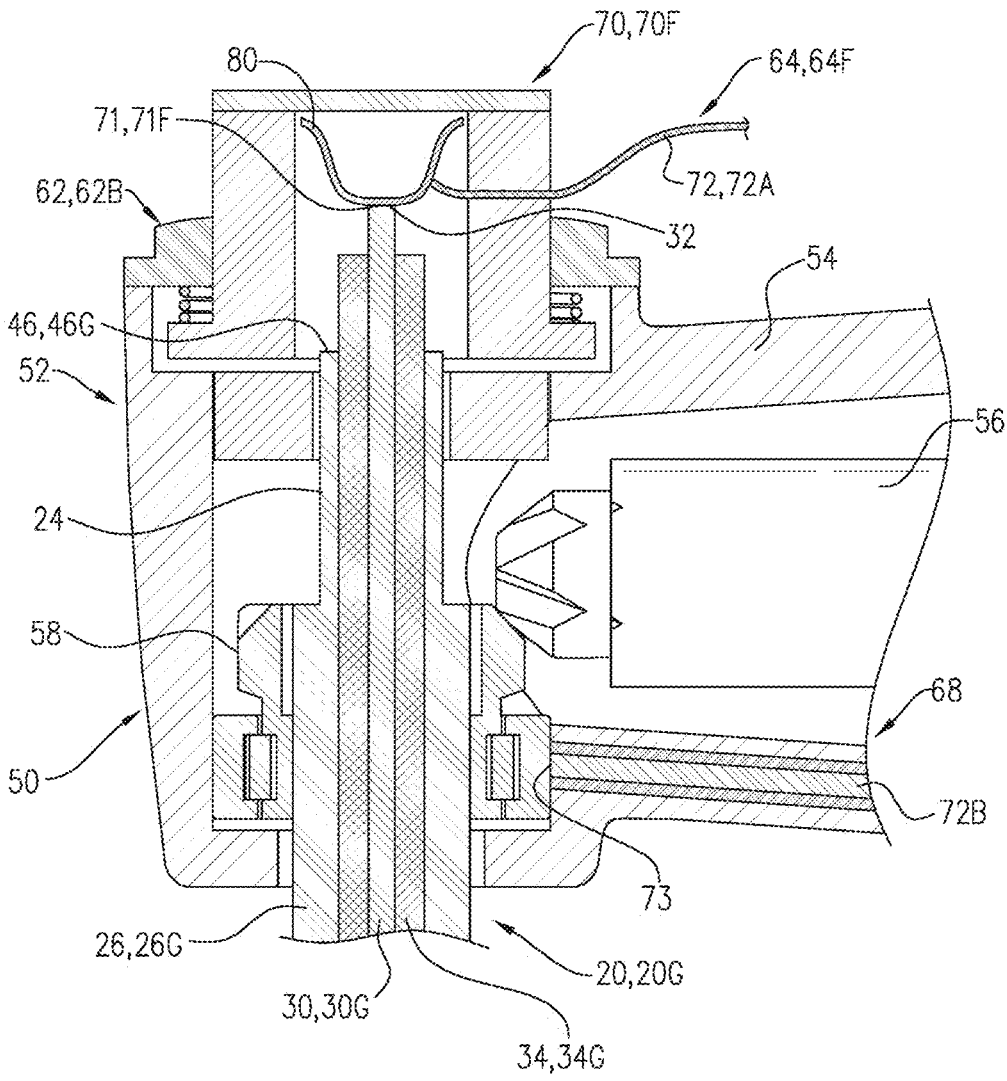
Figure 8K:
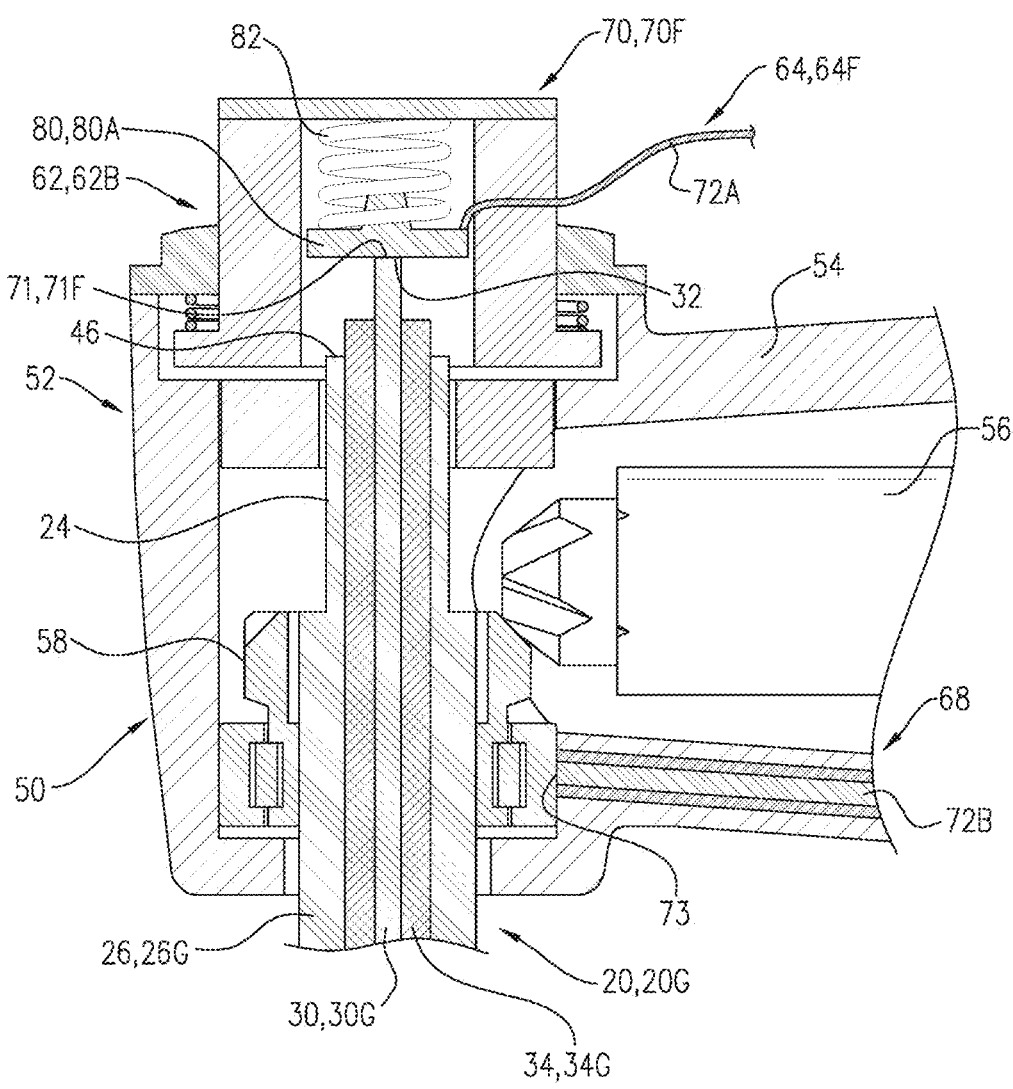
Figure 8L:
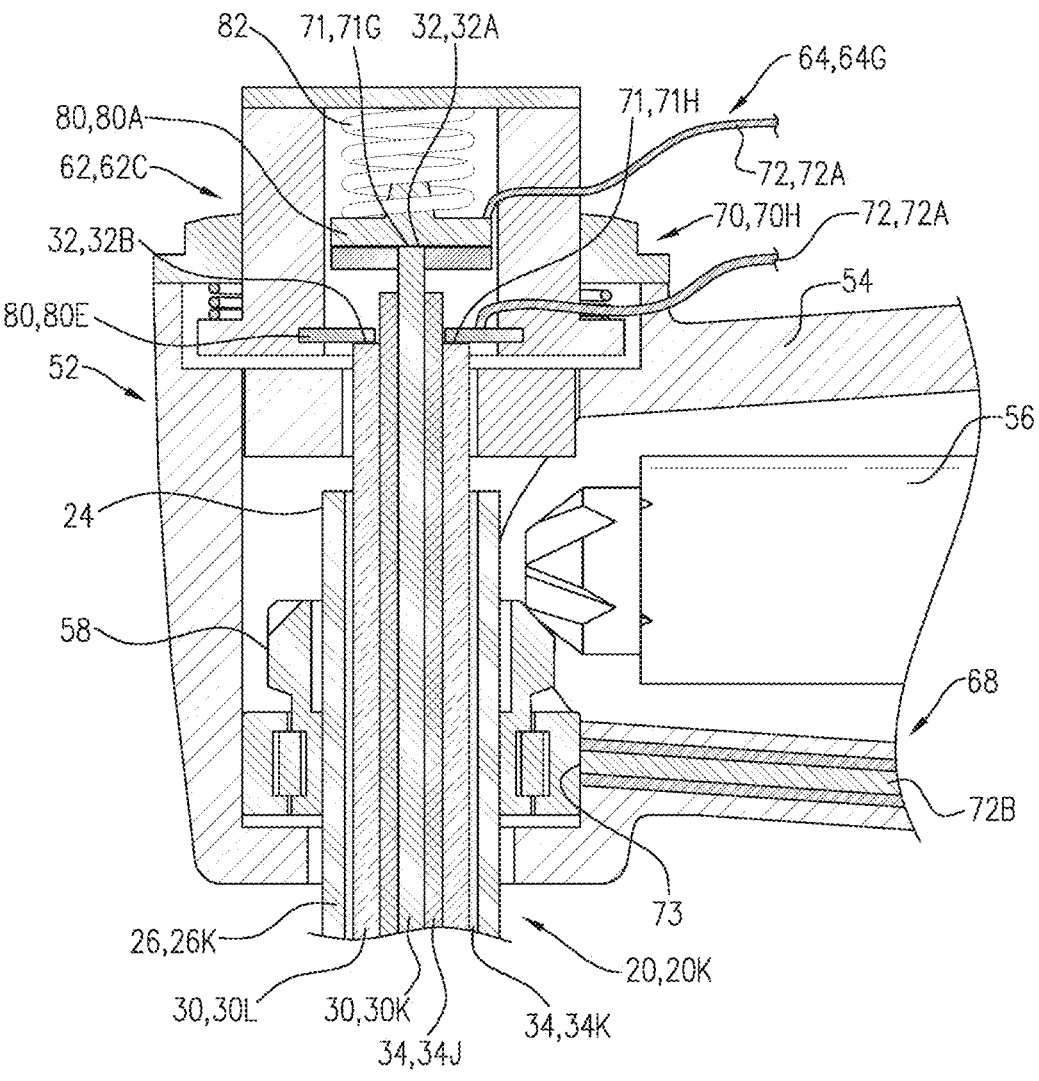
Figure 8M:
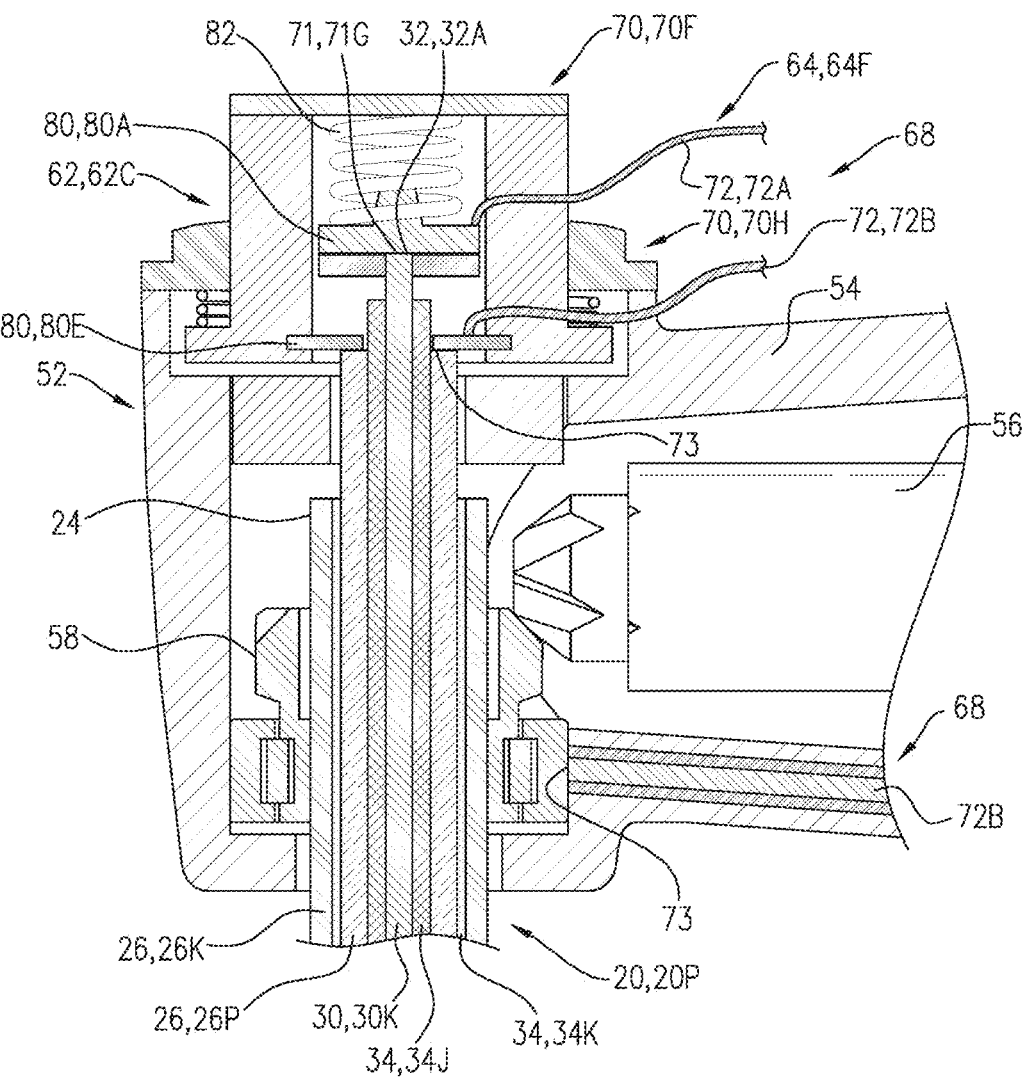
Figure 8N:
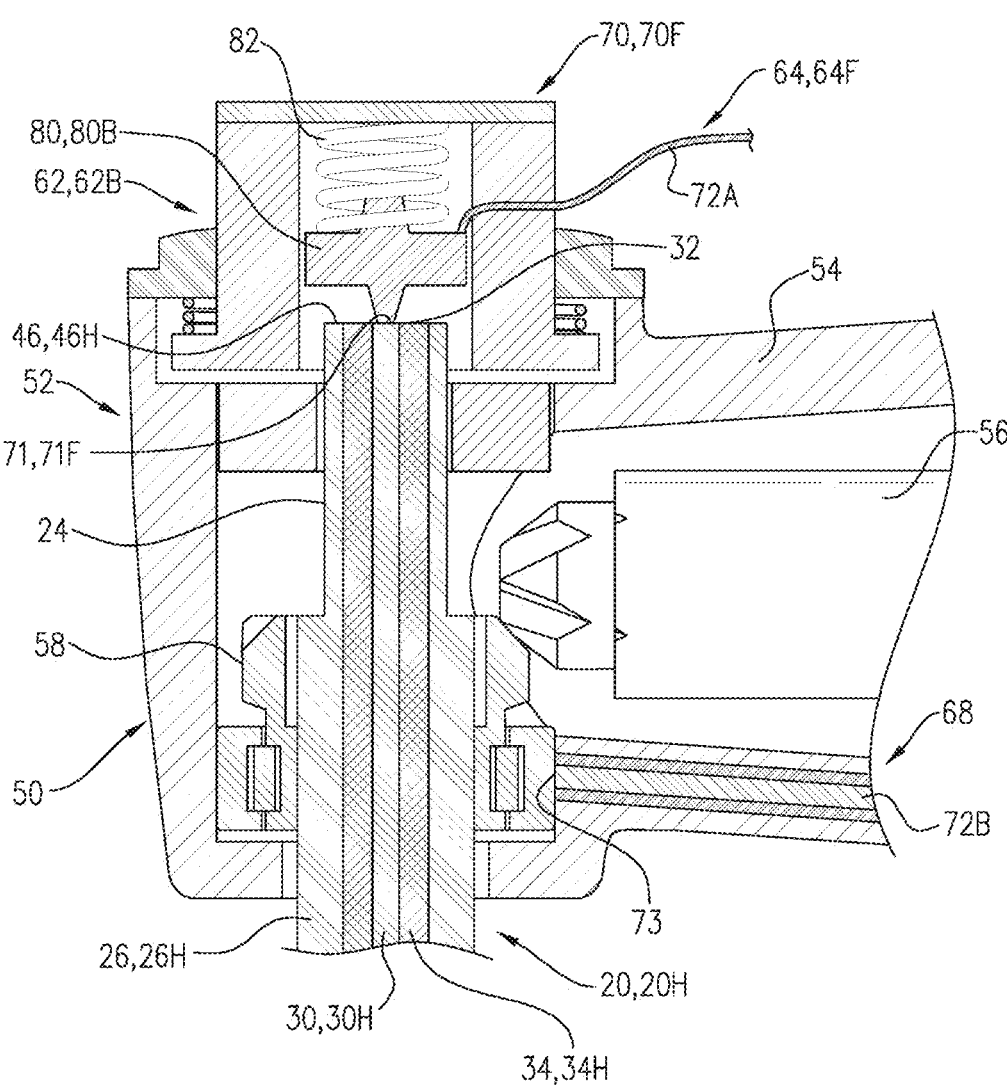
Figure 80:
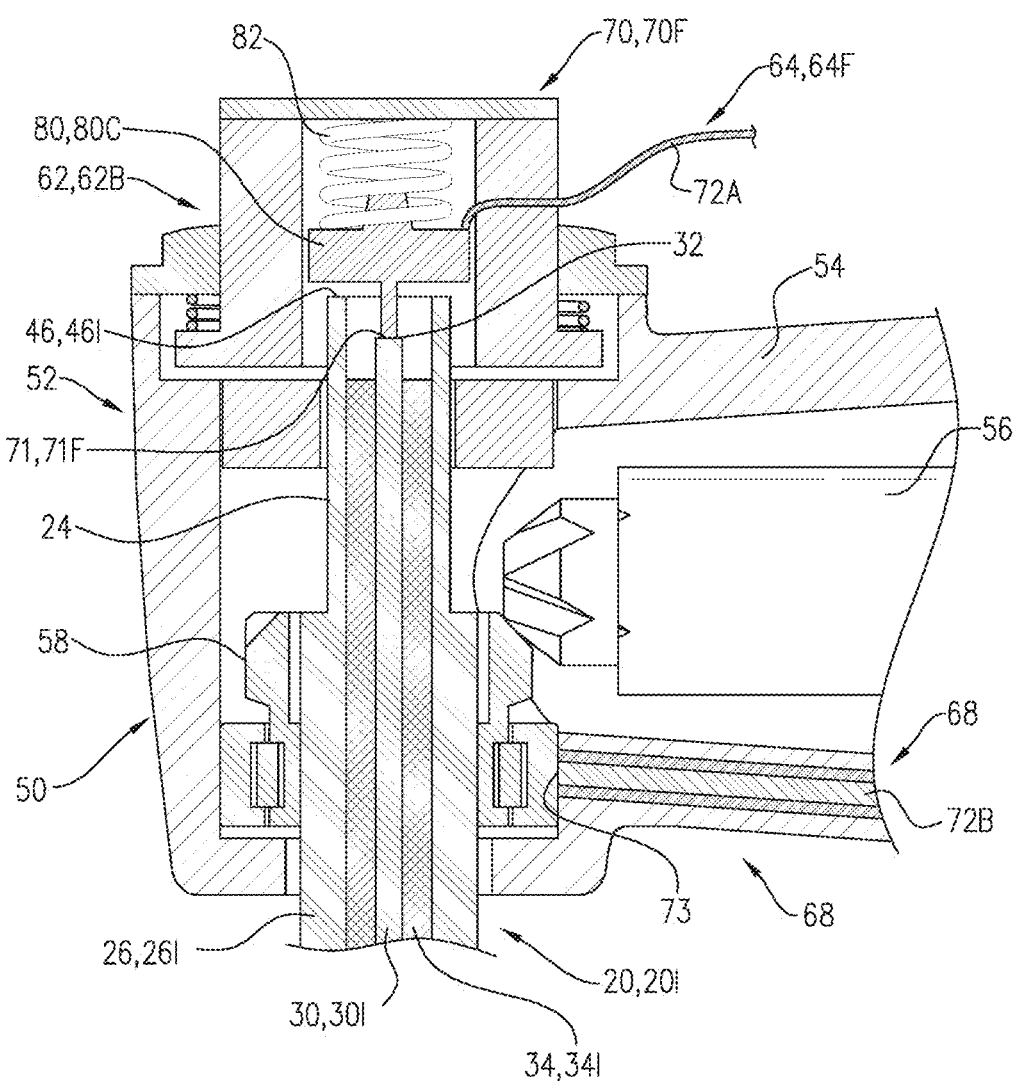
Figure 8P:
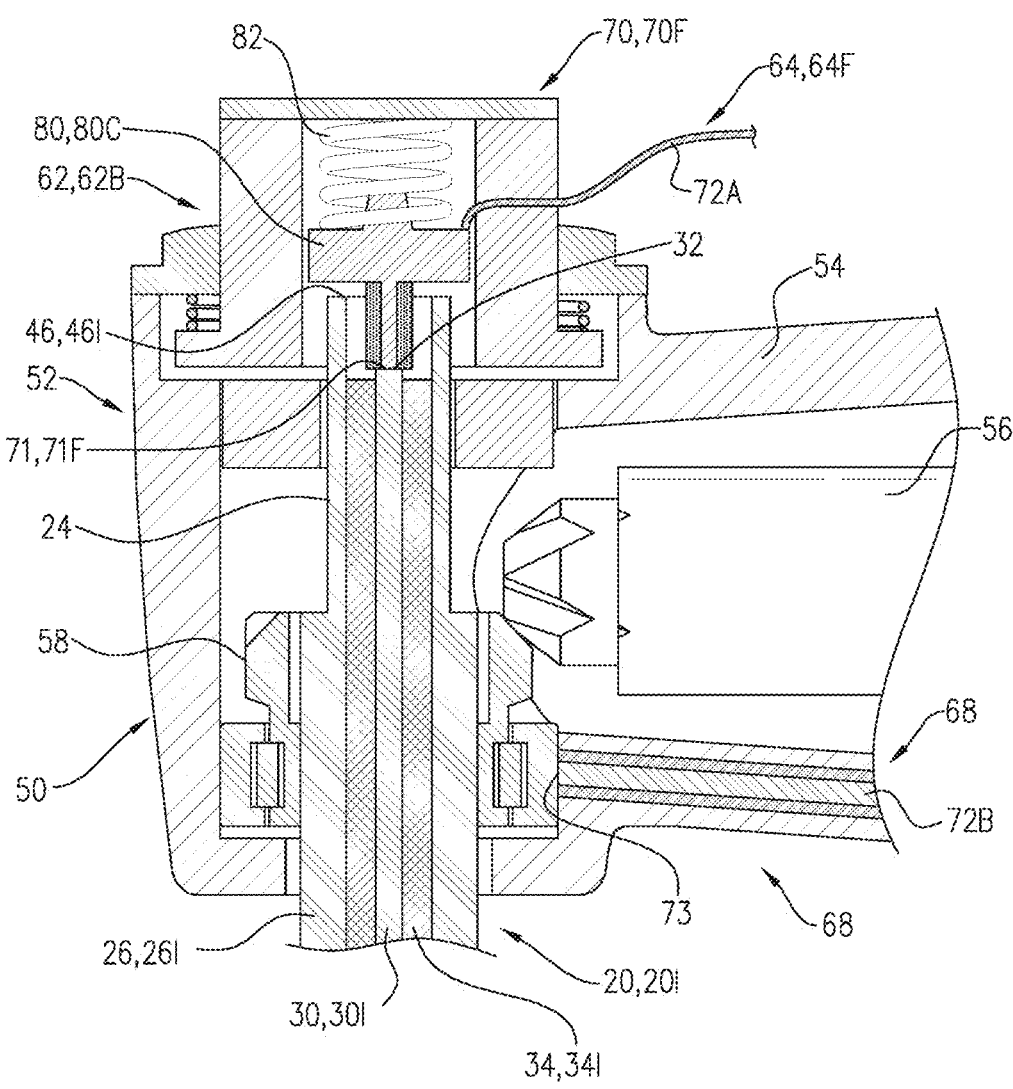
Figure 8Q:
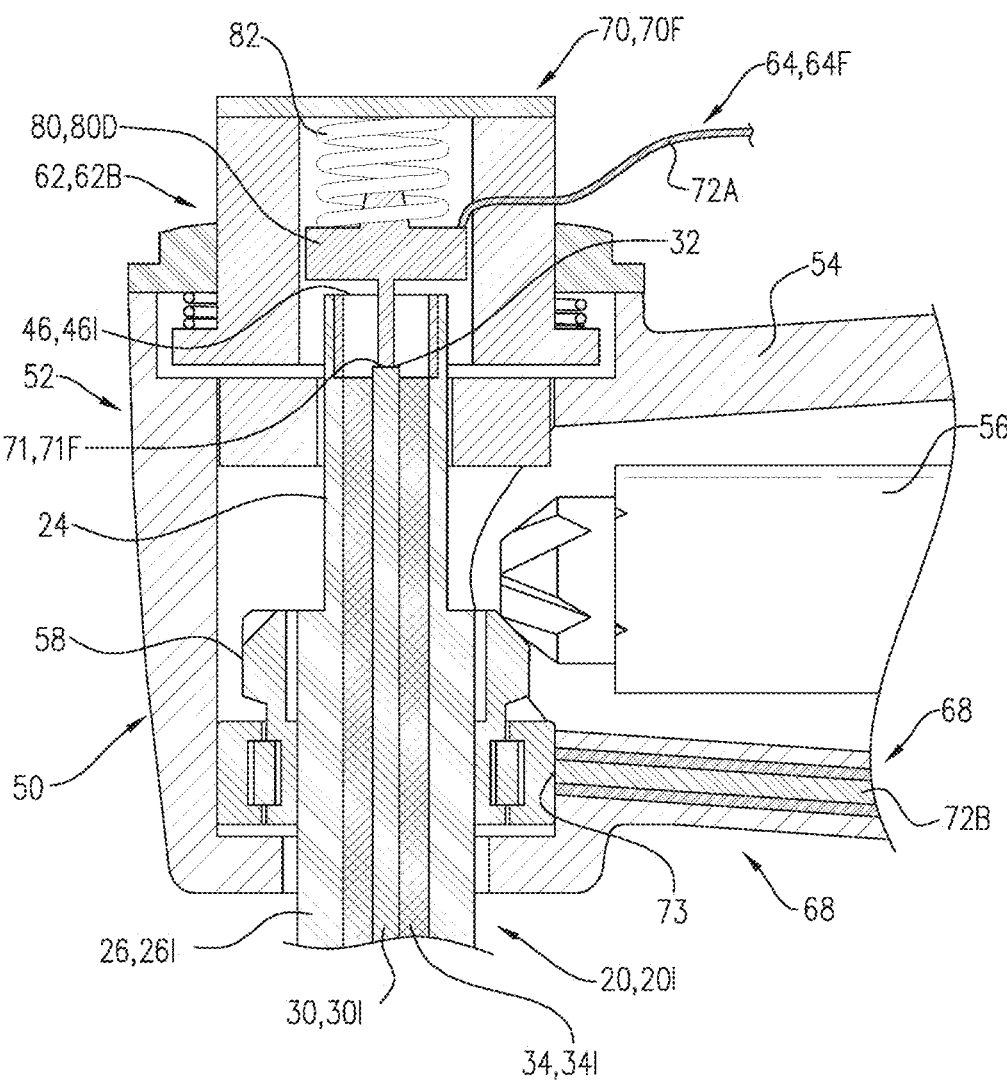
Figures 9A, 9B:
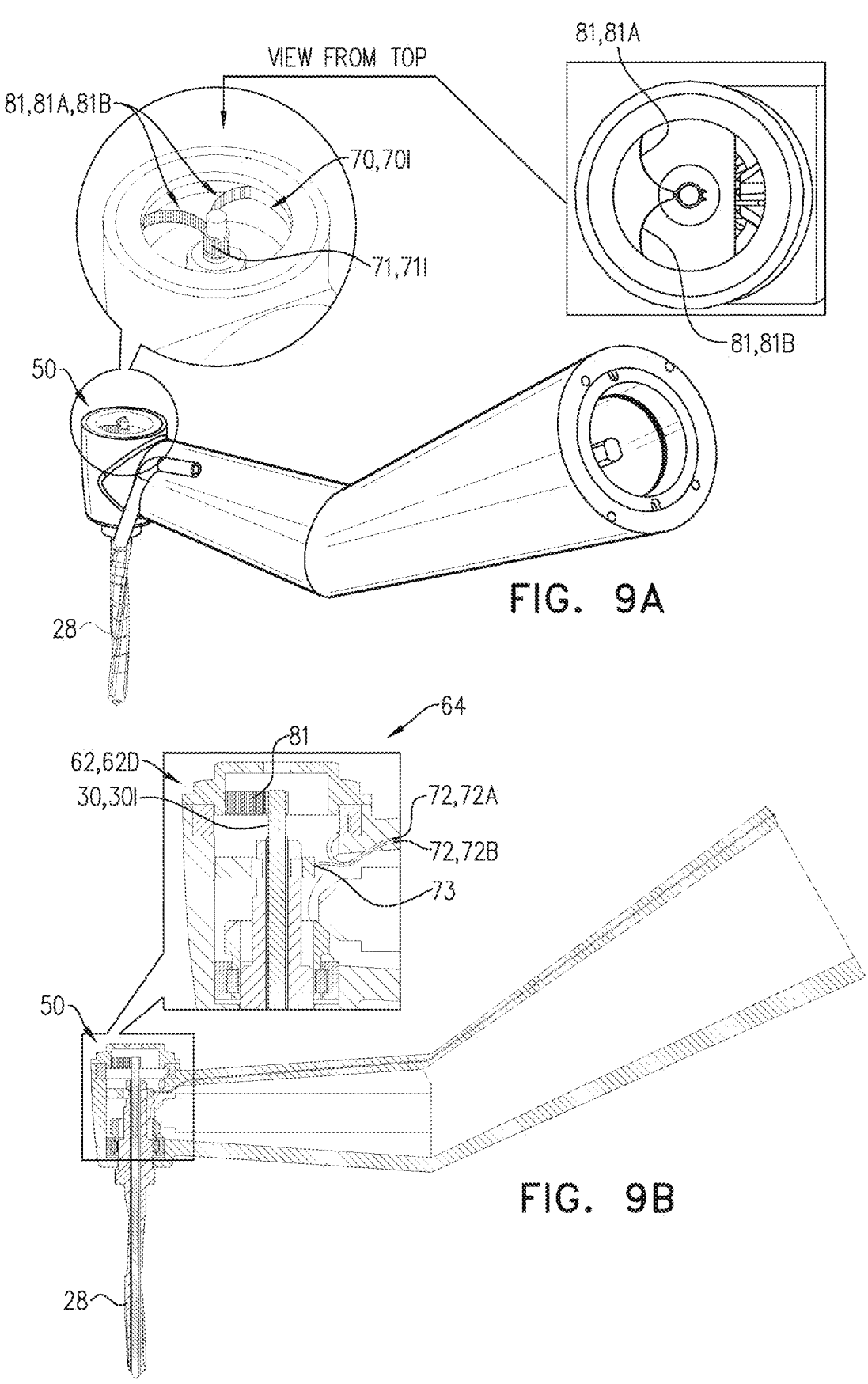
FIGS. 9A and 9B are schematic isometric and cross-sectional views of an alternative configuration of the electrical cutting system of FIG. 4, in accordance with an application of the present invention.
Figures 9C, 9D:
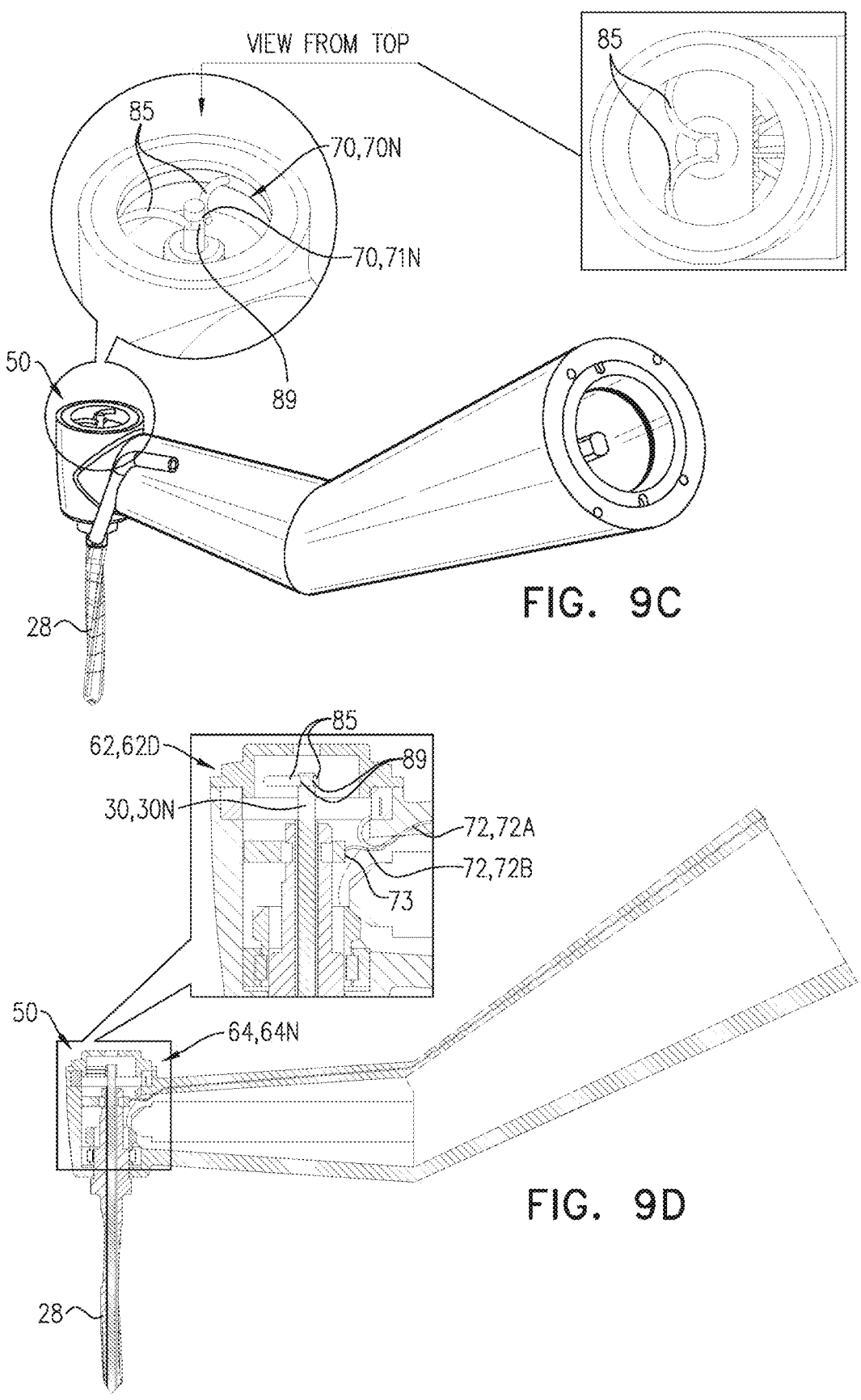
FIGS. 9C and 9D are schematic isometric and cross-sectional views of another alternative configuration of the electrical cutting system of FIG. 4, in accordance with an application of the present invention.

Reference is also made to FIGS. 8A-Q, which are schematic cross-sectional illustrations of respective configurations of electrical connecting system 64, in accordance with respective applications of the present invention.

Electrical connecting system 64 comprises:

an outer-electrode electrical connector 68, which comprises an outer-electrode electrical contact 73, and an insulated electrical wire 72, 72B that is electrically coupled to outer-electrode electrical contact 73 and to central unit 66; and an inner-electrode electrical connector 70, which comprises an inner-electrode electrical contact 71 and an insulated electrical wire 72, 72A electrically coupled to inner-electrode electrical contact 71 and to central unit 66.

Electrical connecting system 64 may comprise exactly one outer-electrode electrical connector 68 or a plurality of outer-electrode electrical connectors 68. Each of the one or more outer-electrode electrical connectors 68 may comprise exactly one outer-electrode electrical contact 73 or a plurality of outer-electrode electrical contacts 73, and/or exactly one insulated electrical wire 72, 72B or a plurality of insulated electrical wires 72, 72B.

For some applications, such as shown in FIG. 8L, described hereinbelow, electrical connecting system 64 may comprise exactly one inner-electrode electrical connector 70 or a plurality of inner-electrode electrical connectors 70. Each of the one or more inner-electrode electrical connectors 70 may comprise exactly one inner-electrode electrical contact 71 or a plurality of inner-electrode electrical contacts 71, and/or exactly one insulated electrical wire 72, 72A or a plurality of insulated electrical wires 72, 72A.

In any of the configurations shown in FIGS. 8A-Q, proximal electrically-conductive shank 24 may be integral with electrically-conductive distal end portion 28 of electrically-conductive outer electrode 26, such as shown in FIGS. 8B-Q. Alternatively, in any of the configurations shown in FIGS. 8A-Q, proximal electrically-conductive shank 24 may be non-integral with electrically-conductive distal end portion 28 of electrically-conductive outer electrode 26, such as shown in FIG. 8A.

Handpiece 52 is configured such that when rotating cutting instrument 20 is coupled to handpiece 52, outer-electrode electrical contact 73 is in electrical contact with electrically-conductive outer electrode 26, and inner-electrode electrical contact 71 is in electrical contact with electrically-conductive inner electrode 30.

For some applications, handpiece 52 further comprises a power transmission mechanism 56 which is configured to directly or indirectly drive torque transmitter 58, and outer-electrode electrical connector 68 of electrical connecting system 64 is configured to be coupled in electrical contact with outer electrode 26 of rotating cutting instrument 20 via power transmission mechanism 56.

For some applications, such as shown in FIGS. 8A-Q, electrical connecting system 64 is configured such that at least a portion of outer-electrode wire 72B passes through at least a portion of handpiece 52.

For some of these applications, such as shown in FIGS. 8A-Q, outer-electrode electrical connector 68 (e.g., outer-electrode electrical contact 73 of outer-electrode wire 72B of outer-electrode electrical connector 68) is electrically coupled to outer electrode 26 via torque transmitter 58, and, optionally, via bearings 60, if provided.

For some of these applications, outer-electrode wire 72B is at least partially embedded within a wall of handpiece 52, such as shown in FIGS. 8A, 8E, and 8F-Q.

For others of these applications, such as shown in FIGS. 8B, 8C, and 8D, outer-electrode electrical connector 68 of electrical connecting system 64 is configured to be coupled in electrical contact with outer electrode 26 of rotating cutting instrument 20 via power transmission mechanism 56 and torque transmitter 58. In these applications, outer-electrode wire 72B is electrically coupled to torque transmitter 58 by outer-electrode electrical contact 73. For example:

such as shown in FIG. 8B, outer-electrode electrical contact 73 may comprise one or more wires that mechanically and electrically interface with an outer surface of power transmission mechanism 56;

such as shown in FIG. 8C, outer-electrode electrical contact 73 may comprise one or more blades 69 that mechanically and electrically interface with the outer surface of power transmission mechanism 56; or such as shown in FIG. 8D, outer-electrode electrical contact 73 may comprise one or more carbon contacts or brush (e.g., carbon brush) that mechanically and electrically interface with the outer surface of power transmission mechanism 56.

Optionally, for any of these applications, the outer surface of power transmission mechanism 56 may be shaped so as define one or more grooves 67, and outer-electrode electrical contact 73 may mechanically and electrically interface with the one or more grooves 67.

For some applications, power transmission mechanism 56 is configured to be coupled in electrical contact with outer electrode of rotating cutting instrument 20 via torque-transmitting teeth 87 (labeled in FIG. 8B and other figures) defined by a distal end of power transmission mechanism 56, such as shown in FIGS. 8B-E.

For some applications, such as shown in FIGS. 8A-D, and 8F-Q, torque transmitter 58 is configured to be coupled in direct electrical contact with outer electrode 26 of rotating cutting instrument 20.

For some applications, such as shown in FIG. 8E, torque transmitter 58 is configured to be coupled in indirect electrical contact with outer electrode 26, 26G of rotating cutting instrument 20, 20G, such as via a blade 86 of torque transmitter 58.

For some applications (configuration not shown), torque transmitter 58 comprises a pin and spring system, and is configured to be coupled in indirect electrical contact with outer electrode 26 of rotating cutting instrument 20 via pin and spring system 88.

For some applications, such as shown in FIG. 7A, electrical cutting system 50 is configured to electrically connect electrically-conductive inner electrode 30 to ground.

For other applications, such as shown in FIG. 7B, electrical cutting system 50 is configured to electrically connect electrically-conductive outer electrode 26 to ground.

For some applications, one or more of the following elements are coated with an electrically-conductive coating, e.g., with gold or a diamond-like carbon coating: inner-electrode electrical contact 71, proximal end portion 32 of inner electrode 30, outer electrode 26, and/or outer-electrode electrical contact 73.

Reference is made to FIG. 8A, in which electrical cutting system 50 comprises an electrical cutting system 50, 50A; cap 62 comprises a cap 62, 62A; electrical connecting system 64 comprises an electrical connecting system 64, 64A; inner-electrode electrical connector 70 comprises an inner-electrode electrical connector 70, 70A; inner-electrode electrical contact 71 comprises an inner-electrode electrical contact 71, 71A; rotating cutting instrument 20 comprises a rotating cutting instrument 20, 20G; outer electrode 26 comprises an outer electrode 26, 26G, which is shaped so as to define a proximal end 46, 46G; electrically-conductive inner electrode 30 comprises an electrically-conductive inner electrode 30, 30G, which has a proximal end portion 32, 32G; and electrical isolation layer 34 comprises an electrical isolation layer 34, 34G.

For some applications, such as shown in FIG. 8A (and FIGS. 3A-B 8B-E, 8I-K and 8L-M), electrically-conductive inner electrode 30, 30G, 30K protrudes proximally from a proximal end 46, 46G of electrically-conductive outer electrode 26, 26G, 26K.

For some applications, such as shown in FIG. 8A (and FIGS. 8B-E and 8I-M), electrical isolation layer 34, 34G, 34J, 30L protrudes proximally from proximal end 46, 46G of electrically-conductive outer electrode 26, 26G, 26K.

Reference is made to FIG. 8F. Other than as described as follows, the configuration shown in FIG. 8F is generally similar to the configuration shown in FIG. 8A, and like numbers refer to like parts. In the configuration shown in FIG. 8F, electrical connecting system 64 comprises an electrical connecting system 64, 64B; inner-electrode electrical connector 70 comprises an inner-electrode electrical connector 70, 70B; inner-electrode electrical contact 71 comprises an inner-electrode electrical contact 71, 71B; rotating cutting instrument 20 comprises a rotating cutting instrument 20, 20H; outer electrode 26 comprises an outer electrode 26, 26H, which is shaped so as to define a proximal end 46, 46H; electrically-conductive inner electrode 30 comprises an electrically-conductive inner electrode 30, 30H, which has a proximal end portion 32, 32H; and electrical isolation layer 34 comprises an electrical isolation layer 34, 34H.

For some applications, such as shown in FIG. 8F, proximal end portion 32, 32H of electrically-conductive inner electrode 30, 30H is flush with a proximal end 46, 46H of electrically-conductive outer electrode 26, 26H.

For some applications, such as shown in FIG. 8F (and FIG. 8N), electrical isolation layer 34, 34H, 34K is flush with proximal end 46, 46H of electrically-conductive outer electrode 26, 26H.

For some applications, such as shown in FIG. 8F (and FIG. 8N), inner-electrode electrical contact 71, 71B of electrical connecting system 64, 64B is configured to be coupled in electrical contact with inner electrode 30, 30H, which is flush with proximal end 46, 46H of outer electrode 26, 26H.

Reference is made to FIG. 8G. Other than as described as follows, the configuration shown in FIG. 8G is generally similar to the configuration shown in FIG. 8A, and like numbers refer to like parts. In the configuration shown in FIG. 8G, electrical connecting system 64 comprises an electrical connecting system 64, 64C; inner-electrode electrical connector 70 comprises an inner-electrode electrical connector 70, 70C; inner-electrode electrical contact 71 comprises an inner-electrode electrical contact 71, 71C; rotating cutting instrument 20 comprises a rotating cutting instrument 20, 201; outer electrode 26 comprises an outer electrode 26, 261, which is shaped so as to define a proximal end 46, 461; electrically-conductive inner electrode 30 comprises an electrically-conductive inner electrode 30, 30I, which has a proximal end portion 32, 321; and electrical isolation layer 34 comprises an electrical isolation layer 34, 341.

For some applications, such as shown in FIG. 8G (and FIG. 10B), proximal end portion 32, 321 of electrically-conductive inner electrode 30, 30I, 30L is disposed more distally than (i.e., recessed within) a proximal end 46, 461 of electrically-conductive outer electrode 26, 261, 26L.

For some applications, such as shown in FIG. 8G, electrical isolation layer 34, 341 is disposed more distally than proximal end 46, 461 of electrically-conductive outer electrode 26, 261, 26J.

For some applications, such as shown in FIG. 8G, inner-electrode electrical contact 71, 71C of electrical connecting system 64, 64C is configured to be coupled in electrical contact with inner electrode 30, 30I, which is located inside outer electrode 26, 261.

For some applications, such as shown in FIG. 8G, inner-electrode electrical contact 71, 71C of electrical connecting system 64, 64C is insulated to avoid any electrical contact with outer electrode 26, 261 of rotating cutting instrument 20, 201.

Reference is made to FIG. 8H. Other than as described as follows, the configuration shown in FIG. 8H is generally similar to the configuration shown in FIG. 8A, and like numbers refer to like parts. In the configuration shown in FIG. 8H, electrical connecting system 64 comprises an electrical connecting system 64, 64D; inner-electrode electrical connector 70 comprises an inner-electrode electrical connector 70, 70D; inner-electrode electrical contact 71 comprises an inner-electrode electrical contact 71, 71D; rotating cutting instrument 20 comprises rotating cutting instrument 20, 201; outer electrode 26 comprises an outer electrode 26, 26J, which is shaped so as to define proximal end 46, 461; electrically-conductive inner electrode 30 comprises electrically-conductive inner electrode 30, 30I, which has proximal end portion 32, 321; and electrical isolation layer 34 comprises electrical isolation layer 34, 341.

For some applications, such as shown in FIG. 8H, outer electrode 26, 26J, which is configured to receive inner-electrode electrical connector 70, 70D of electrical connecting system 64, 64D, is insulated to avoid any electrical contact with inner-electrode electrical contact 71, 71C of electrical connecting system 64, 64D.

Reference is made to FIG. 8I. Other than as described as follows, the configuration shown in FIG. 8I is generally similar to the configuration shown in FIG. 8A, and like numbers refer to like parts. In the configuration shown in FIG. 8I, electrical connecting system 64 comprises an electrical connecting system 64, 64E; inner-electrode electrical connector 70 comprises an inner-electrode electrical connector 70, 70E (it is noted that the housing of inner-electrode electrical connector 70, 70E is not a component of handpiece 52, including not being a component of cap 62, 62E of handpiece 52); inner-electrode electrical contact 71 comprises an inner-electrode electrical contact 71, 71E; rotating cutting instrument 20 comprises rotating cutting instrument 20, 20J; outer electrode 26 comprises outer electrode 26, 26G, which is shaped so as to define proximal end 46, 46G; electrically-conductive inner electrode 30 comprises an electrically-conductive inner electrode 30, 30J, which has proximal end portion 32, 32H; and electrical isolation layer 34 comprises electrical isolation layer 34, 34G.

For some applications, such as shown in FIG. 8I, inner-electrode electrical contact 71, 71E of electrical connecting system 64, 64E is configured to be coupled in electrical contact with inner electrode 30, 30J, which is located protruding proximally external to the handpiece 52, including external to cap 62, 62A of handpiece 52.

Reference is made to FIGS. 5, 6, 8A-I, 10A-D, 12B, and 13. For some applications, cap 62, 62A, 62E, 62F, 62G is shaped so as to define a hole 78 therethrough.

Reference is made to FIGS. 8J and 8K. Other than as described as follows, the configurations shown in FIGS. 8J and 8K are generally similar to the configuration shown in FIG. 8A, and like numbers refer to like parts. In the configurations shown in FIGS. 8J and 8K, cap 62 comprises a cap 62, 62B; electrical connecting system 64 comprises an electrical connecting system 64, 64F; inner-electrode electrical connector 70 comprises an inner-electrode electrical connector 70, 70F (it is noted that the housing of inner-electrode electrical connector 70, 70F is not a component of handpiece 52, including not being a component of cap 62, 62B of handpiece 52); and inner-electrode electrical contact 71 comprises an inner-electrode electrical contact 71, 71F.

Reference is made to FIG. 8L. Other than as described as follows, the configuration shown in FIG. 8L is generally similar to the configuration shown in FIG. 8A, and like numbers refer to like parts. In the configuration shown in FIG. 8L, cap 62 comprises a cap 62, 62C; electrical connecting system 64 comprises an electrical connecting system 64, 64G; inner-electrode electrical connector 70 comprises an inner-electrode electrical connector 70, 70H (it is noted that the housing of inner-electrode electrical connector 70, 70H is not a component of handpiece 52, including not being a component of cap 62, 62C of handpiece 52); rotating cutting instrument 20 comprises rotating cutting instrument 20, 20K; and outer electrode 26 comprises outer electrode 26, 26K.

Inner-electrode electrical connector 70, 70H comprises:

an inner-electrode electrical contact 71, 71G and an inner-electrode electrical contact 71, 71H;

two insulated electrical wires 72, 72A electrically coupled to (a) inner-electrode electrical contacts 71, 71G and 71, 71H, respectively, and (b) to central unit 66.

For some applications, such as shown in FIG. 8L, rotating cutting instrument 20, 20K comprises:

a plurality of electrically-conductive inner electrodes 30K, 30L which have respective proximal end portions 32, 32A, 32B; and a plurality of electrical isolation layers 34J, 34K between electrically-conductive outer electrode 26, 26K and the plurality electrically-conductive inner electrodes 30K, 30L, so as to electrically isolate electrically-conductive outer electrode 26, 26K and electrically-conductive inner electrodes 30K, 30L from one other.

Handpiece 52 is configured such that when rotating cutting instrument 20, 20K is coupled to handpiece 52:

outer-electrode electrical contact 73 is in electrical contact with electrically-conductive outer electrode 26, 26K, inner-electrode electrical contact 71, 71G is in electrical contact with electrically-conductive inner electrode 30, 30K via proximal end portion 32, 32A, and inner-electrode electrical contact 71, 71H is in electrical contact with electrically-conductive inner electrode 30, 30L via proximal end portion 32, 32B.

For some applications, inner electrode 30, 30G, 30K, 30L proximally protrudes out of outer electrode 26, 26G, 26K.

The features described above with reference to FIG. 8L may be implemented in combination with other configurations of rotating cutting instruments 20 and 120 described herein, mutatis mutandis.

Reference is made to FIG. 8M. Other than as described as follows, the configuration shown in FIG. 8M is generally similar to the configuration shown in FIG. 8A, and like numbers refer to like parts. In the configuration shown in FIG. 8M, cap 62 comprises cap 62, 62C; electrical connecting system 64 comprises electrical connecting system 64, 64F; inner-electrode electrical connector 70 comprises inner-electrode electrical connector 70, 70F (it is noted that the housing of inner-electrode electrical connector 70, 70F is not a component of handpiece 52, including not being a component of cap 62, 62C of handpiece 52); and rotating cutting instrument 20 comprises rotating cutting instrument 20, 20P.

For some applications, such as shown in FIG. 8M, rotating cutting instrument 20, 20P comprises:

a single electrically-conductive inner electrode 30, 30K;

plurality of electrically-conductive outer electrodes 26, 26K, 26P; and a plurality of electrical isolation layers 34J, 34K, a first one of which is between electrically-conductive outer electrode 26, 26P and electrically-conductive inner electrode 30, 30K, and a second one of which is between the plurality of electrically-conductive outer electrodes 26K, 26P, so as to electrically isolate the electrically-conductive outer electrodes and electrically-conductive inner electrode from one other.

Inner-electrode electrical connector 70, 70F comprises inner-electrode electrical contact 71, 71H.

Outer-electrode electrical connector 68 comprises:

two insulated electrical wires 72, 72B electrically coupled to two respective inner-electrode electrical contacts 73.

Handpiece 52 is configured such that when rotating cutting instrument 20, 20P is coupled to handpiece 52:

the first outer-electrode electrical contact 73 is in electrical contact with electrically-conductive outer electrode 26, 26K, such as via torque transmitter 58, the second outer-electrode electrical contact 73 is in electrical contact with electrically-conductive outer electrode 26, 26P, such as via cap 62, 62C and a proximal end of electrically-conductive outer electrode 26, 26P, and inner-electrode electrical contact 71, 71G is in electrical contact with electrically-conductive inner electrode 30, 30K via proximal end portion 32, 32A.

The features described above with reference to FIG. 8M may be implemented in combination with other configurations of rotating cutting instruments 20 and 120 described herein, mutatis mutandis.

For other applications, such as shown in FIGS. 1A-C, 2A-C, 3A-B, and many other applications, rotating cutting instrument 20 comprises exactly one electrically-conductive outer electrode 26 and exactly one electrically-conductive inner electrode 30, and electrical isolation layer 34 is radially between the exactly one electrically-conductive outer electrode 26 and the exactly one electrically-conductive inner electrode 30.

Reference is made to FIG. 8N. Other than as described as follows, the configuration shown in FIG. 8N is generally similar to the configuration shown in FIG. 8F, and like numbers refer to like parts. In the configuration shown in FIG. 8N, cap 62 comprises a cap 62, 62B; electrical connecting system 64 comprises an electrical connecting system 64, 64F; inner-electrode electrical connector 70 comprises an inner-electrode electrical connector 70, 70F (it is noted that the housing of inner-electrode electrical connector 70, 70F is not a component of handpiece 52, including not being a component of cap 62, 62B of handpiece 52); and inner-electrode electrical contact 71 comprises an inner-electrode electrical contact 71, 71F.

Reference is made to FIGS. 8O, 8P, and 8Q. Other than as described as follows, the configuration shown in FIGS. 8O, 8P, and 8Q are generally similar to the configuration shown in FIG. 8H, and like numbers refer to like parts. In the configuration shown in FIGS. 8O, 8P, and 8Q, cap 62 comprises a cap 62, 62B; electrical connecting system 64 comprises an electrical connecting system 64, 64F; inner-electrode electrical connector 70 comprises an inner-electrode electrical connector 70, 70F (it is noted that the housing of inner-electrode electrical connector 70, 70F is not a component of handpiece 52, including not being a component of cap 62, 62B of handpiece 52); inner-electrode electrical contact 71 comprises an inner-electrode electrical contact 71, 71F; and outer electrode 26 comprises an outer electrode 26, 26I, which is shaped so as to define proximal end 46, 46I.

Reference is made to FIGS. 8J-Q. For some applications, inner-electrode electrical connector 70, 70F, 70G, 70H of electrical connecting system 64, 64F comprises a pusher 80, which is located inside cap 62, 62B, which is shaped so as to define inner-electrode electrical contact 71, 71F, 71G, 70H, and which is configured to push inner-electrode electrical contact 71, 71F, 71G, 71H into electrical contact (typically, direct electrical contact) with inner electrode 30, 30G, 30H, 30I, 30K, 30L. Typically, pusher 80 is axially-oriented.

In the configuration shown in FIG. 8L, inner-electrode electrical contact 71G is in contact with inner electrode 30K via pusher 80 and spring 82, and inner-electrode electrical contact 71H is in contact with inner electrode 30L via cap 62 and its spring.

For some applications, such as shown in FIG. 8J, pusher 80 is configured to have a spring effect to maintain continuous contact between inner-electrode electrical contact 71 and inner electrode 30.

For some applications, such as shown in FIGS. 8K-Q, inner-electrode electrical connector 70, 70F, 70G, 70H further comprises a spring 82, which is configured to push pusher 80.

For some applications, such as shown in FIG. 8P, pusher 80, 80C is insulated to avoid any electrical contact with outer electrode 26, 26I of rotating cutting instrument 20, 20I.

For some applications, such as shown in FIG. 8Q, outer electrode 26 is configured to receive pusher 80, 80D and is insulated to avoid any electrical contact with pusher 80, 80D.

Reference is now made to FIGS. 9A-B and 9C-D, which are schematic isometric and cross-sectional views of respective alternative configurations of electrical cutting system 50, in accordance with respective applications of the present invention. In these alternative configurations, cap 62 comprises a cap 62, 62D. In the configuration shown in FIGS. 9A-B, inner-electrode electrical connector 70 comprises an inner-electrode electrical connector 70, 70I; inner-electrode electrical contact 71 comprises an inner-electrode electrical contact 71, 71I; and electrically-conductive inner electrode 30 comprises electrically-conductive inner electrode 30, 30I. In the configuration shown in FIGS. 9C-D, inner-electrode electrical connector 70 comprises an inner-electrode electrical connector 70, 70N; inner-electrode electrical contact 71 comprises an inner-electrode electrical contact 71, 71N; and electrically-conductive inner electrode 30 comprises electrically-conductive inner electrode 30, 30N.

Reference is now made to FIGS. 8I, 8J, 8K, and 9A-D. For some applications:

handpiece 52 is configured such that when rotating cutting instrument 20 is coupled to handpiece 52, distal end portion 28 of electrically-conductive outer electrode 26 of rotating cutting instrument 20 extends distally out of handpiece 52, and electrical connecting system 64, 64E, 64F, 64G is configured such that inner-electrode electrical contact 71, 71F, 71G, 71H, 71I is disposed within handpiece 52.

Reference is again made to FIGS. 9A-B. For some applications, inner-electrode electrical contact 71, 71I comprises at least one blade 81, 81A, 81B located inside cap 62, 62D.

For some applications, blade 81 is configured to have a spring effect to maintain a continuous contact with inner electrode 30, 30I.

Reference is again made to FIGS. 9C-D. For some applications, inner-electrode electrical contact 71, 71N of electrical connecting system 64, 64N comprises at least one wire 85 located inside cap 62, 62D. Optionally, for any of these applications, a proximal end portion of inner electrode 30, 30N may be shaped so as to define at least one groove 89, and the at least one wire 85 mechanically and electrically interfaces with the at least one groove 89.

For some applications, the at least one wire 85 is configured to have a spring effect to maintain a continuous contact with the at least one groove 89 of inner electrode 30, 30N.

Alternatively, inner-electrode electrical contact 71, 71N of electrical connecting system 64, 64N comprises at least one blade, at least one carbon contact, and/or at least one brush (e.g., carbon brush) that mechanically and electrically interfaces with the at least one groove 89 (configurations not shown, but similar to the configurations shown in FIGS. 8C and 8D, respectively, mutatis mutandis).

For some applications, inner-electrode electrical contact 71, 71A, 71B, 71C, 71D, 71E, 71G, 71H of electrical connecting system 64, 64A, 64B, 64C, 64D is configured to make punctual (i.e., at a point), planar, or non-planar contact with proximal end portion 32 of inner electrode 30, 30G, 30H, 30I, 30L.

For some applications, inner electrode 30, 30I proximally protrudes out of outer electrode 26, 26G.

Reference is now made to FIGS. 10A-D, which are schematic cross-sectional views of an alternative configuration of electrical cutting system 50, in accordance with respective applications of the present invention. In these alternative configurations:

cap 62 comprises a cap 62, 62E, cap 62, 62A, and a cap 62, 62F, respectively;

electrical connecting system 64 comprises an electrical connecting system 64, 64H, an electrical connecting system 64, 64I, an electrical connecting system 64, 64J, and an electrical connecting system 64, 64L, respectively;

inner-electrode electrical connector 70 comprises inner-electrode electrical connector 70, 70A, an inner-electrode electrical connector 70, 70J, an inner-electrode electrical connector 70, 70D, and an inner-electrode electrical connector 70, 70C, respectively;

inner-electrode electrical contact 71 comprises inner-electrode electrical contact 71, 71A, an inner-electrode electrical contact 71, 71J, an inner-electrode electrical contact 71, 71D, an inner-electrode electrical contact 71, 71C, respectively; and outer electrode 26 comprises outer electrode 26, 26G, an outer electrode 26, 26L, an outer electrode 26, 26J, and an outer electrode 26, 26M, respectively; and electrically-conductive inner electrode 30 comprises electrically-conductive inner electrode 30, 30G, electrically-conductive inner electrode 30, 30L, and electrically-conductive inner electrode 30, 30I, respectively.

Figure 10A:
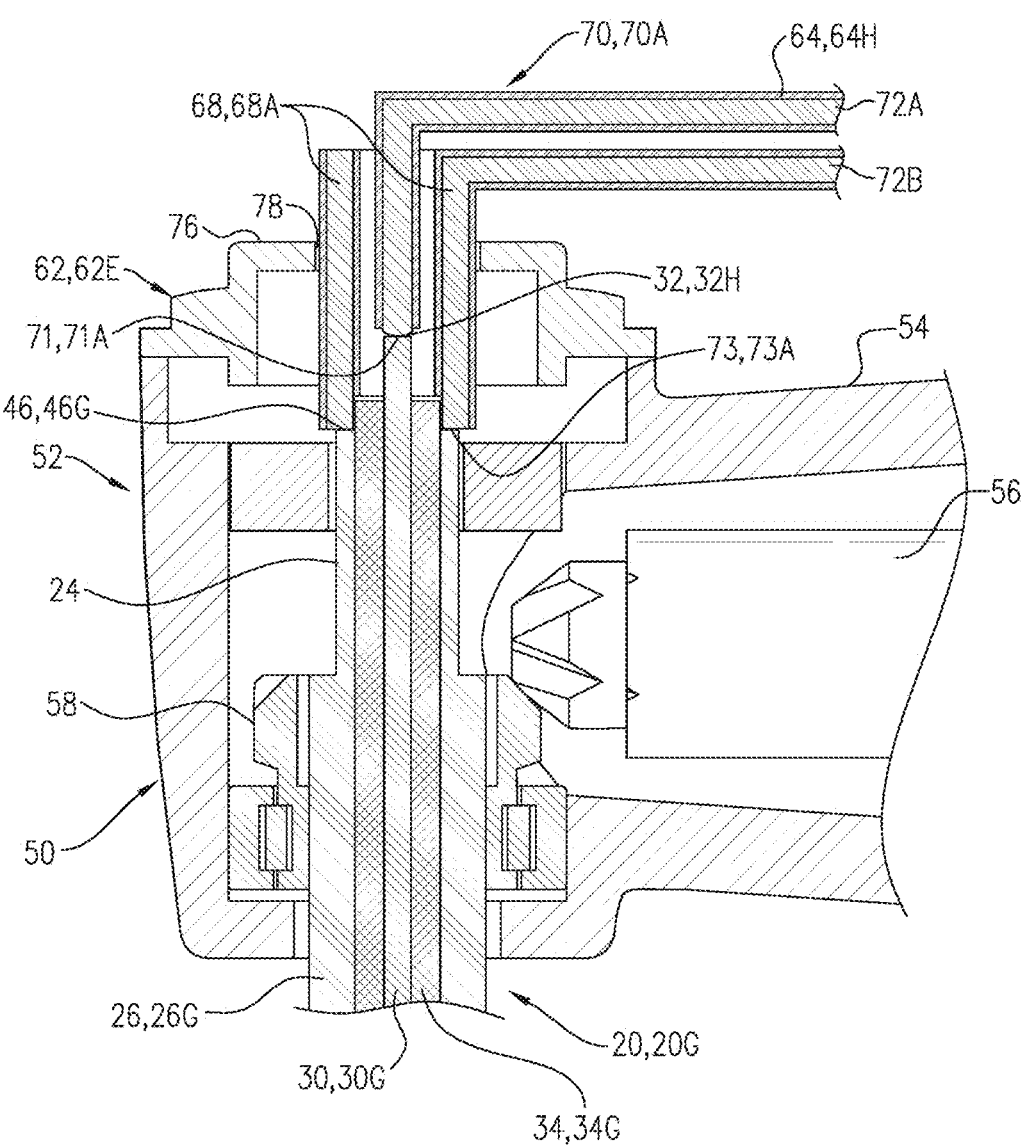
FIGS. 10A-D are schematic cross-sectional views of an alternative configuration of the electrical cutting system of FIG. 4, in accordance with respective applications of the present invention.

Reference is made to FIG. 10A. For some applications:

handpiece 52 is configured such that when rotating cutting instrument 20 is coupled to handpiece 52, distal end portion 28 of electrically-conductive outer electrode 26 of rotating cutting instrument 20 extends distally out of handpiece 52, and electrical connecting system 64, 64H is configured such that outer-electrode electrical contact 73, 73A is disposed within handpiece 52, and a portion of outer-electrode electrical connector 68, 68A passes through hole 78 defined by a proximal end part 76 of cap 62, 62E.

Reference is made to FIGS. 8A and 10A. For some applications, inner-electrode electrical contact 71, 71A of electrical connecting system 64, 64A, 64H is configured to be coupled in electrical contact with inner electrode 30, 30G, which proximally protrudes out of outer electrode 26, 26G.

Reference is made to FIGS. 8A and 10A. For some applications, outer electrode 26, 26G is located distally from proximal end part 76 of cap 62, 62A, 62E.

Figure 10B:
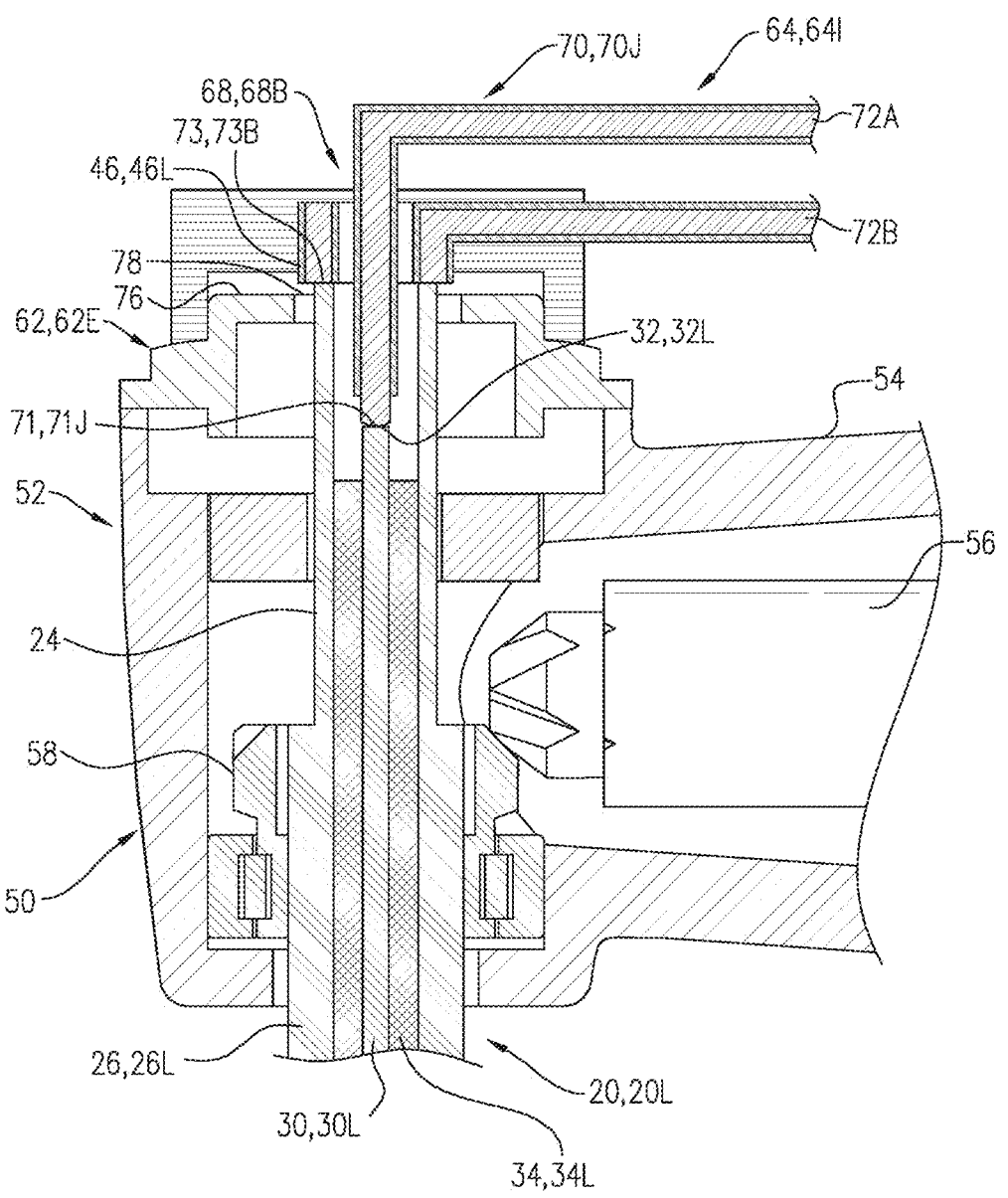

Reference is made to FIG. 10B. For some applications:

handpiece 52 is configured such that when rotating cutting instrument 20 is coupled to handpiece 52, distal end portion 28 of electrically-conductive outer electrode 26 of rotating cutting instrument 20 extends distally out of handpiece 52, and electrical connecting system 64, 64I is configured such that outer-electrode electrical contact 73, 73B of electrical connecting system 64, 64I is configured to be coupled in electrical contact with outer electrode 26, 26L of rotating cutting instrument 20, 20L, and outer electrode 26, 26L protrudes out of cap 62, 62E.

Figure 11A:
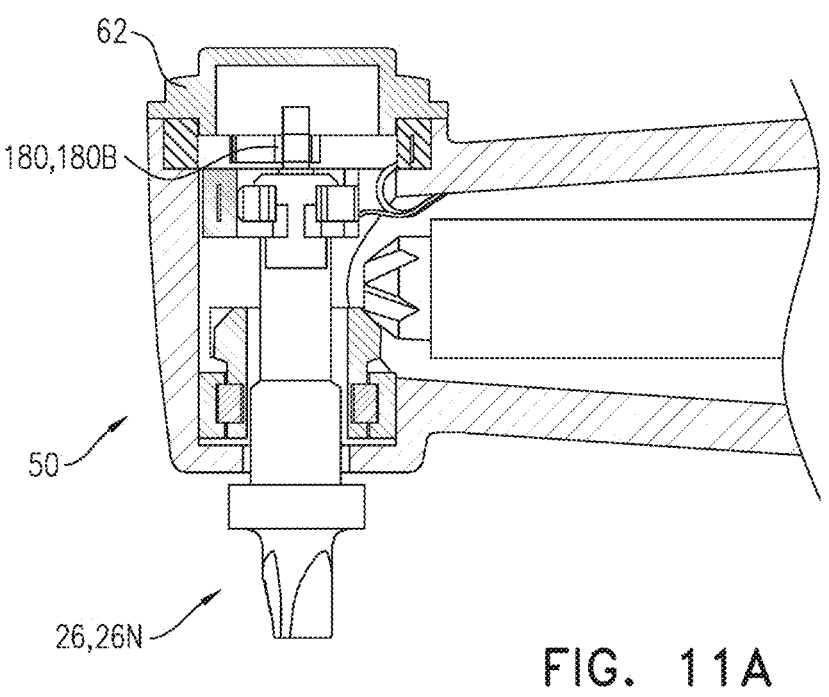
FIGS. 11A-B are schematic cross-sectional and isometric views of an alternative configuration of the electrical cutting system of FIG. 4, in accordance with an application of the present invention.
Figure 11B:
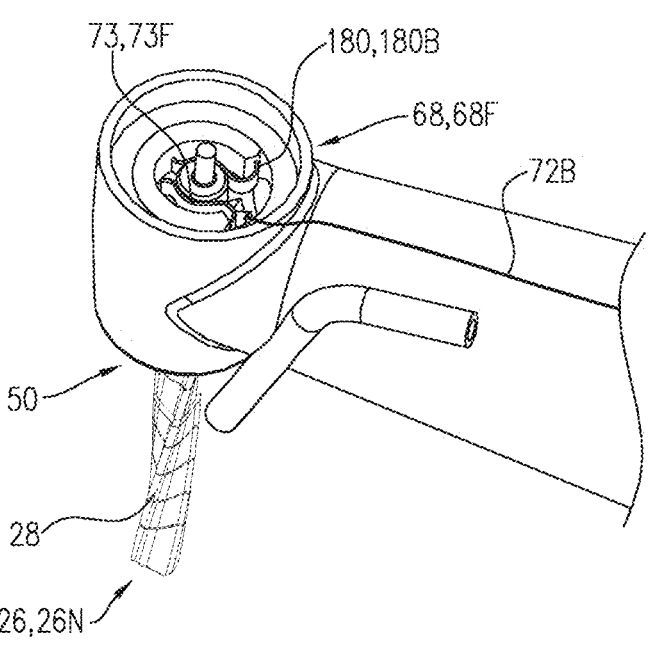

Reference is now made to FIGS. 11A-B, which are schematic cross-sectional and isometric views of an alternative configuration of electrical cutting system 50, in accordance with an application of the present invention.

Figure 12A:
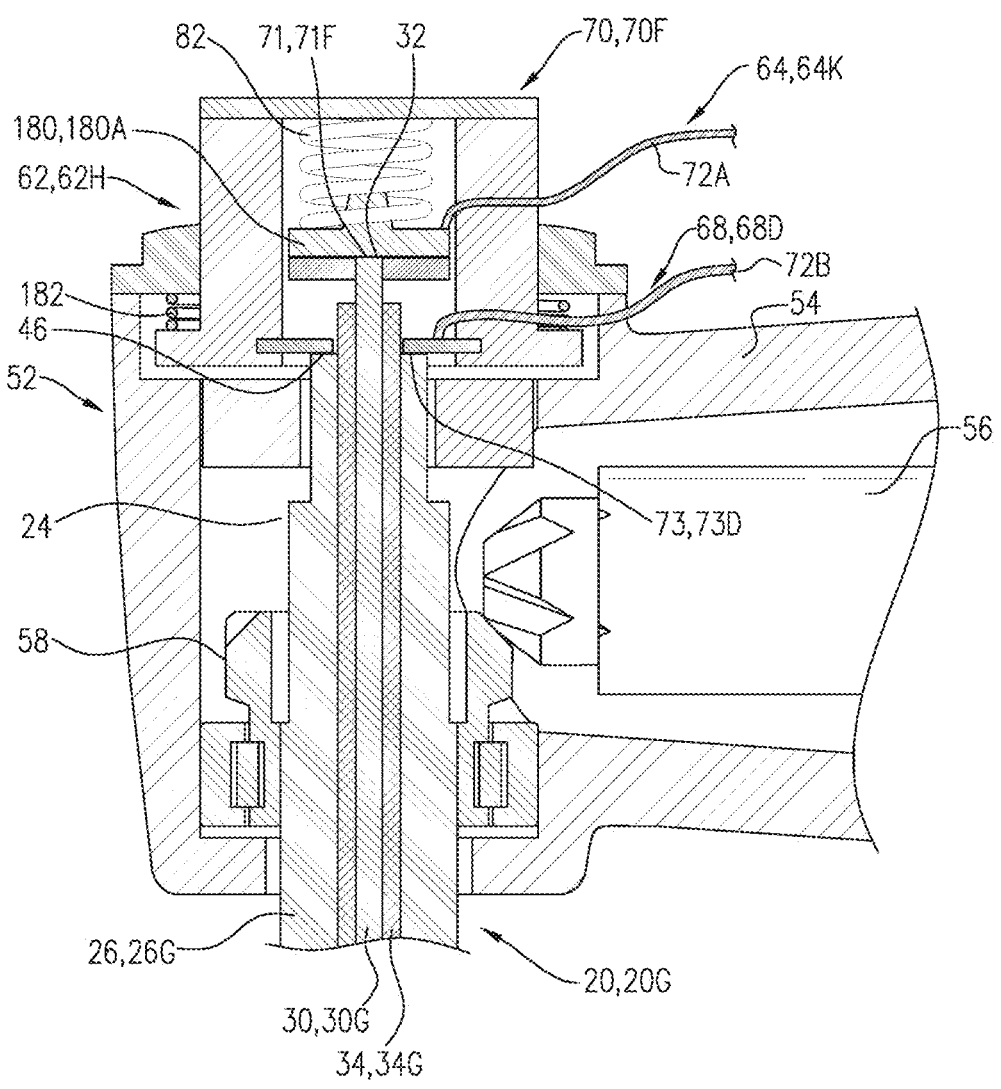
FIGS. 12A and 12B are schematic cross-sectional views of an alternative configuration of the electrical cutting system of FIG. 4, in accordance with respective applications of the present invention.
Figure 12B:
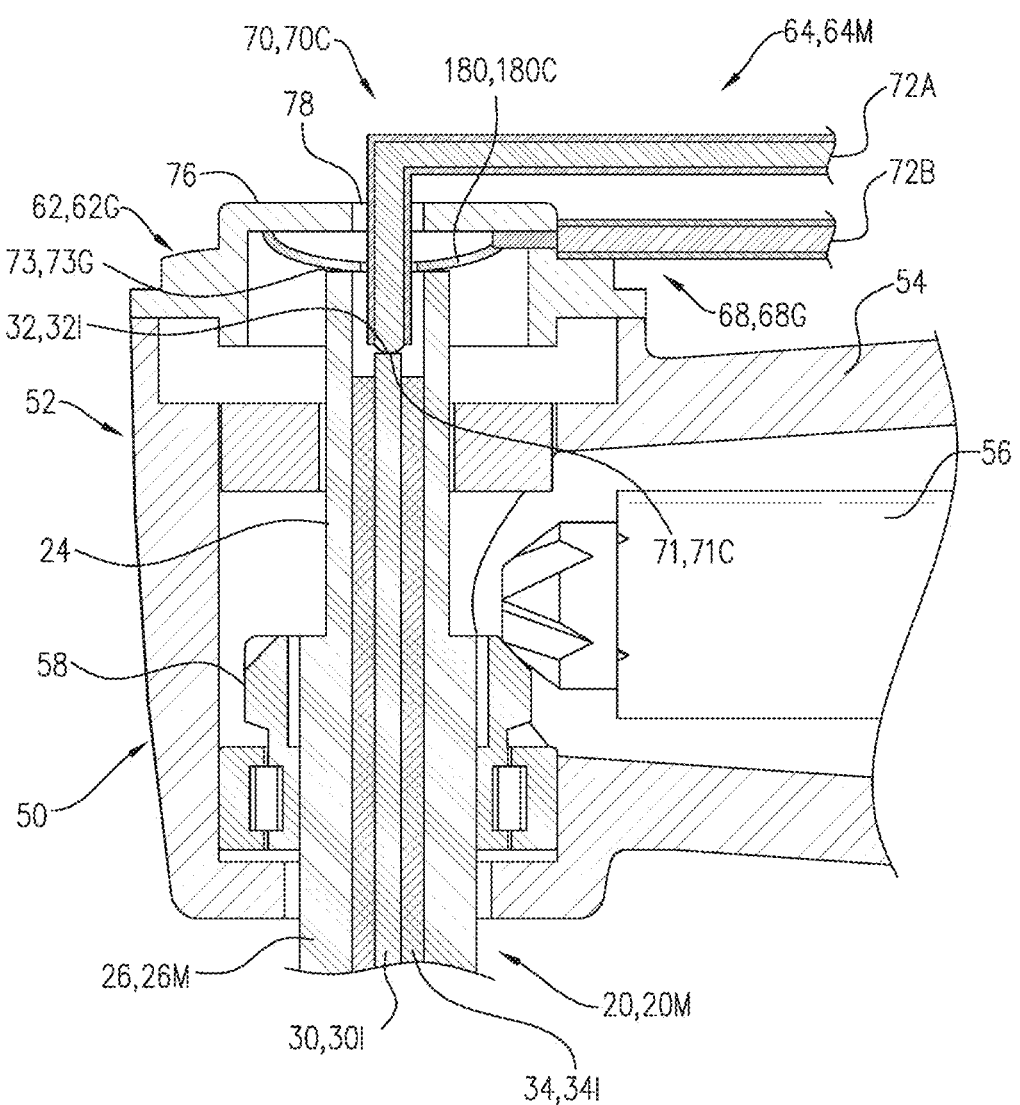

Reference is also made to FIGS. 12A and 12B, which are schematic cross-sectional views of an alternative configuration of electrical cutting system 50, in accordance with respective applications of the present invention.

For some applications, such as shown in FIGS. 11A-B, 12A, and 12B, outer-electrode electrical connector 68, 68F, 68D, 68G of electrical connecting system 64, 64K comprises a pusher 180, 180A, 180B, 180C which is (a) located inside cap 62, 62H, 62G, (b) shaped so as to define outer-electrode electrical connector 68, and (c) configured to push outer-electrode electrical contact 73 into electrical contact with outer electrode 26, 26G, 26M, 26N. For some applications, such as those in which cap 62, 62H, 62G is not necessarily electrically conductive, insulated electrical wire 72B passes through a wall of the cap and is electrically coupled to pusher 180, 180A, 180B, 180C. For other applications, the cap is electrically conductive and the electrical connection is made via the cap. Typically, pusher 180, 180A, 180B is axially-oriented and pusher 180, 180C is laterally-oriented.

For some applications, pusher 180, 180B is configured to have a spring effect to maintain continuous contact between outer-electrode electrical contact 73 and outer electrode 26, 26N (e.g., using at least one lateral blade, carbon contact, wire, and/or brush (e.g., carbon brush)).

For some applications, such as shown in FIG. 12A, outer-electrode electrical contact 73, 73D further comprises a spring 182, which is configured to push pusher 180.

For some applications, pusher 180, 180C is configured to have a spring effect to maintain continuous contact between outer-electrode electrical contact 73 and outer electrode 26, 26M (e.g., using at least one axial blade).

Figure 13:
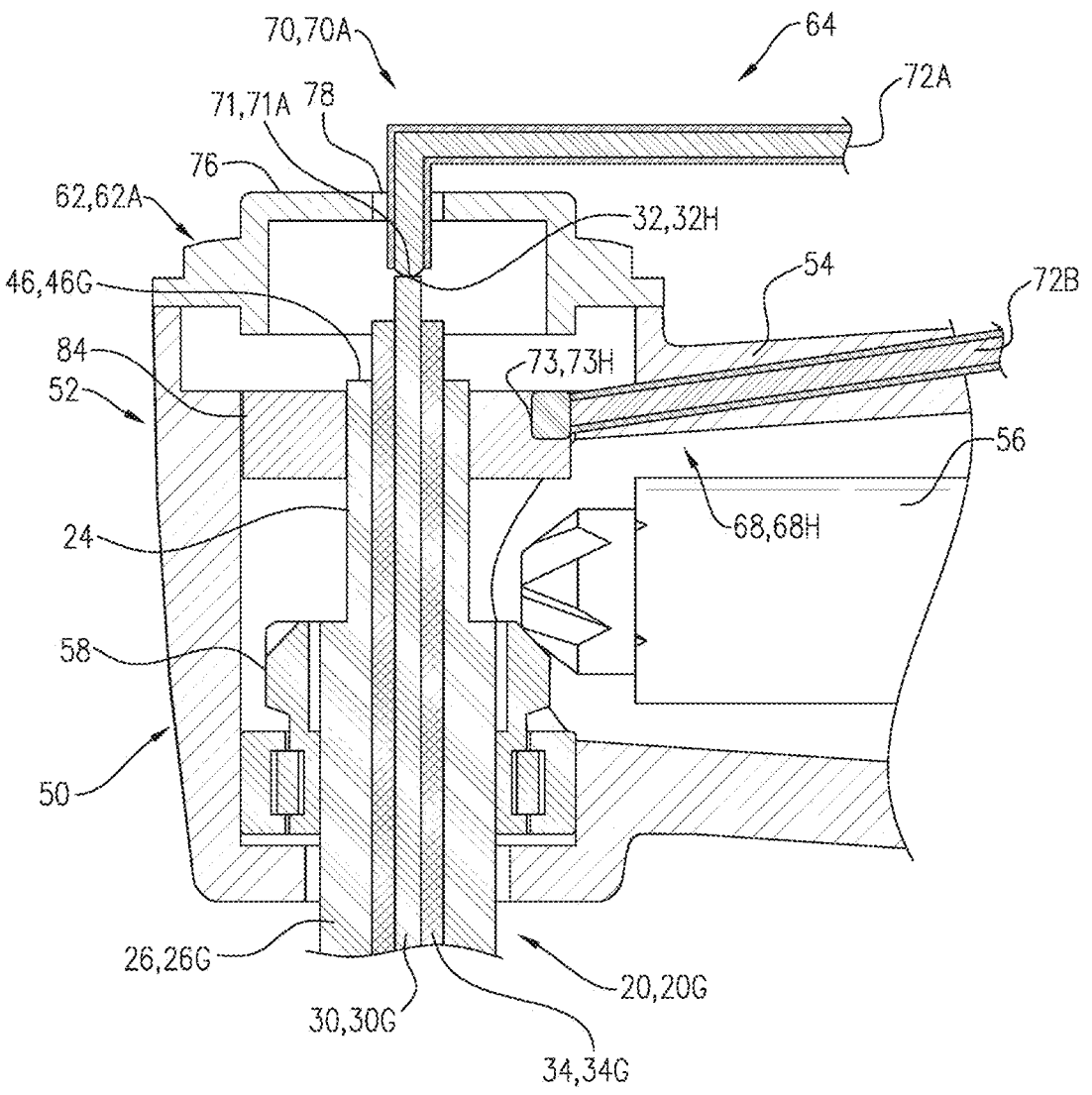
FIG. 13 is a schematic cross-sectional view of an alternative configuration of the electrical cutting system of FIG. 4, in accordance with an application of the present invention.

Reference is also made to FIG. 13, which is a schematic cross-sectional view of an alternative configuration of electrical cutting system 50, in accordance with an application of the present invention.

For some applications, such as shown in FIG. 13, an outer-electrode electrical contact 73, 73H of electrical connecting system 64 comprises conductive bearings 84, and is configured to be coupled in electrical contact with outer electrode 26 of rotating cutting instrument 20 via conductive bearings 84. Conductive bearings 84 may comprise a conductive material, or may comprise a non-conductive core coating with a conductive material, such as a conductive lubricant, in order to provide the conductivity of the bearings.

Reference is made to FIGS. 8A, 8F, 8G, 8H, 10A, 10B, 10C, 10D, and 12B. For some applications, a portion of inner-electrode electrical connector 70, 70A, 70B, 70C, 70D, 70J of electrical connecting system 64, 64A, 64B, 64C, 64D, 64E, 64H, 64I, 64J, 64L, 64M passes through hole 78 of cap 62, 62A, 62E, 62F, 62G.

For some of these applications, such as shown in FIG. 8I, inner-electrode electrical contact 71, 71E is configured to be coupled in electrical contact with inner electrode 30, 30J of rotating cutting instrument 20, 20J, and inner electrode 30, 30J protrudes out of cap 62, 62A via hole 78.

Reference is now made to FIGS. 7A, 7B, 8A, 8F, 8G, 8H, 10B, 10C, 10D, and 12B. For some applications:

handpiece 52 is configured such that when rotating cutting instrument 20 is coupled to handpiece 52, distal end portion 28 of electrically-conductive outer electrode 26 of rotating cutting instrument 20 extends distally out of handpiece 52, and electrical connecting system 64, 64A, 64B, 64C, 64D, 64I, 64J, 64L, 64M is configured such that inner-electrode electrical contact 71, 71A, 71B, 71C, 71D, 71J is disposed within handpiece 52, and a portion of inner-electrode electrical connector 70, 70A, 70B, 70C, 70D, 70J passes through hole 78 defined by a proximal end part 76 of cap 62, 62A, 62E, 62F, 62G.

Reference is made to FIGS. 8A, 8F, 8G, 8H, 8I, 8L, 10A, 10C, 10D, and 12B. For some applications, inner-electrode electrical contact 71, 71A, 71B, 71C, 71D, 71E, 71G, 71H of electrical connecting system 64, 64A, 64B, 64C, 64D is configured to be electrically coupled to proximal end portion 32 of inner electrode 30, 30G, 30H, 30I, 30L.

Figure 10C:
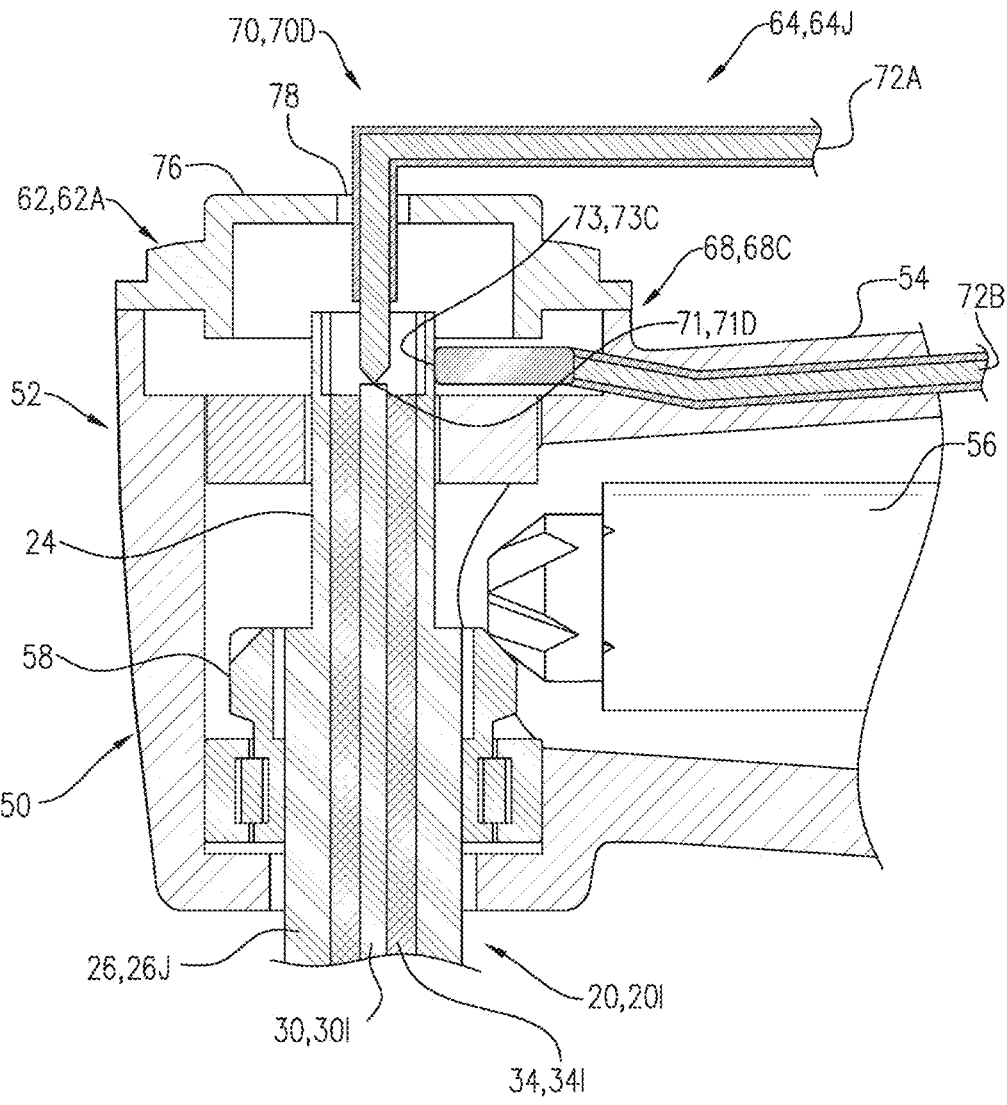

Reference is made to FIGS. 10C, 12A, and 12B. For some applications:

handpiece 52 is configured such that when rotating cutting instrument 20 is coupled to handpiece 52, distal end portion 28 of electrically-conductive outer electrode 26 of rotating cutting instrument 20 extends distally out of handpiece 52, and electrical connecting system 64, 64J, 64K, 64M is configured such that outer-electrode electrical contact 73, 73C, 73D, 73E, 73F, 73G, 73H is disposed within handpiece 52.

Reference is made to FIG. 10C. For some applications, outer-electrode electrical contact 73, 73C of electrical connecting system 64, 64J is configured to be coupled in direct electrical contact with outer electrode 26, 26J of rotating cutting instrument 20, 20I. The electrical contact in this configuration may be made as shown in FIG. 10C, or may alternatively be made via blades, wires, carbon contacts, and/or brushes, with or without grooves, such as described elsewhere herein, mutatis mutandis, e.g., in FIGS. 18E-G.

Figure 10D:
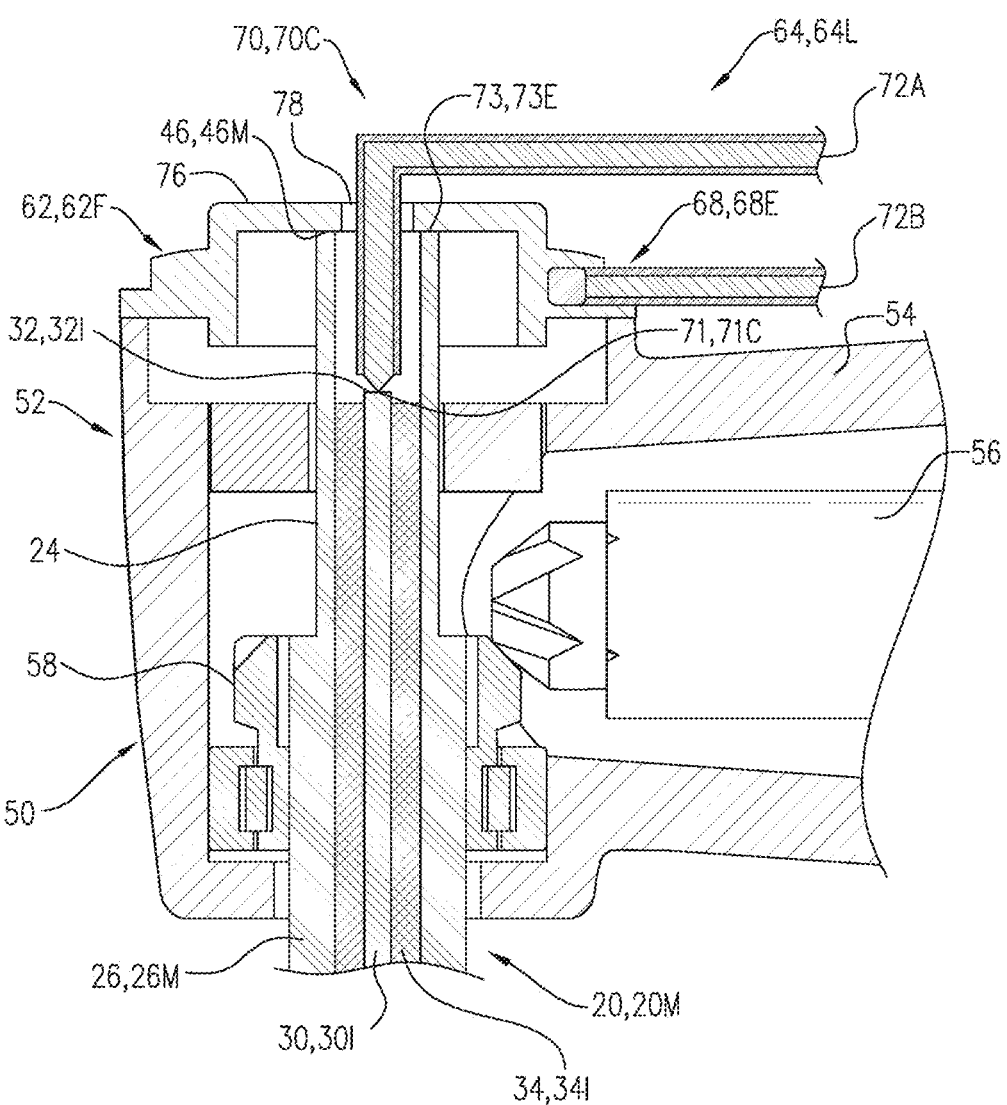

Reference is made to FIGS. 10D and 12A. For some applications, outer-electrode electrical connector 68, 68D, 68E of electrical connecting system 64, 64K, 64M is in electrical contact with cap 62, 62E, 62H.

Reference is made to FIG. 10D. For some applications, cap 62, 62F is configured to serve as outer-electrode electrical contact 73, 73E and to be coupled in direct electrical contact with outer electrode 26, 26M of rotating cutting instrument 20, 20M.

Figures 14A, 14B:
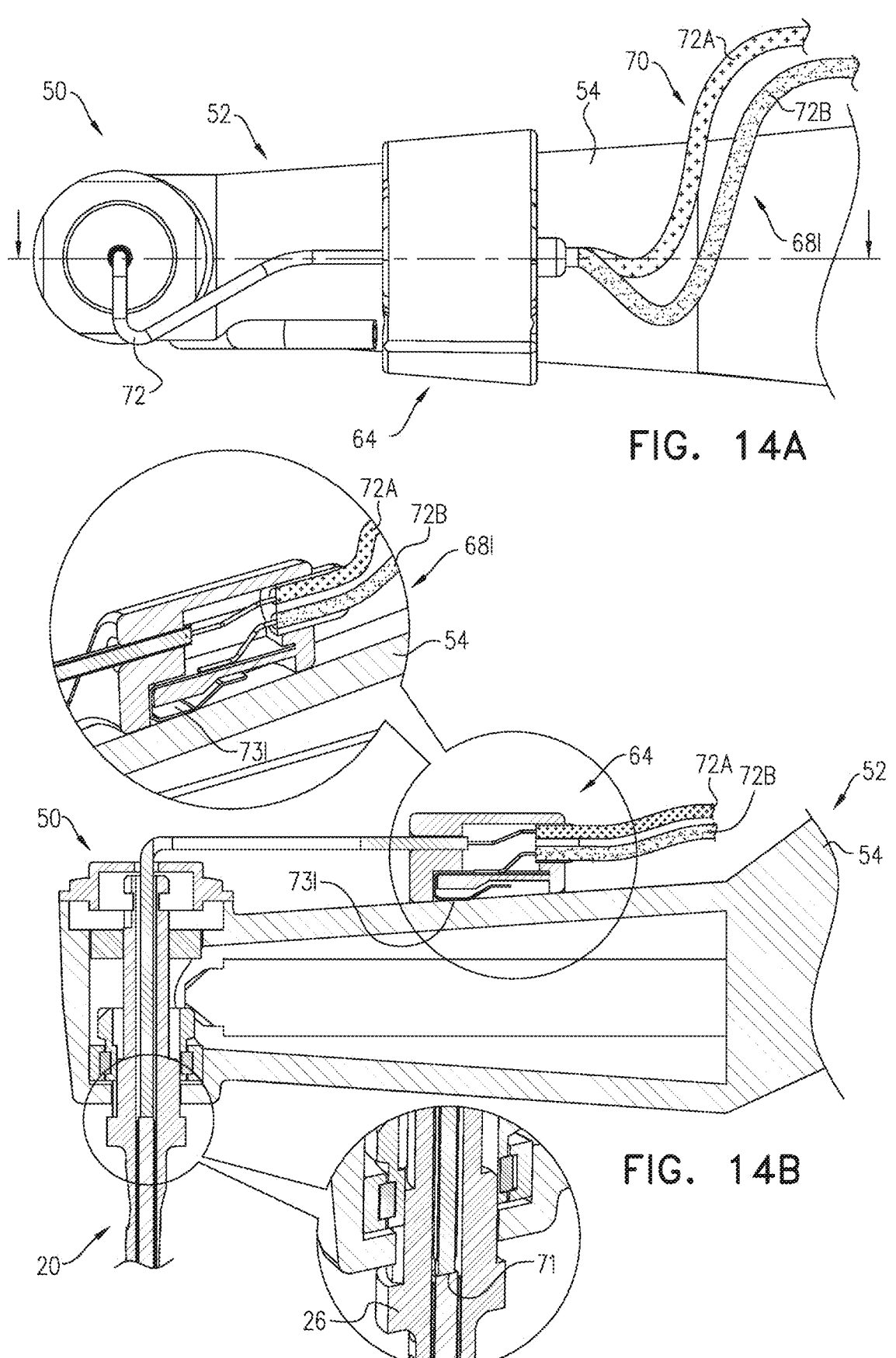
FIGS. 14A-B are schematic isometric and cross-sectional views of an alternative configuration of the electrical cutting system of FIG. 4, in accordance with an application of the present invention.

Reference is also made to FIGS. 14A-B, which are schematic isometric and cross-sectional views of an alternative configuration of electrical cutting system 50, in accordance with an application of the present invention. For some applications, outer-electrode electrical connector 68, 68I of electrical connecting system 64 is configured to be coupled in electrical contact with outer electrode 26 of rotating cutting instrument 20 via external casing 54. In this configuration, external casing 54 of handpiece 52 is electrically conductive, and contact between insulated electrical wire 72B and outer electrode 26 is made indirectly via external casing 54 of handpiece 52, using the outer-electrode electrical contact 73, 73I, which may, for example, be shaped as a blade, such as shown in FIG. 14B.

Reference is made to FIGS. 7A-B, 8A-Q, 9A-D, 10A-D, 11A-B, 12A-B, 13, and 14A-B. For some applications, handpiece 52 is configured such that when rotating cutting instrument 20 is coupled to handpiece 52, outer-electrode electrical contact 73 is in electrical contact with electrically-conductive outer electrode 26 via the proximal electrically-conductive shank 24.

Reference is made to the FIGS. 15A-C, which are schematic side-view illustrations of respective configurations of a rotating cutting instrument 120, 120A, 120B, 120C, respectively, in accordance with respective applications of the present invention.

Reference is also made to FIGS. 16A-C, which are schematic top views of respective configurations of cutting instrument 120, 120A, 120B, 120C, respectively, in accordance with respective applications of the present invention.

Figures 17A, 17B, 17C:
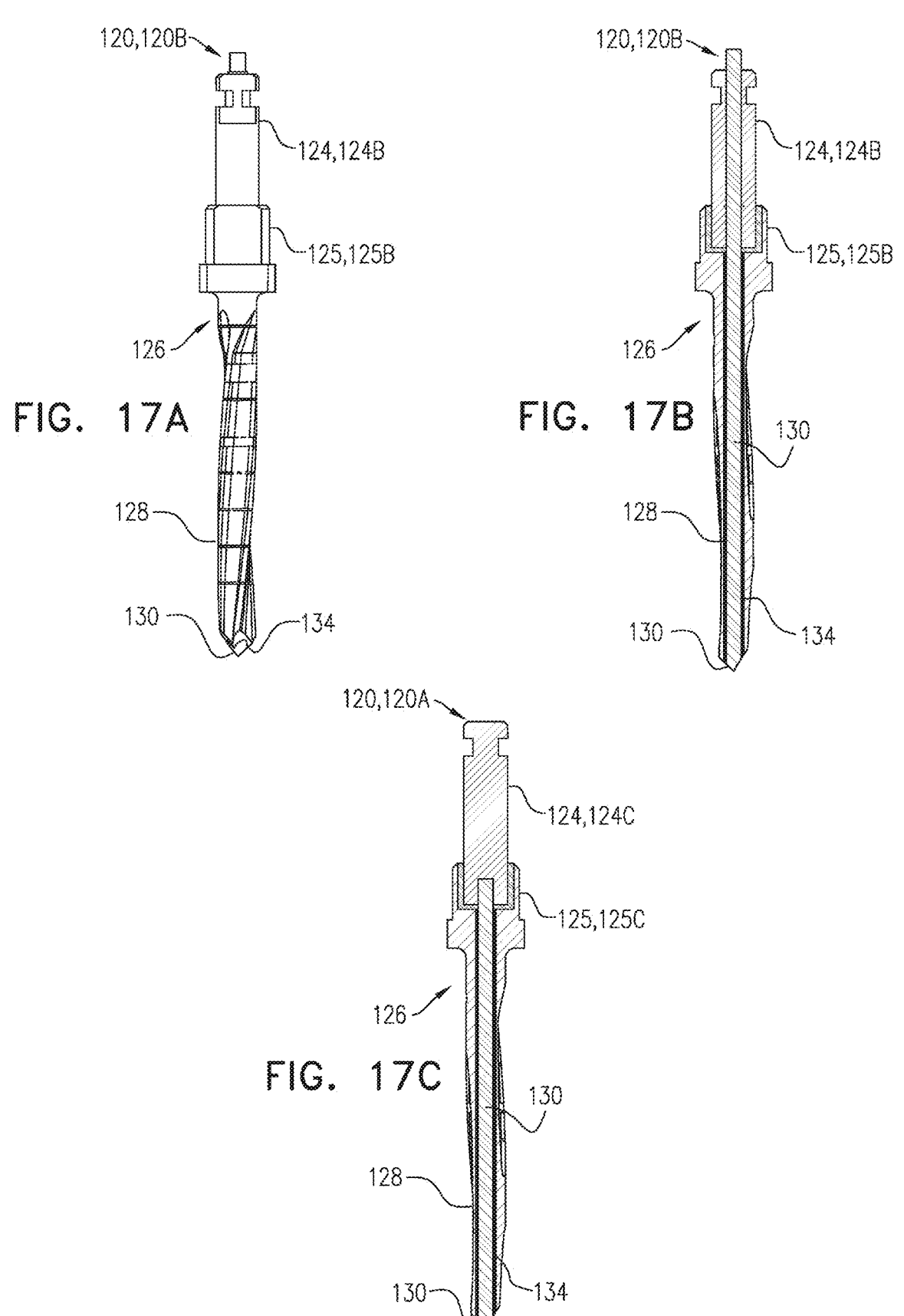
FIGS. 17A and 17B are schematic isometric and cross-sectional views of the cutting instrument of FIG. 15B, in accordance with an application of the present invention.
FIG. 17C is a schematic cross-sectional view of the cutting instrument of FIG. 15A, in accordance with an application of the present invention.

Reference is further made to FIGS. 17A and 17B, which are schematic isometric and cross-sectional views, respectively, of cutting instrument 120, 120B, in accordance with an application of the present invention, and to FIG. 17C, which is a schematic cross-sectional view of cutting instrument 120, 120A, in accordance with an application of the present invention. Reference is also made to FIGS. 17D-G, which are schematic cross-sectional views of cutting instruments 120, 120D, 120E, 120F, 120G, in accordance with respective applications of the present invention.

In some embodiments of the present invention, rotating cutting instrument 120 comprises:

an electrically-conductive outer electrode 126, which comprises:

an electrically conductive distal end portion 128 that is shaped so as to penetrate tissue when rotated; and an electrically-conductive proximal portion 125, configured to receive torque;

an electrically-conductive inner electrode 130; and an electrical isolation layer 134 between electrically-conductive outer electrode 126 and electrically-conductive inner electrode 130, so as to electrically isolate electrically-conductive outer electrode 126 and electrically-conductive inner electrode 130 from each other.

For some applications, such as shown in FIGS. 17A-F, rotating cutting instrument 120, 120A, 120B, 120C, 120D, 120E, 120F further comprises a shank 124, 124A, 124B, 124C, 124D, 124E, 124F.

For some of these applications, such as shown in FIGS. 17A-E, shank 124, 124A, 124B, 124C, 124D, 124E is electrically-conductive, and is:

electrically connected to the electrically-conductive inner electrode 130, electrically insulated from outer electrode 126, and located proximal to outer electrode 126; and For others of these applications, such as shown in FIG. 17F, shank 124, 124F is not electrically-conductive, i.e., is electrically insulative.

For some applications, such as shown in FIGS. 17B, 17C, and 17F, shank 124, 124B, 124C, 124F and electrically-conductive inner electrode 130 comprise separate pieces that are directly mechanically and electrically coupled to each other.

For other applications, such as shown in FIGS. 17D and 17E, shank 124, 124D, 124E is integral with electrically-conductive inner electrode 130.

For still other applications, such as shown in FIG. 17G, rotating cutting instrument 120, 120G may be considered to lack a shank (or electrically-conductive inner electrode 130 may be considered to be a very thin shank).

For some applications, such as shown in FIGS. 17B and 17C, electrical isolation layer 134 includes more than one cylindrical portion having differing diameters, which are connected to each other by a disc-shaped portion of the electrical isolation layer.

For some applications, rotating cutting instrument 20 comprises a drill bit, a burr, or a milling drill bit.

FIGS. 17B-C show two configurations of the connection between shank 124, 124B, 124C and inner electrode 130, with and without the inner electrode protruding proximally, respectively. Similarly, FIGS. 17D-E show two configurations of shank 124, 124D, 124E and inner electrode 130, with and without the inner electrode protruding proximally, respectively.

For some applications, such as shown in FIG. 1A, rotating cutting instrument 20 comprises a rotating cutting instrument 20, 20A, and proximal electrically-conductive shank 24 comprises a proximal electrically-conductive shank 24, 24A that is integral with electrically-conductive distal end portion 28, 28A.

For some applications, rotating cutting instrument 120 comprises exactly one electrically-conductive outer electrode 126 and exactly one electrically-conductive inner electrode 130, and electrical isolation layer 134 is radially between exactly one electrically-conductive outer electrode 126 and the exactly one electrically-conductive inner electrode 130.

For some applications, one or more of the following elements are coated, e.g., with gold or a diamond-like carbon coating: shank 124, inner-electrode electrical contact 171, outer electrode 126, and/or outer-electrode electrical contact 173.

For some applications (not shown, but similar to the configuration shown in FIG. 8L, mutatis mutandis), rotating cutting instrument 120 comprises:

a plurality of electrically-conductive inner electrodes 130;

a plurality of electrical isolation layers 134 between electrically-conductive outer electrode 126 and the plurality electrically-conductive inner electrodes 130, so as to electrically isolate electrically-conductive outer electrode 126 and electrically-conductive inner electrodes 130 from one other; and typically, a single electrically-conductive outer electrode 126.

Rotating cutting instrument may alternatively comprise a plurality of electrically-conductive outer electrodes and a single inner electrode, similar to the configuration shown in FIG. 8M, mutatis mutandis.

Reference is still made to FIGS. 15A-C, 16A-C, and 17A-C, and is additionally made to FIGS. 2A-C, 3A-C, and 4A-B. For some applications, such as those in which rotating cutting instrument 20, 120 is a dental drill bit, rotating cutting instrument 20, 120 has one or more of the following dimensions:

a length of rotating cutting instrument 20, 120 is between 3 and 80 mm, a length of shank 24, 124 is between 5 and 30 mm, such as between 10 and 20 mm, e.g., 15 mm, and/or equals at least 5%, e.g., at least 10%, such as at least 15%, e.g., at least 20%, such as at least 25% of a length of rotating cutting instrument 20, 120; no more than 95%, such as no more than 70%, e.g., no more than 60%, such as no more than 50%, e.g., no more than 45% of the length of rotating cutting instrument 20, 120; and/or between 5% and 70%, e.g., between 10% and 60%, such as between 15% and 50%, e.g., between 20% and 45%, such as between 25% and 45%, e.g., 40%, of the length of rotating cutting instrument 20, 120, and/or an outer diameter of shank 24, 124 is between 1.5 and 4 mm, such as between 1.6 and 3 mm, e.g., 2.35 mm.

For some applications, such as those in which rotating cutting instrument 20, 120 is an orthopedic drill bit, rotating cutting instrument 20, 120 has one or more of the following dimensions:

a length of rotating cutting instrument 20, 120 is between 25 and 500 mm, a length of shank 24, 124 is between 5 mm and 50 mm, such as between 10 and 30 mm, e.g., 20 mm, and/or equals between 5% and 70% of the length of rotating cutting instrument 20, 120, such as between 10% to 50%, and/or an outer diameter of shank 24, 124 is between 1.5 and 4 mm, such as between 1.6 and 3 mm, e.g., 2.35 mm.

Reference is again made to FIG. 4. In some applications of the present invention, an electrical cutting system 150 is provided for use with a surgical motor 174 and a control unit 175 for surgical motor 174. Optionally, rotating cutting instrument 120 may implement any of the features of rotating cutting instrument 20, described hereinabove with reference to FIGS. 1A-14B, mutatis mutandis, and/or electrical cutting system 150 may implement any of the features of electrical cutting system 50, described hereinabove with reference to FIGS. 4-14B, mutatis mutandis.

Electrical cutting system 150 comprises rotating cutting instrument 120, and further comprises:

a handpiece 152, which comprises an external casing 154;

a torque transmitter 158, configured to transmit the torque generated by surgical motor 74 to electrically-conductive outer electrode 126 when rotating cutting instrument 120 is coupled to handpiece 152; and a cap 162, which is coupled to external casing 154;

a central unit 166, which is configured to emit signals to and collect signals from rotating cutting instrument 120 and provide information to a user of electrical cutting system 150; and an electrical connecting system 164 configured to electrically connect electrically-conductive outer electrode 126 and electrically-conductive inner electrode 130 to central unit 66.

Central unit 166 may implement any of the techniques of central unit 66, described hereinbelow with reference to FIG. 4.

Reference is now made to FIGS. 18A-G, which are schematic cross-sectional illustrations of respective configurations of electrical connecting system 164, in accordance with respective applications of the present invention. Electrical connecting system 164 comprises:

an outer-electrode electrical connector 168, which comprises an outer-electrode electrical contact 173 and an insulated electrical wire 172B electrically coupled to outer-electrode electrical contact 173 and to central unit 66; and an inner-electrode electrical connector 170, which comprises an inner-electrode electrical contact 171 and an insulated electrical wire 172A electrically coupled to inner-electrode electrical contact 171 and to central unit 66.

Handpiece 152 is configured such that when rotating cutting instrument 120 is coupled to handpiece 152, outer-electrode electrical contact 173 is in electrical contact with electrically-conductive outer electrode 126, and inner-electrode electrical contact 171 is in electrical contact with electrically-conductive inner electrode 130.

Typically, electrical connecting system 164 is configured such that at least a portion of one or both inner-electrode wire 172A and outer-electrode wire 172B passes through at least a portion of handpiece 152.

Reference is again made to FIG. 5, which is a schematic cross-sectional illustration of a distal portion of handpiece 152, in accordance with an application of the present invention. For some applications, handpiece 152 further comprises a power transmission mechanism 156 which is configured to directly or indirectly drive torque transmitter 158.

For some applications, handpiece 152 further comprises bearings 160, which are configured to guide rotation of torque transmitter 158.

Reference is again made to FIG. 6, which is a schematic illustration of a distal portion of handpiece 152, in accordance with an application of the present invention. For some applications, handpiece 152 further comprises a mechanical connection mechanism 163, which is configured to be mechanically coupled to surgical motor 174.

For some applications, such as shown in FIGS. 15A and 16A, rotating cutting instrument 120 comprises a rotating cutting instrument 120, 120A, and a proximal portion 138, 138A of proximal electrically-conductive shank 124, 124A is shaped so as to define at least one lateral planar surface 140 that is configured to receive the torque from handpiece 152.

For some applications, such as shown in FIGS. 15B and 16B, rotating cutting instrument 120 comprises a rotating cutting instrument 120, 120B, and electrically-conductive proximal portion 125, 125B of electrically-conductive outer electrode 126 is shaped so as to define a circular cross-section (e.g., a cylinder, a cone, or another shape having a circular cross-section) except for at least one lateral planar surface 144 that is configured to receive the torque from handpiece 152.

For some applications, such as shown in FIGS. 15C and 16C, rotating cutting instrument 120 comprises a rotating cutting instrument 120, 120C, and electrically-conductive proximal portion 125, 125C of electrically-conductive outer electrode 126 is shaped so as to have a non-polygonal (and typically non-circular) cross-section that is configured to receive the torque (e.g., a star, e.g., a six-point star).

For some applications, electrical cutting system 150 is configured to electrically connect electrically-conductive inner electrode 130 to ground, like the configuration shown in FIG. 7A for electrical cutting system 50, mutatis mutandis.

For some applications, electrical cutting system 150 is configured to electrically connect electrically-conductive outer electrode 126 to ground, like the configuration shown in FIG. 7B for electrical cutting system 50, mutatis mutandis.

Figure 18A:
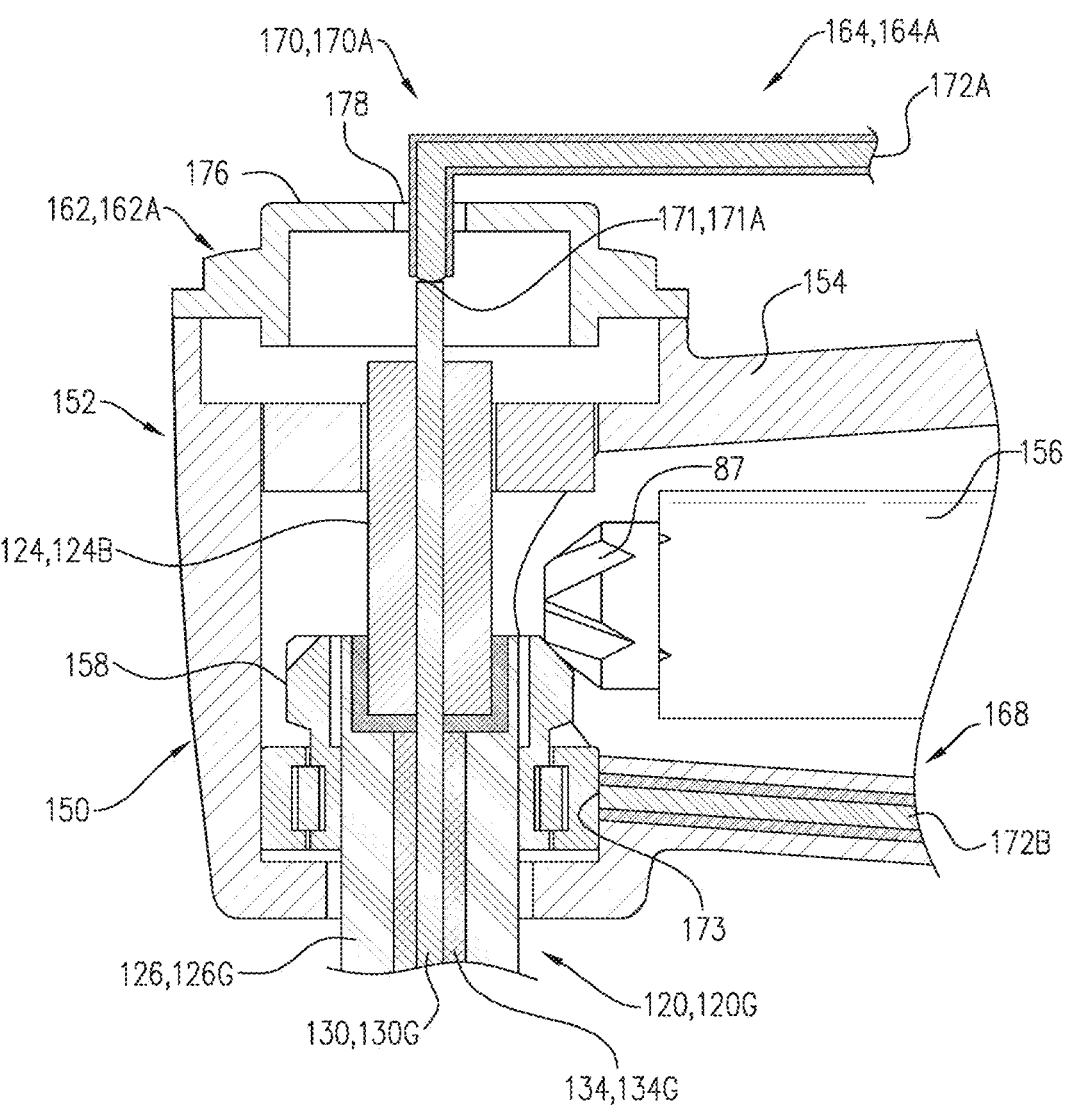
FIGS. 18A-G are schematic cross-sectional illustrations of respective configurations of an electrical connecting system, in accordance with respective applications of the present invention.

For some applications, such as shown in FIG. 18A, inner-electrode electrical contact 171, 171A is configured to be directly electrically connected to electrically-conductive inner electrode 130.

Figure 18B:
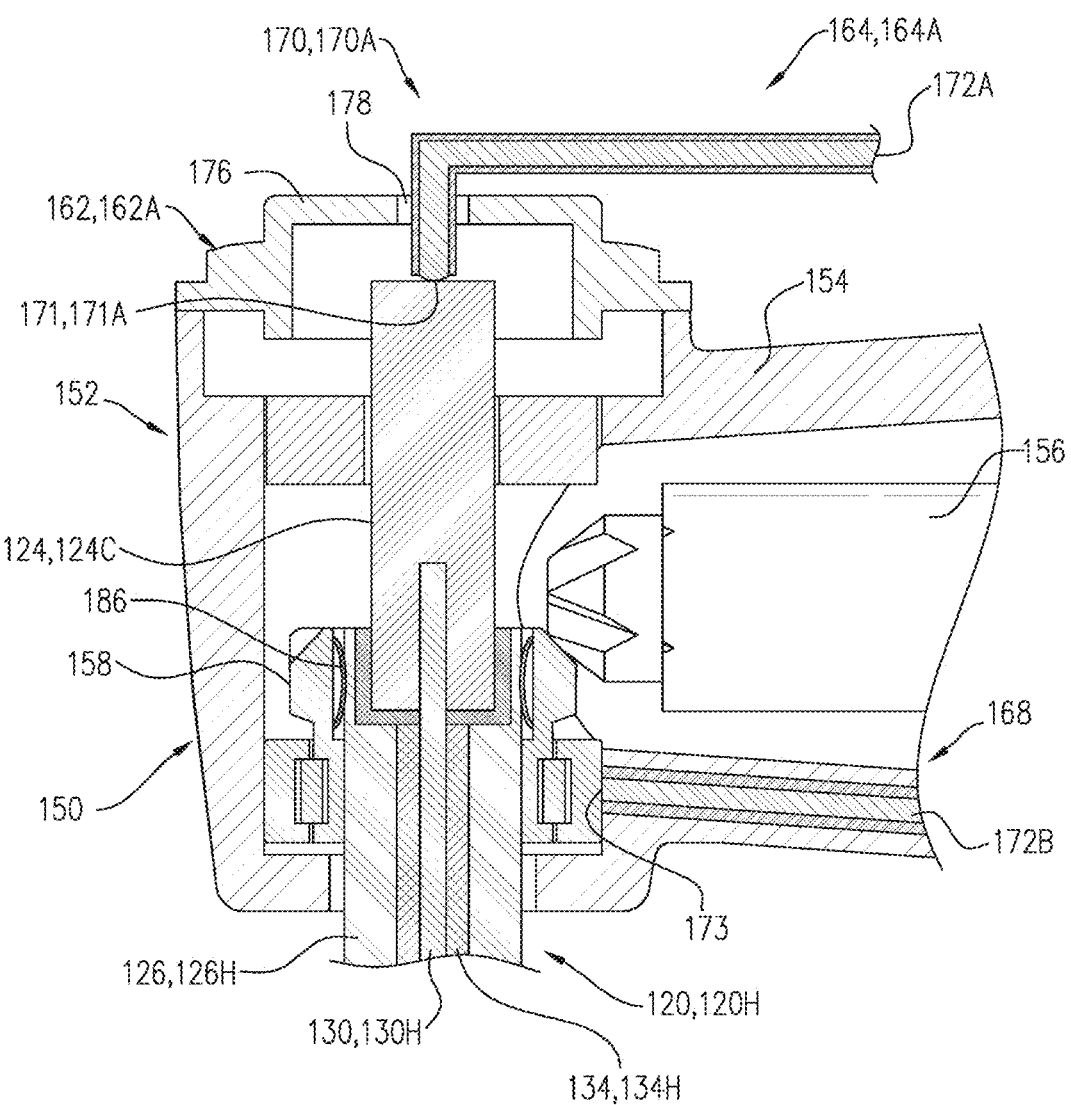

For some applications, such as shown in FIG. 18B, inner-electrode electrical contact 171, 171A is configured to be electrically connected to shank 124, 124C, such that inner-electrode electrical contact 171, 171A is indirectly in electrical connection with electrically-conductive inner electrode 130 via shank 124, 124C.

For some applications, such as shown in FIGS. 18A and 18B:

handpiece 152 is configured such that when rotating cutting instrument 120 is coupled to handpiece 152, distal end portion 128 of electrically-conductive outer electrode 126 of rotating cutting instrument 120 extends distally out of handpiece 152, and electrical connecting system 164, 164A, 164E is configured such that inner-electrode electrical contact 171, 171A is disposed within handpiece 152, and a portion of inner-electrode electrical connector 170, 170A passes through a hole 178 defined by a proximal end part 176 of cap 162, 162A.

(It is noted that the housing of inner-electrode electrical connector 170, 170E is not a component of handpiece 152, including not being a component of cap 162, 162A of handpiece 152.)

For some applications, such as shown in FIGS. 18B, inner-electrode electrical contact 171, 171A of electrical connecting system 164, 164A is configured to be electrically coupled to shank 124, 124C. Cap 162, 162A is shaped so as to define hole 178 therethrough. Shank 124, 124C is located distal to proximal end part 176 of cap 162, 162A, typically within cap 162, 162A. Inner-electrode electrical connector 170, 170A passes into cap 162, 162A via hole 178.

Figure 18C:
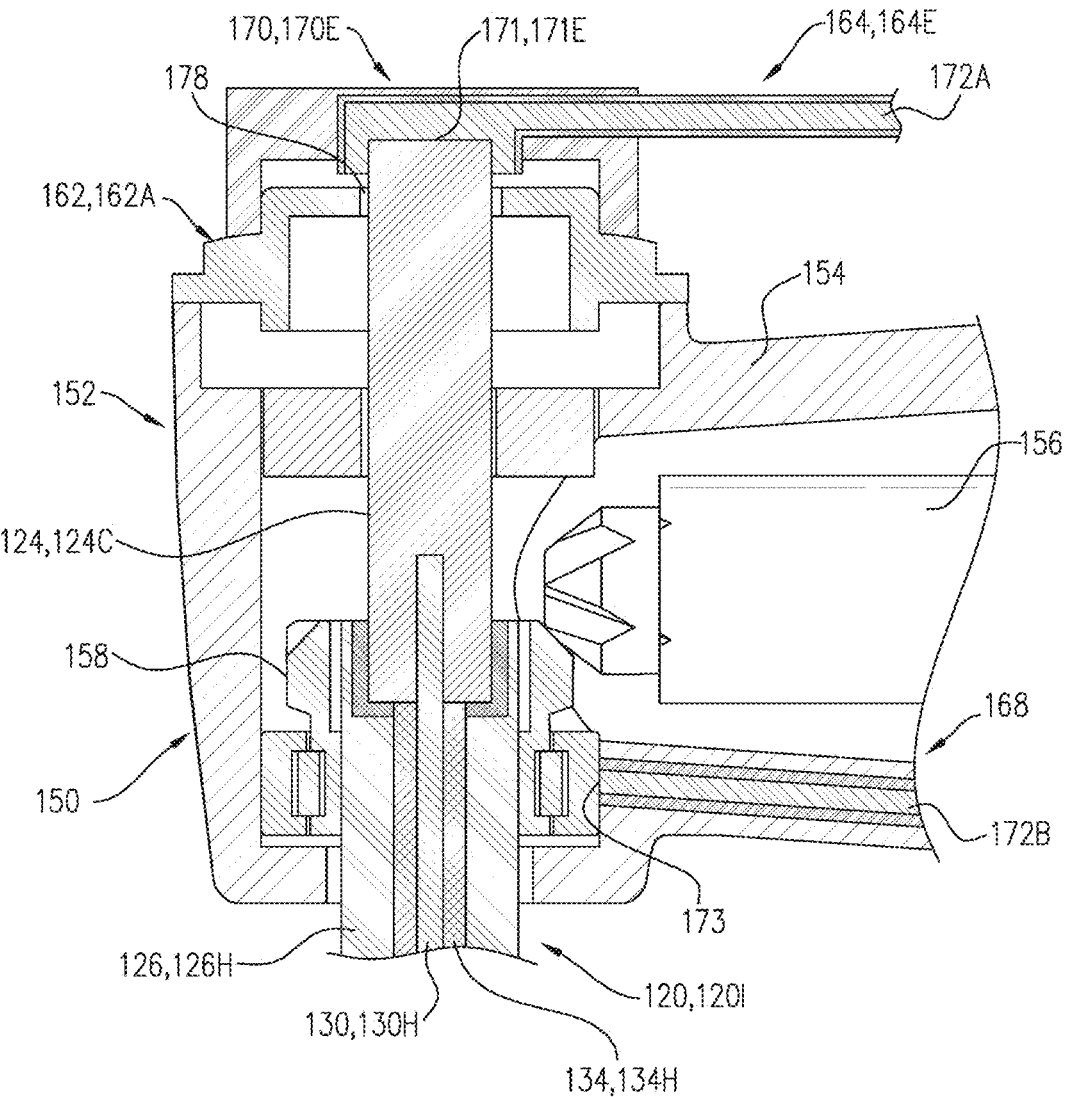

For some applications, such as shown in FIG. 18C, inner-electrode electrical contact 171, 171E of electrical connecting system 164, 164E is configured to be electrically coupled to shank 124, 124C; cap 162, 162A is shaped so as to define hole 178 therethrough; and inner-electrode electrical contact 171, 171E is configured to be electrically coupled to shank 124, 124C via a portion of shank 124 which protrudes out of cap 162, 162A.

Figure 18D:
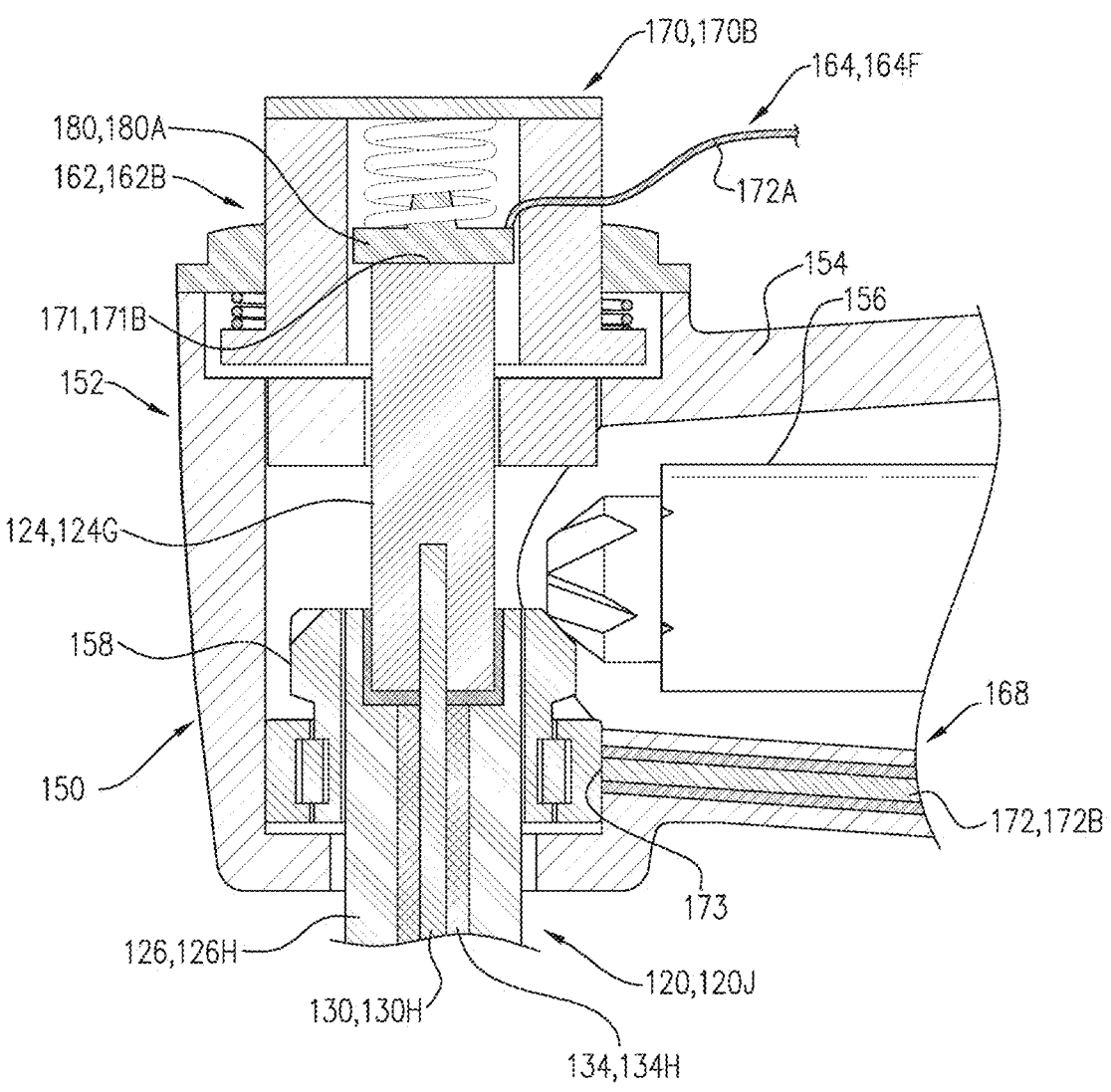

For some applications, such as shown in FIG. 18D:

handpiece 152 is configured such that when rotating cutting instrument 120 is coupled to handpiece 152, distal end portion 128 of electrically-conductive outer electrode 126 of rotating cutting instrument 20 extends distally out of handpiece 152, and electrical connecting system 164, 164F is configured such that inner-electrode electrical connector 170, 170B is disposed within handpiece 152.

(It is noted that the housing of inner-electrode electrical connector 170, 170B is not a component of handpiece 152, including not being a component of cap 162, 162B of handpiece 152.)

For some applications, such as shown in FIG. 18D, inner-electrode electrical connector 170, 170B of electrical connecting system 164, 164F comprises an axially-oriented pusher 180, 180A, which is located inside cap 162, 162B, which is shaped so as to define inner-electrode electrical contact 171, 171B, and which is configured to push inner-electrode electrical contact 171, 171B into electrical contact with shank 124, 124G, such that inner-electrode electrical contact 171, 171B is indirectly in electrical connection with electrically-conductive inner electrode 130 via shank 124, 124G.

Figure 18E:
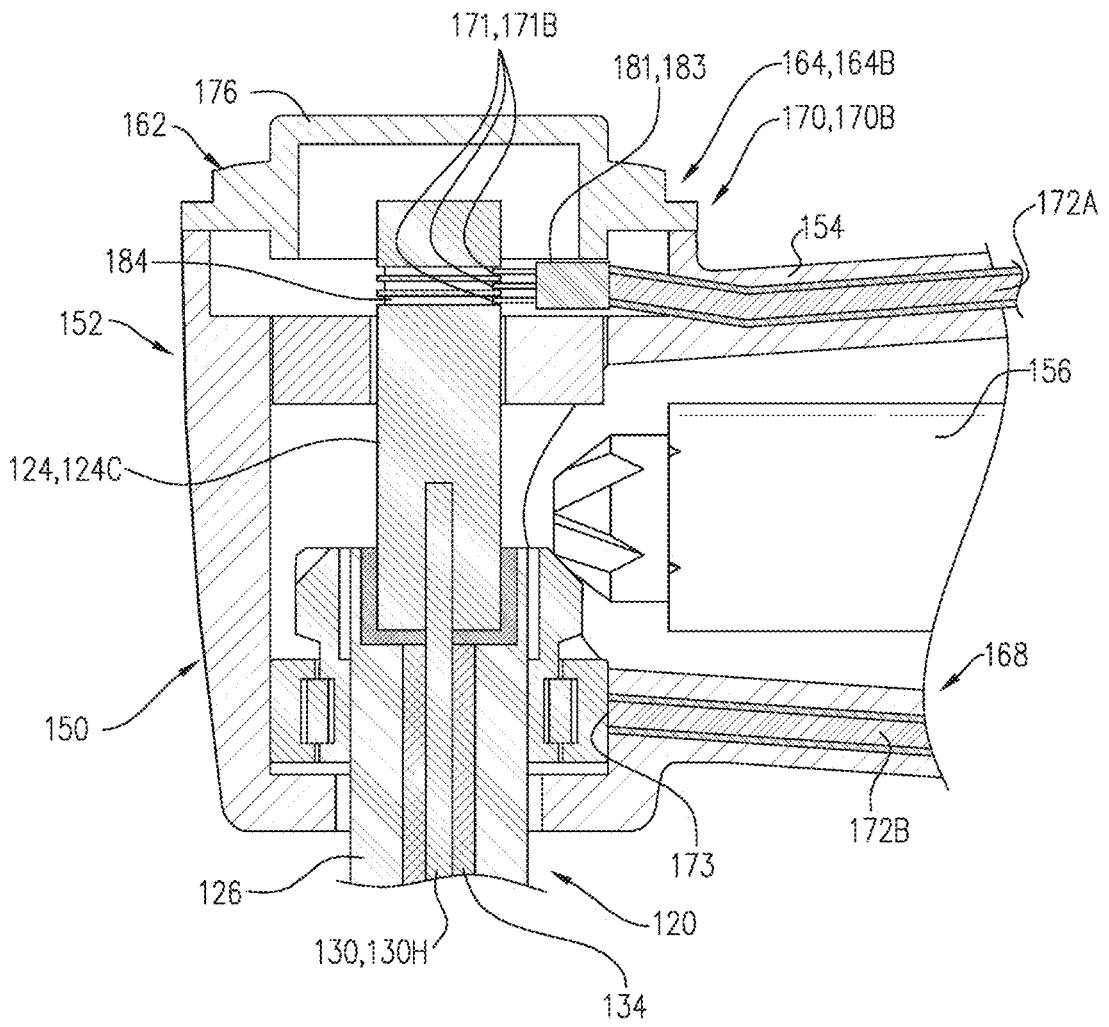
Figure 18F:
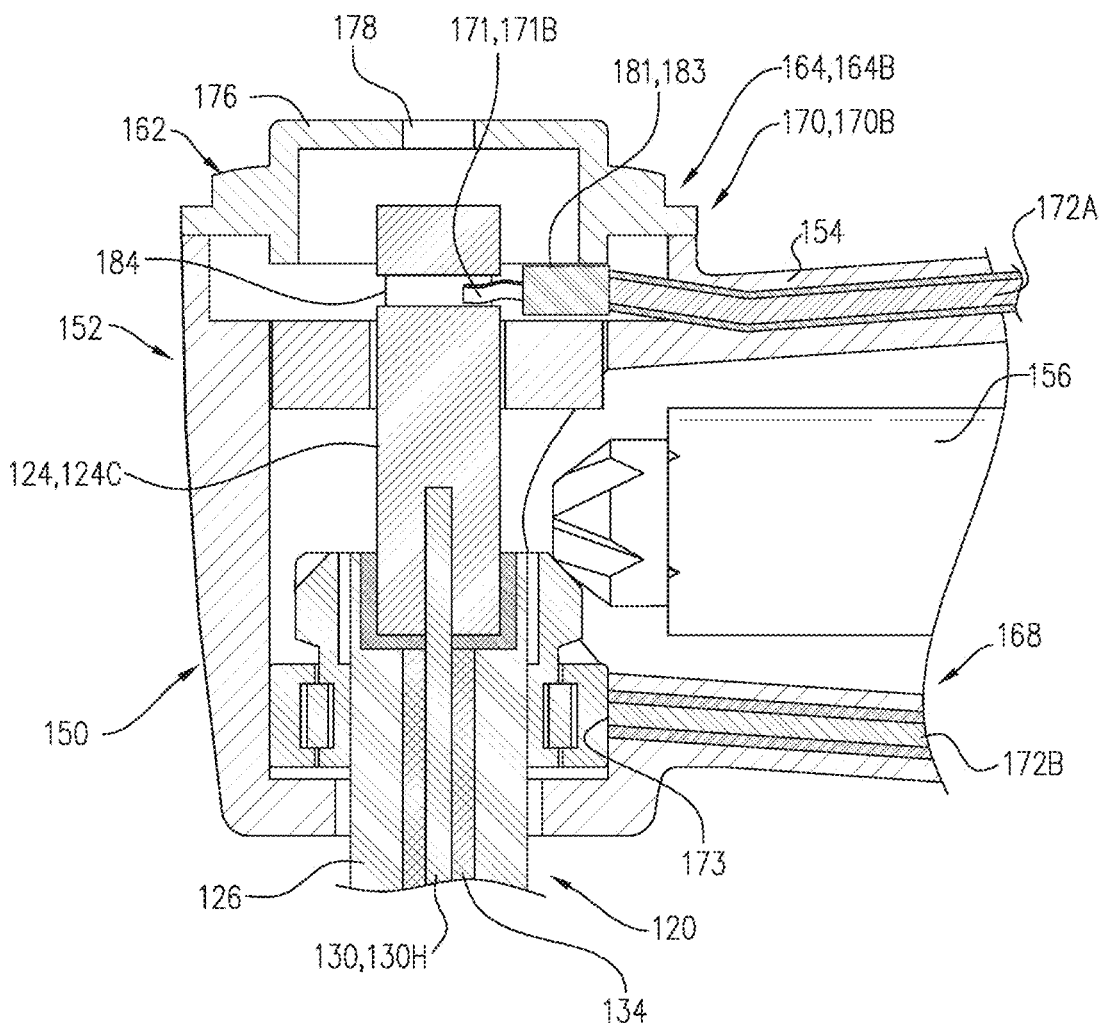
Figure 18G:
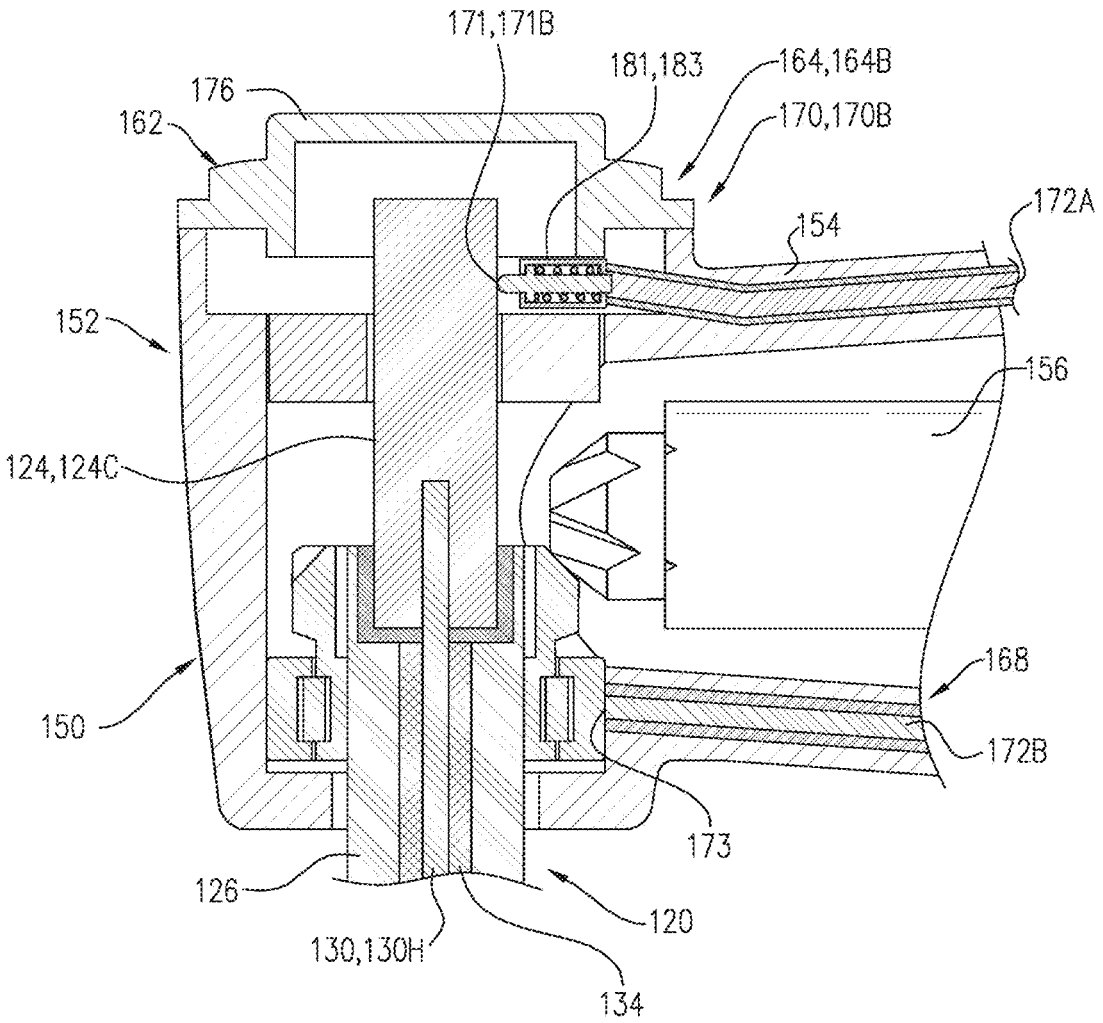

For some applications, such as shown in FIGS. 18E-G, electrical connecting system 164 comprises a laterally-oriented pusher 181 or a brush 183 located inside handpiece 152, and inner-electrode electrical contact 171, 171A of electrical connecting system 164 is configured to be electrically connected to electrically-conductive inner electrode 130 via laterally-oriented pusher 181 or brush 183, such as via direct contact (as shown), or through torque transmitter 158 which is electrically connected to shank 124 and insulated to outer electrode 126 (configuration not shown).

For some applications, such as shown in FIGS. 18A-G:
handpiece 152 is configured such that when rotating cutting instrument 120 is coupled to handpiece 152, distal end portion 128 of electrically-conductive outer electrode 126 of rotating cutting instrument 120 extends distally out of handpiece 152, and
outer-electrode electrical connector 168 of electrical connecting system 164 is disposed within handpiece 152.

For some applications, such as shown in FIG. 18A, outer-electrode electrical contact 173 of electrical connecting system 164 is configured to be coupled in electrical contact with outer electrode 126 of rotating cutting instrument 120 (e.g., distally from the distal end of torque transmitter 158) via torque transmitter 158, and, optionally, via bearing 160, if provided. Inner-electrode electrical contact 171, 171A of inner-electrode electrical connector 170, 170A is in direct electrical contact with inner electrode 130, 130G.

For some applications, such as shown in FIG. 18B, outer-electrode electrical contact 173 of electrical connecting system 164 is configured to be coupled in electrical contact with outer electrode 126, 126H of rotating cutting instrument 120 via torque transmitter 158 (e.g., via conductive bearings or a power transmission mechanism). Inner-electrode electrical connector 170, 170A is in electrical contact with inner electrode 130, 130H via shank 124, 124C. Inner-electrode electrical contact 171, 171A of inner-electrode electrical connector 170, 170A is in indirect electrical contact with inner electrode 130, 130H via shank 124, 124C.

For some of these applications, such as shown in FIGS. 18A, 18C, 18D, 18E, 18F, and 18G, outer electrode 126 of rotating cutting instrument 120 is configured to be coupled in direct electrical contact with torque transmitter 158.

For some of these applications, such as shown in FIG. 18B, outer electrode 126, 126H of rotating cutting instrument 20 is configured to be coupled in indirect electrical contact with torque transmitter 158 via a blade (as shown), brushes (configuration not shown), or a pin and spring system (configuration not shown).

For some of these applications, such as shown in FIGS. 18E and 18F, shank 124 is shaped so as to define at least one groove 184.

For some of these applications, such as shown in FIGS. 18E, 18F, and 18G, inner-electrode electrical contact 171, 171B comprises one or more elements selected from the group consisting of: blades (such as shown in FIG. 18E), wires (such as shown in FIG. 18F), carbon contacts (such as shown in FIG. 18G), and brushes (configuration not shown).

For some of these applications, such as shown in FIG. 18G, inner-electrode electrical contact 171, 171B comprises springs configured to apply a controlled load on shank 124.

Figure 19A:
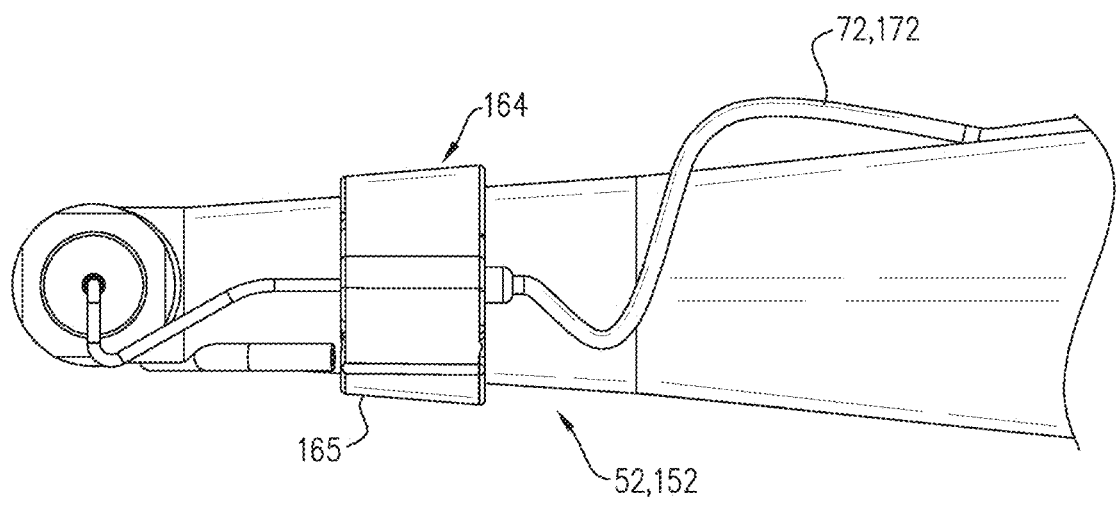
FIGS. 19A-B are schematic illustrations of a configuration of an electrical connecting system, in accordance with an application of the present invention.
Figure 19B:
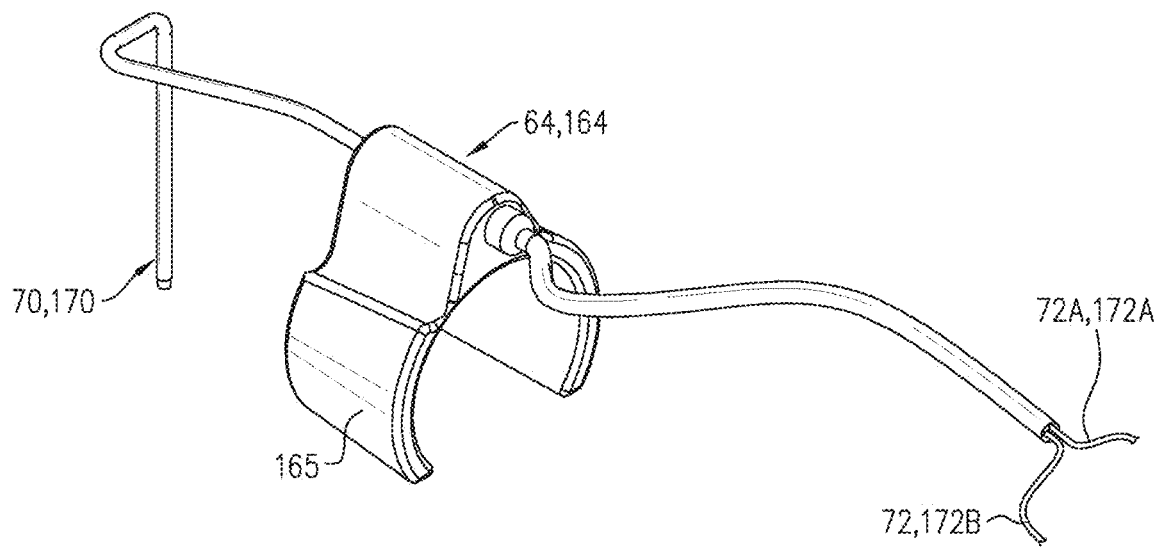

Reference is now made to FIGS. 19A-B, which are schematic illustrations of a configuration of electrical connecting system 64, 164, in accordance with an application of the present invention. For some applications, electrical connecting system 64, 164 is configured to be clipped to handpiece 52, 152. To this end, electrical connecting system 64, 164 may optionally comprise a clip 165 or one or more guide channels, such as described hereinbelow with reference to FIG. 20.

Figure 20:
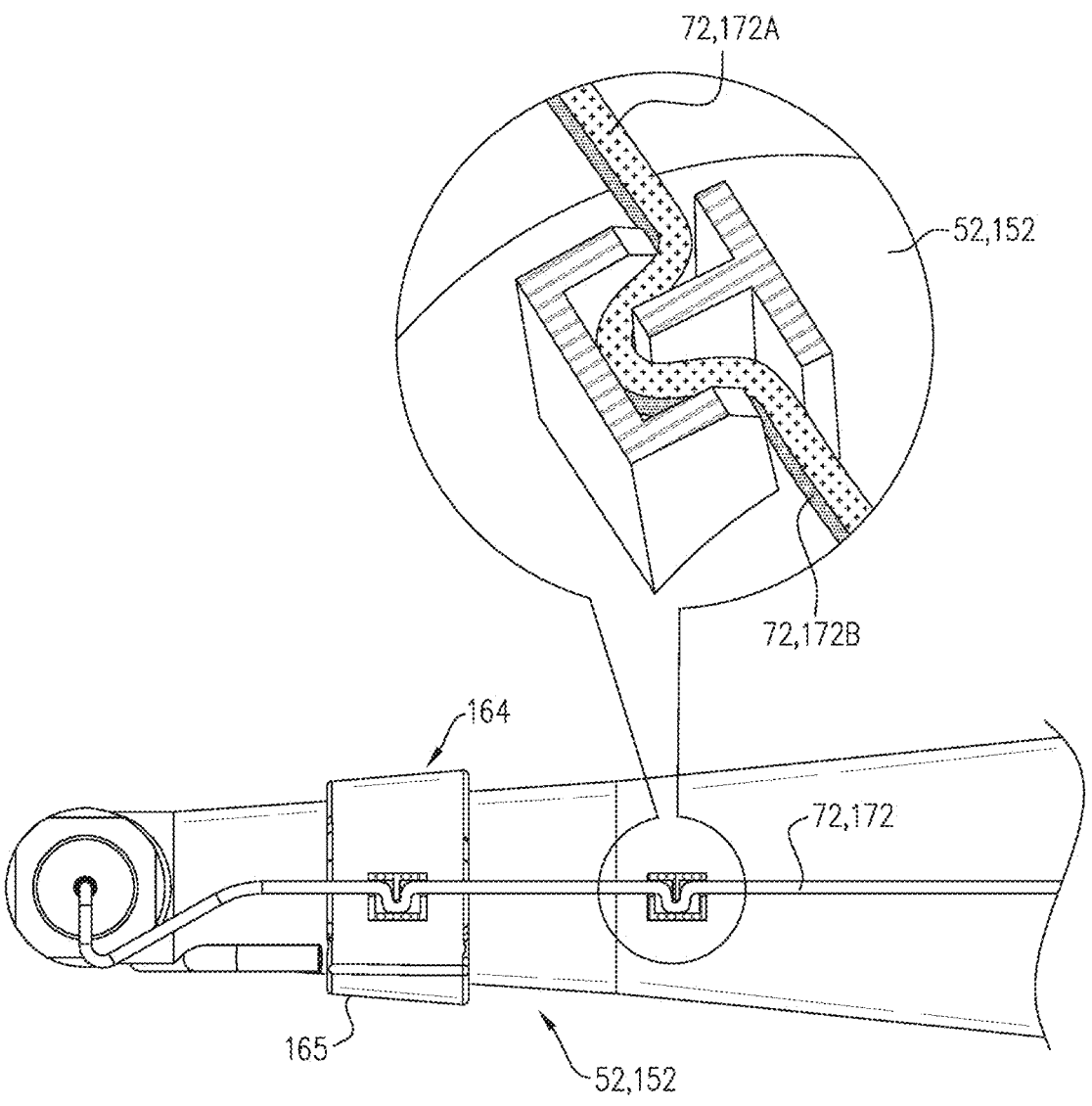
FIG. 20, which is a schematic illustration of a configuration of a portion of the insulated electrical wire guided by the handpiece, in accordance with an application of the present invention.

Reference is made to FIG. 20, which is a schematic illustration of a configuration of a portion of the insulated electrical wire guided by handpiece 52, 152, in accordance with an application of the present invention. For some applications, wires 72, 72A, 7B, 72C, 172, 172A, 172B of electrical connecting system 64, 164 are configured to be snapped into one or more guide channels defined by an external surface of handpiece 52, 152, in order to transmit an electrical signal from rotating cutting instrument 20, 120 to central unit 66. Electrical connecting system 64, 164 may optionally comprise clip 165. Optionally, the guide channels are used to couple only one of wires 172A or 172B.

Reference is now made to FIGS. 21A-H, which are highly schematic illustrations of several arrangements of components of electrical cutting system 50, 150, including wiring thereof, in accordance with respective applications of the present invention.

In FIGS. 21C-F, wires 72, 172 may comprise wires 72A, 172A; 72B; 172B; or 72A, 172A and 72B, 172B.

Figure 21A:
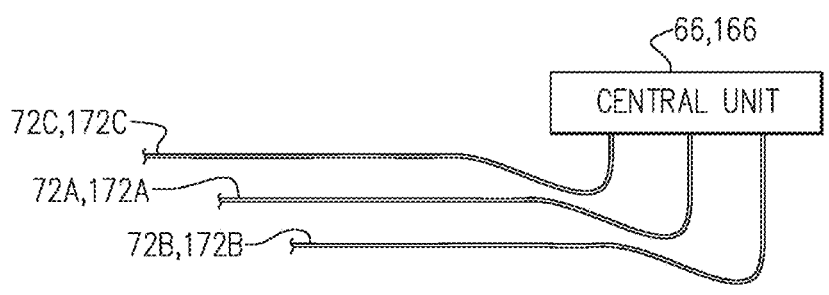
FIGS. 21A-H are highly schematic illustrations of several arrangements of components of an electrical cutting system, including wiring thereof, in accordance with respective applications of the present invention.

For some applications, such as shown in FIG. 21A, wires 72, 172 of electrical connecting system 64, 164 comprise a single piece, i.e., the wires extend directly from central unit 66, 166 to the connecting system.

Figure 21B:
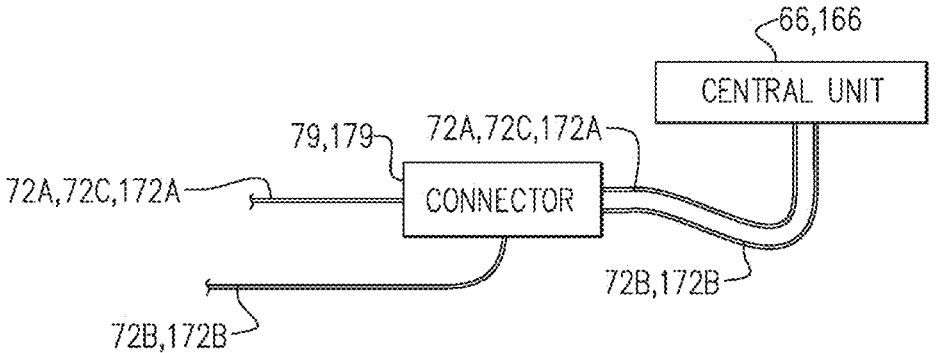

For some applications, such as shown in FIG. 21B, wires 72, 172 of electrical connecting system 164 comprise multiple pieces that are electrically connected to each other via one or more electrical connectors 79, 179.

For some applications, such as shown in FIGS. 8B-D, 8L-M, 10A, 10B, 10D, 12A, 12B, 19A-B, 20, and 21C, wires 72A, 72B, 172A, and 172B are external to handpiece 52, 152.

For some applications, such as shown in FIGS. 8A-Q, 10A-D, 12A-B, 13, 14A-B, 18A, 18B, 18C, 18D, 19A-B, 20, 21C, and 21E, electrical connecting system 64, 164 is configured such that at least a portion of inner-electrode wire 72A, 172A is disposed external to handpiece 52, 152.

For some applications, such as shown in FIGS. 10A, 10B, 10D, 12A, 12B, 14A-B, 19A-B, 20, 21C, and 21E, electrical connecting system 64, 164 is configured such that at least a portion of outer-electrode wire 72B, 172B is disposed external to handpiece 52, 152.

For some applications, such as shown in FIGS. 18D, 18J, 21D, 21F, and 21G, electrical connecting system 64, 164 is configured such that at least a portion of inner-electrode wire 72A, 172A passes through at least a portion of handpiece 52, 152.

For some applications, such as shown in FIGS. 8A-Q, 10C, 13, 18A-G, 21D, 21F, and 21G, electrical connecting system 64, 164 is configured such that at least a portion of outer-electrode wire 72B, 172B passes through at least a portion of handpiece 52, 152.

Figures 21C, 21D, 21E, 21F:
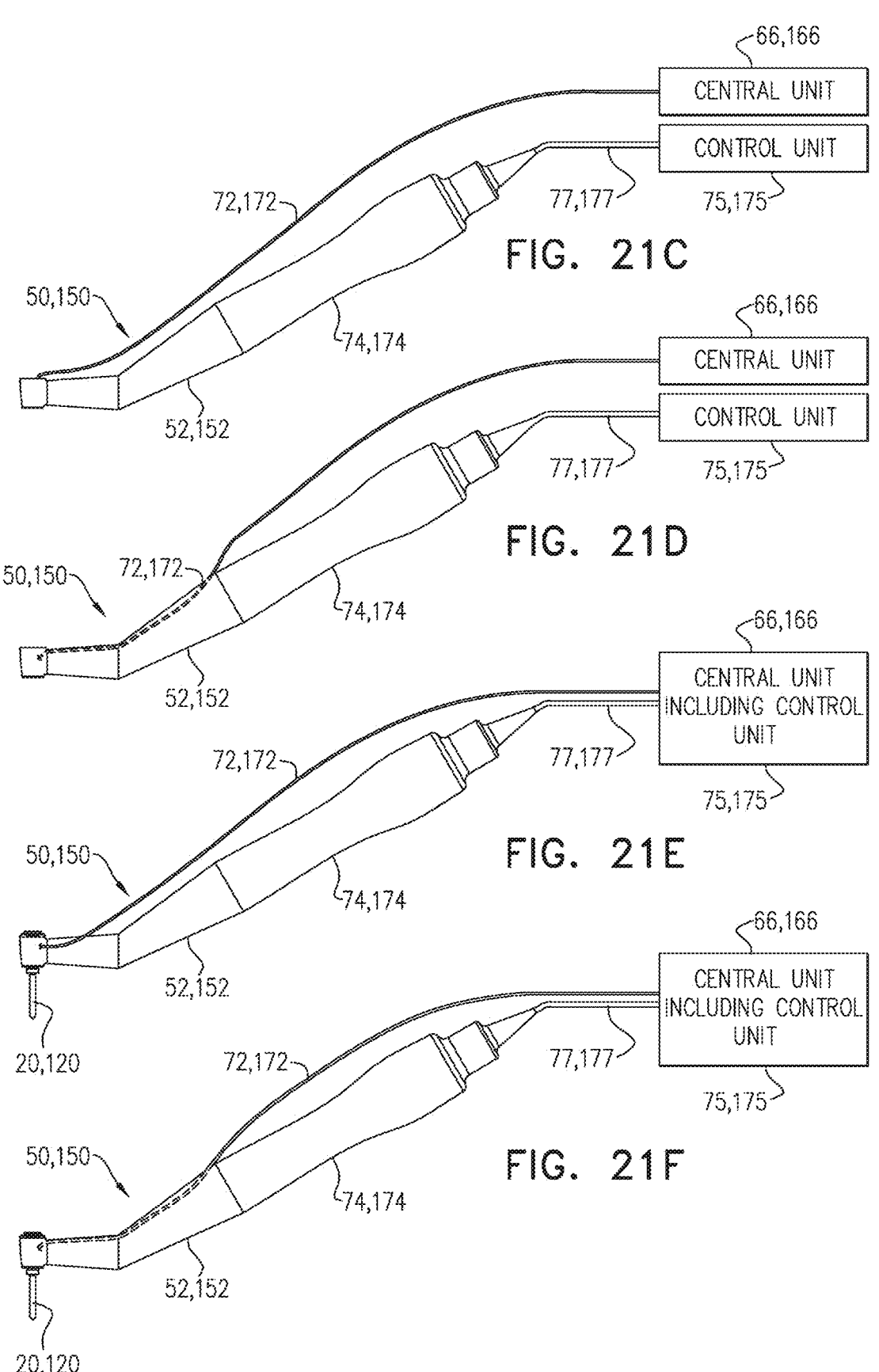
Figures 21G, 21H, 21I:
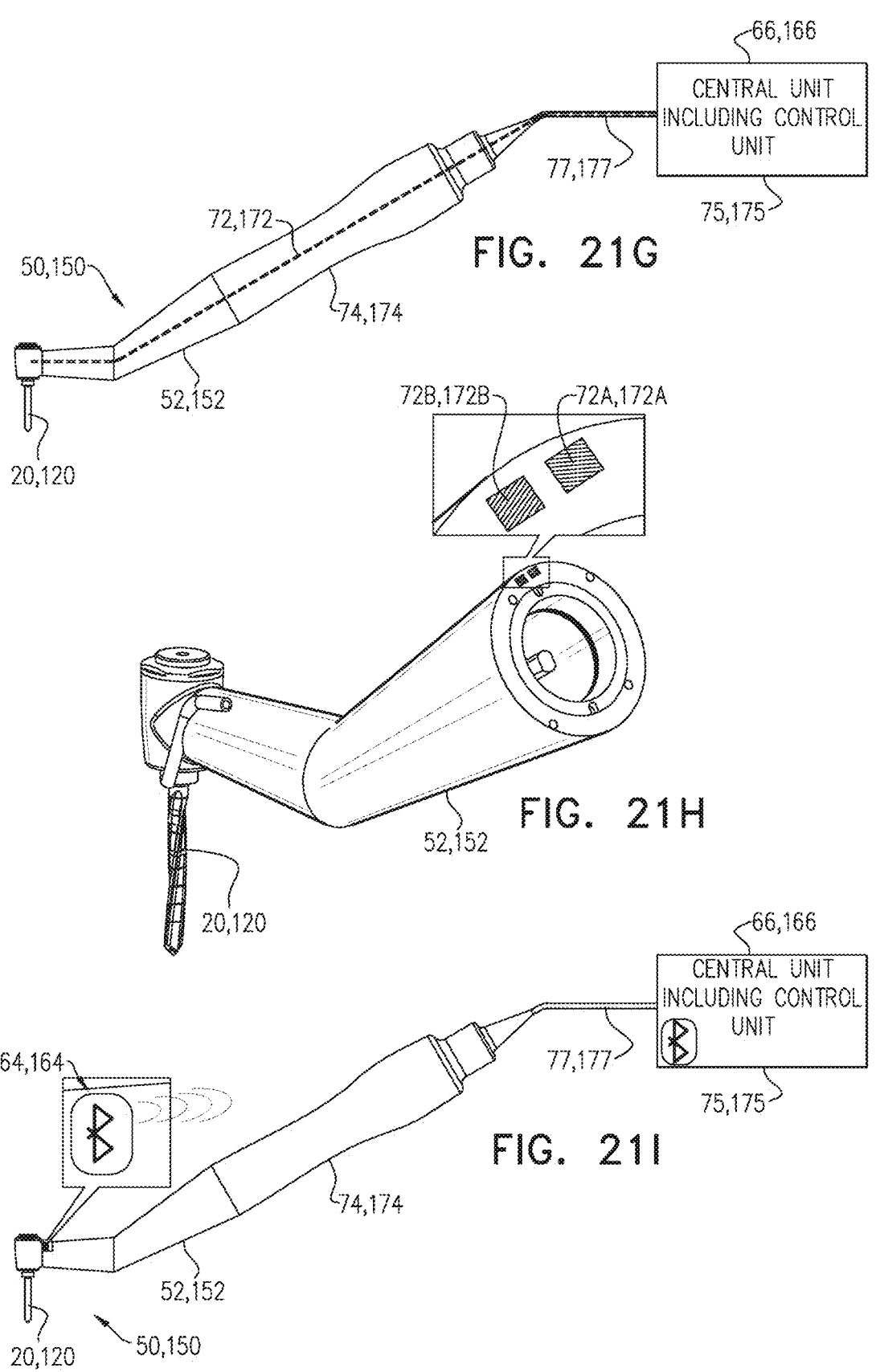
FIG. 21I is a highly schematic illustration of a wireless configuration of an electrical cutting system, in accordance with an application of the present invention.

For some applications, such as shown in FIGS. 21D, 21B, and 21G, wires 72, 172 are at least partially passing through handpiece 52, 152.

For some applications, such as shown in FIGS. 21C, 21D, 21E, and 21F, wires 72, 172 and a wire 77 of surgical motor 74, 174 are two different wires.

For some applications, such as shown in FIGS. 21G and 21H, wires 72, 172 and a wire 77, 177 of surgical motor 74, 174 are part of the same cable.

For some applications, such as shown in FIGS. 21C and 21D, central unit 66, 166 is external to control unit 75, 175 for surgical motor 74, 174.

For some applications, such as shown in FIGS. 21E, 21F, 21G, and 21I, central unit 66, 166 is embedded into control unit 75, 175 for surgical motor 74, 174.

Reference is now made to FIG. 21I, which is a highly schematic illustration of a wireless configuration of electrical cutting system 50, 150, in accordance with an application of the present invention. In this configuration, electrical signals from rotating cutting instrument 20, 120 are transferred to central unit 66 via a wireless connection.

In some applications, any of the techniques described and/or claimed herein may be implemented in rotating penetrating instruments other than rotating cutting instruments.

In an embodiment, techniques and apparatus described in one or more of the following applications are combined with techniques and apparatus described herein:

U.S. Provisional Application 62/942,520, filed Dec. 2, 2019

International Application PCT/IL2020/051241, filed Dec. 2, 2020, which published as PCT Publication WO 2021/111439 to Lorian et al.

U.S. Provisional Application 63/196,049, filed Jun. 2, 2021

U.S. Provisional Application 63/208,619, filed Jun. 9, 2021

In case of conflict between definitions provided herein and those provided in the patents and patent application publication incorporated herein by reference, the definitions provided herein will prevail.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An electrical cutting system for use with a rotating cutting instrument, a surgical motor, and a control unit for the surgical motor, the rotating cutting instrument comprising a proximal electrically-conductive shank configured to receive torque, an electrically-conductive outer electrode in electrical contact with the proximal electrically-conductive shank, and an electrically-conductive inner electrode, the electrical cutting system comprising:

a handpiece configured to be removably coupled to the rotating cutting instrument, the handpiece comprising: an external casing comprising a cap; and a torque transmitter comprising an internal channel sized and shaped to removably receive the proximal electrically-conductive shank of the rotating cutting instrument therein such that a proximal end portion of the rotating cutting instrument extends proximally out of the torque transmitter and a distal end portion of the rotating cutting instrument extends distally out of the torque transmitter, the torque transmitter configured to transmit the torque generated by the surgical motor to the proximal electrically-conductive shank when the rotating cutting instrument is removably coupled to the handpiece;

a central unit configured to emit signals to and collect signals from the rotating cutting instrument and provide information to a user of the electrical cutting system; and an electrical connecting system configured to electrically connect the electrically-conductive outer electrode and the electrically-conductive inner electrode to the central unit, the electrical connecting system comprising:

an outer-electrode electrical connector comprising an outer-electrode electrical contact, and an insulated electrical wire electrically coupled to the outer-electrode electrical contact and to the central unit; and an inner-electrode electrical connector comprising an inner-electrode electrical contact, and an insulated electrical wire electrically coupled to the inner-electrode electrical contact and to the central unit, wherein the handpiece is configured such that when the rotating cutting instrument is removably coupled to the handpiece, the outer-electrode electrical contact is in electrical contact with the electrically-conductive outer electrode, and the inner-electrode electrical contact is in electrical contact with the electrically-conductive inner electrode via the proximal end portion of the rotating cutting instrument extending proximally from the torque transmitter.

2. The electrical cutting system according to claim 1, further comprising the rotating cutting instrument, the rotating cutting instrument comprising:

a proximal electrically-conductive shank configured to receive torque;

an electrically-conductive outer electrode in electrical contact with the proximal electrically-conductive shank, the electrically-conductive outer electrode comprising an electrically-conductive distal end portion sized and shaped to penetrate tissue when rotated;

an electrically-conductive inner electrode having a proximal end portion; and an electrical isolation layer between the electrically-conductive outer electrode and the electrically-conductive inner electrode, so as to electrically isolate the electrically-conductive outer electrode and the electrically-conductive inner electrode from each other.

3. The electrical cutting system according to claim 2, wherein the rotating cutting instrument comprises a drill bit, a milling drill bit, or a burr.

4. The electrical cutting system according to claim 2, wherein the rotating cutting instrument comprises exactly one electrically-conductive outer electrode and exactly one electrically-conductive inner electrode, and wherein the electrical isolation layer is radially between the exactly one electrically-conductive outer electrode and the exactly one electrically-conductive inner electrode.

5. The electrical cutting system according to claim 2, wherein the proximal electrically-conductive shank is integral with the electrically-conductive distal end portion, or wherein the proximal electrically-conductive shank and the electrically-conductive distal end portion comprise separate pieces that are directly mechanically and electrically coupled to each other, or wherein the proximal electrically-conductive shank and the electrically-conductive distal end portion comprise separate pieces that are indirectly mechanically and electrically coupled to each other.

6. The electrical cutting system according to claim 2, wherein a proximal portion of the proximal electrically-conductive shank is shaped so as to define at least one lateral planar surface that is configured to receive the torque, or wherein a distal portion of the proximal electrically-conductive shank is shaped so as to define a circular cross-section except for at least one lateral planar surface that is configured to receive the torque, or wherein a distal portion of the proximal electrically-conductive shank is shaped so as to have a non-polygonal cross-section that is configured to receive the torque.

7. The electrical cutting system according to claim 1, wherein the electrical cutting system is configured to electrically connect the electrically-conductive inner electrode to ground.

8. The electrical cutting system according to claim 1, wherein the electrical cutting system is configured to electrically connect the electrically-conductive outer electrode to ground.

9. The electrical cutting system according to claim 1, wherein the handpiece is configured such that when the rotating cutting instrument is coupled to the handpiece, the outer-electrode electrical contact is in electrical contact with the electrically-conductive outer electrode via the proximal electrically-conductive shank.

10. The electrical cutting system according to claim 1, wherein the handpiece is configured such that when the rotating cutting instrument is coupled to the handpiece, a distal end portion of the electrically-conductive outer electrode of the rotating cutting instrument extends distally out of the handpiece, and wherein the electrical connecting system is configured such that the inner-electrode electrical contact is disposed within the handpiece, and a portion of the inner-electrode electrical connector passes through a hole defined by a proximal end part of the cap.

11. The electrical cutting system according to claim 10, wherein the inner-electrode electrical contact of the electrical connecting system is configured to be electrically coupled to a proximal end portion of the inner electrode.

12. The electrical cutting system according to claim 11, wherein the inner-electrode electrical contact of the electrical connecting system comprises one or more contact elements selected from the group consisting of: one or more wires, one or more blades, one or more carbon contacts, and one or more brushes.

13. The electrical cutting system according to claim 12, wherein the proximal end portion of the inner electrode is shaped so as to define one or more grooves, and wherein the one or more contact elements are configured to mechanically and electrically contact the one or more grooves.

14. The electrical cutting system according to claim 1, wherein the cap is shaped so as to define a hole therethrough, wherein the inner-electrode electrical contact is configured to be coupled in electrical contact with the electrically-conductive inner electrode of the rotating cutting instrument, and wherein the inner electrode protrudes out of the cap via the hole.

15. The electrical cutting system according to claim 1, wherein the handpiece is configured such that when the rotating cutting instrument is coupled to the handpiece, a distal end portion of the electrically-conductive outer electrode of the rotating cutting instrument extends distally out of the handpiece, and wherein the electrical connecting system is configured such that the inner-electrode electrical contact is disposed within the handpiece.

16. The electrical cutting system according to claim 15, wherein the inner-electrode electrical connector of the electrical connecting system comprises a pusher, which is located inside the cap, which is shaped so as to define the inner-electrode electrical contact, and which is configured to push the inner-electrode electrical contact into electrical contact with the electrically-conductive inner electrode, wherein the pusher is configured to have a spring effect to maintain continuous contact between the inner-electrode electrical contact and the electrically-conductive inner electrode, or wherein the inner-electrode electrical connector further comprises a spring, which is configured to push the pusher.

17. The electrical cutting system according to claim 15, wherein the inner-electrode electrical contact of the electrical connecting system comprises at least one blade located inside the cap.

18. The electrical cutting system according to claim 17, wherein the electrically-conductive inner electrode protrudes proximally out of the outer electrode.

19. The electrical cutting system according to claim 1, wherein the handpiece is configured such that when the rotating cutting instrument is coupled to the handpiece, a distal end portion of the electrically-conductive outer electrode of the rotating cutting instrument extends distally out of the handpiece, and wherein the electrical connecting system is configured such that the outer-electrode electrical contact is disposed within the handpiece, and a portion of the outer-electrode electrical connector passes through a hole defined by a proximal end part of the cap.

20. The electrical cutting system according to claim 1, wherein the handpiece is configured such that when the rotating cutting instrument is coupled to the handpiece, a distal end portion of the electrically-conductive outer electrode of the rotating cutting instrument extends distally out of the handpiece, and wherein the electrical connecting system is configured such that the outer-electrode electrical contact of the electrical connecting system is configured to be coupled in electrical contact with the electrically-conductive outer electrode of the rotating cutting instrument, and wherein the electrically-conductive outer electrode protrudes out of the cap.

21. The electrical cutting system according to claim 1, wherein the handpiece is configured such that when the rotating cutting instrument is coupled to the handpiece, a distal end portion of the electrically-conductive outer electrode of the rotating cutting instrument extends distally out of the handpiece, and wherein the electrical connecting system is configured such that the outer-electrode electrical contact is disposed within the handpiece.

22. The electrical cutting system according to claim 21, wherein the outer-electrode electrical contact of the electrical connecting system is configured to be coupled in direct electrical contact with the electrically-conductive outer electrode of the rotating cutting instrument.

23. The electrical cutting system according to claim 22, wherein the outer-electrode electrical contact of the electrical connecting system comprises one or more contact elements selected from the group consisting of: one or more wires, one or more blades, one or more carbon contacts, and one or more brushes.

24. The electrical cutting system according to claim 22, wherein the electrically-conductive outer electrode of the rotating cutting instrument is shaped so as to define at least one groove.

25. The electrical cutting system according to claim 22, wherein the electrical connecting system comprises springs configured to apply a controlled load between the outer-electrode electrical contact and the electrically-conductive outer electrode of the rotating cutting instrument.

26. The electrical cutting system according to claim 21, wherein the outer-electrode electrical connector of the electrical connecting system is in electrical contact with the cap.

27. The electrical cutting system according to claim 21, wherein the outer-electrode electrical connector of the electrical connecting system comprises a pusher, which is located inside the cap, which is shaped so as to define the outer-electrode electrical connector, and which is configured to push the outer-electrode electrical contact into electrical contact with the electrically-conductive outer electrode, wherein the pusher is configured to have a spring effect to maintain continuous contact between the outer-electrode electrical contact and the electrically-conductive outer electrode, or wherein the outer-electrode electrical contact further comprises a spring, which is configured to push the pusher.

28. The electrical cutting system according to claim 21, wherein the outer-electrode electrical connector of the electrical connecting system is configured to be coupled in electrical contact with the electrically-conductive outer electrode of the rotating cutting instrument via the torque transmitter.

29. The electrical cutting system according to claim 28, wherein the torque transmitter is configured to be coupled in direct electrical contact with the electrically-conductive outer electrode of the rotating cutting instrument, or wherein the torque transmitter comprises one or more contact elements, and is configured to be coupled in indirect electrical contact with the electrically-conductive outer electrode of the rotating cutting instrument via the one or more contact elements, the one or more contact elements selected from the group consisting of one or more blades, one or more wires, one or more carbon contacts, and one or more brushes, or wherein the torque transmitter comprises a pin and spring system, and is configured to be coupled in indirect electrical contact with the electrically-conductive outer electrode of the rotating cutting instrument via the pin and spring system.

30. The electrical cutting system according to claim 1, wherein the central unit is external to the control unit for the surgical motor, or wherein the electrical connecting system comprises wires that are external to the handpiece, or wherein the electrical connecting system is configured such that at least a portion of the insulated electrical wire of the inner-electrode electrical connector is disposed external to the handpiece, or wherein the electrical connecting system is configured such that at least a portion of the insulated electrical wire of the outer-electrode electrical connector is disposed external to the handpiece.

31. The electrical cutting system according to claim 1, wherein the central unit is embedded into the control unit for the surgical motor, wherein the electrical connecting system is configured such that at least a portion of the insulated electrical wire of the inner-electrode electrical connector is disposed external to the handpiece, or wherein the electrical connecting system is configured such that at least a portion of the insulated electrical wire of the outer-electrode electrical connector is disposed external to the handpiece, or wherein the electrical connecting system comprises wires that are internal to the handpiece, or wherein the electrical connecting system comprises wires that are external to a wire of the surgical motor, or wherein the electrical connecting system comprises wires that are internal to a wire of the surgical motor.

32. The electrical cutting system according to claim 1, wherein the electrical signals from the rotating cutting instrument are transferred to the central unit via a wireless connection.

33. A method of using a rotating cutting instrument with an electrical cutting system, the rotating cutting instrument comprising a proximal electrically-conductive shank configured to receive torque, an electrically-conductive outer electrode in electrical contact with the proximal electrically-conductive shank, and an electrically-conductive inner electrode, the method comprising:

removably coupling the proximal electrically-conductive shank of the rotating cutting instrument extends to a torque transmitter of a handpiece of the electrical cutting system such that a proximal end portion of the rotating cutting instrument extends proximally out of the torque transmitter and a distal end portion of the rotating cutting instrument extends distally out of the torque transmitter;

electrically coupling the electrically-conductive outer electrode and the electrically-conductive inner electrode of the rotating cutting instrument with a central unit of the electrical cutting system via an outer-electrode electrical connector and an inner-electrode electrical connector, respectively, such that an outer-electrode electrical contact of the outer-electrode electrical connector is in electrical contact with the electrically-conductive outer electrode and an inner-electrode electrical contact of the inner-electrode electrical connector is in electrical contact with the electrically-conductive inner electrode via the proximal end portion of the rotating cutting instrument extending proximally from the torque transmitter;

activating the torque transmitter to transmit torque generated by the surgical motor to the proximal electrically-conductive shank to cause the rotating cutting instrument to penetrate into tissue via an electrically-conductive distal end portion of the electrically-conductive outer electrode; and using the central unit, measuring an electrical characteristic of the tissue sensed via the electrically-conductive outer electrode and the electrically-conductive inner electrode.

\* \* \* \* \*